(12) United States Patent
Sodini et al.

(10) Patent No.: US 8,053,669 B1
(45) Date of Patent: Nov. 8, 2011

(54) POWER DISTRIBUTION SYSTEMS AND ASSOCIATED METHODS

(75) Inventors: Jeffrey J. Sodini, Warren, MI (US); Brian J. Scigiel, Allen Park, MI (US); Todd Wisneski, Dearborn, MI (US)

(73) Assignee: Aees, Inc., Farmington Hills, MI (US)

( * ) Notice: Subject to any disclaimer, the term of this patent is extended or adjusted under 35 U.S.C. 154(b) by 308 days.

(21) Appl. No.: 12/472,972

(22) Filed: May 27, 2009

(51) Int. Cl.
*H02G 3/18* (2006.01)
(52) U.S. Cl. .......................................... 174/59; 439/76.2
(58) Field of Classification Search ................. 439/76.2, 439/559; 174/59
See application file for complete search history.

(56) References Cited

U.S. PATENT DOCUMENTS

| | | | |
|---|---|---|---|
| 5,764,487 A * | 6/1998 | Natsume | 361/775 |
| 6,422,899 B1 * | 7/2002 | Miyazaki | 439/559 |
| 6,672,883 B2 * | 1/2004 | Kasai et al. | 439/76.2 |

\* cited by examiner

*Primary Examiner* — Phuong Dinh
(74) *Attorney, Agent, or Firm* — Howard & Howard Attorneys PLLC

(57) ABSTRACT

Various embodiments of the present invention relate to power distribution systems and associated methods. In specific examples, the present invention may be applied to use in a vehicle (e.g., an automobile; a truck; a boat; an airplane; a helicopter; a military vehicle).

15 Claims, 39 Drawing Sheets

FIG. 4C  FIG. 4D

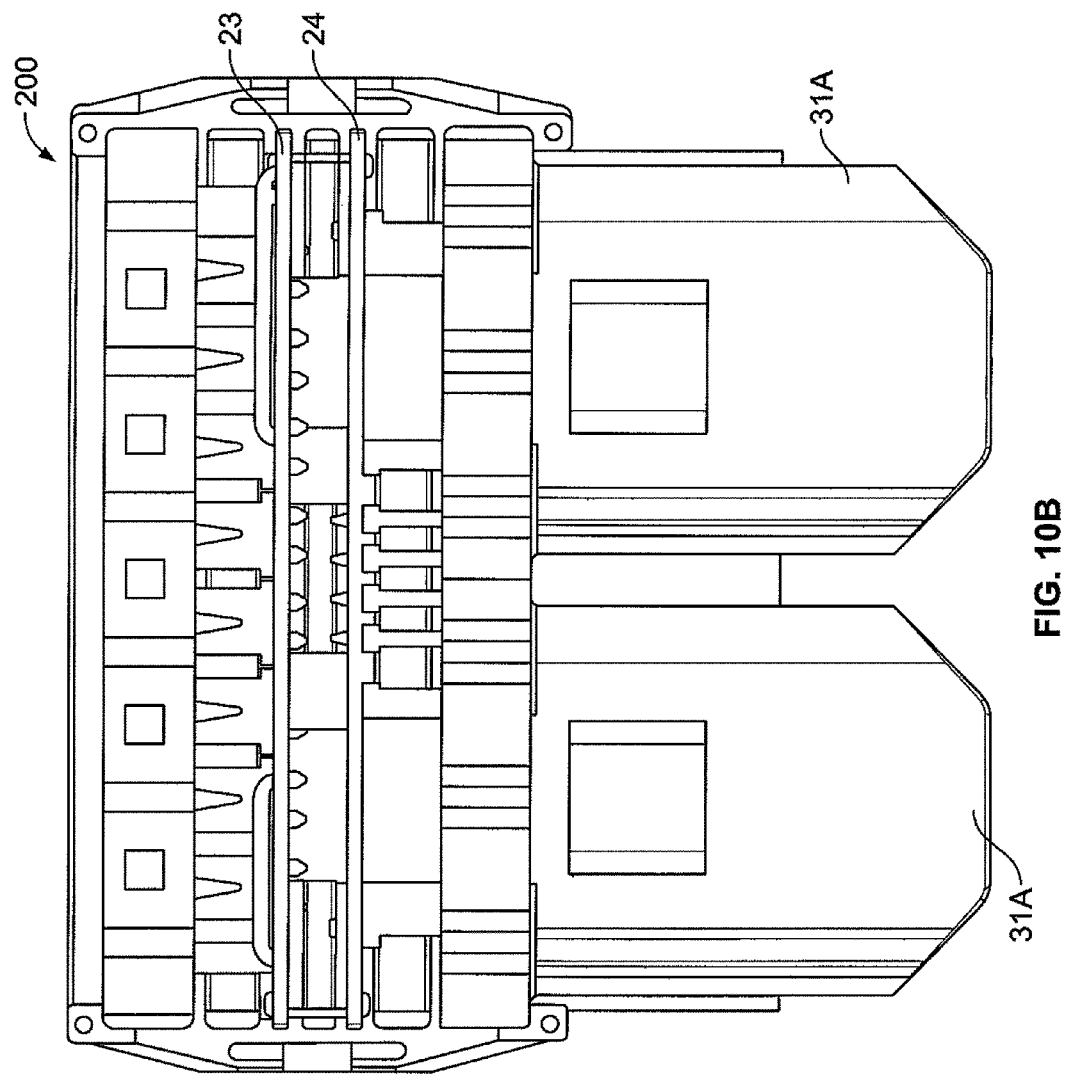

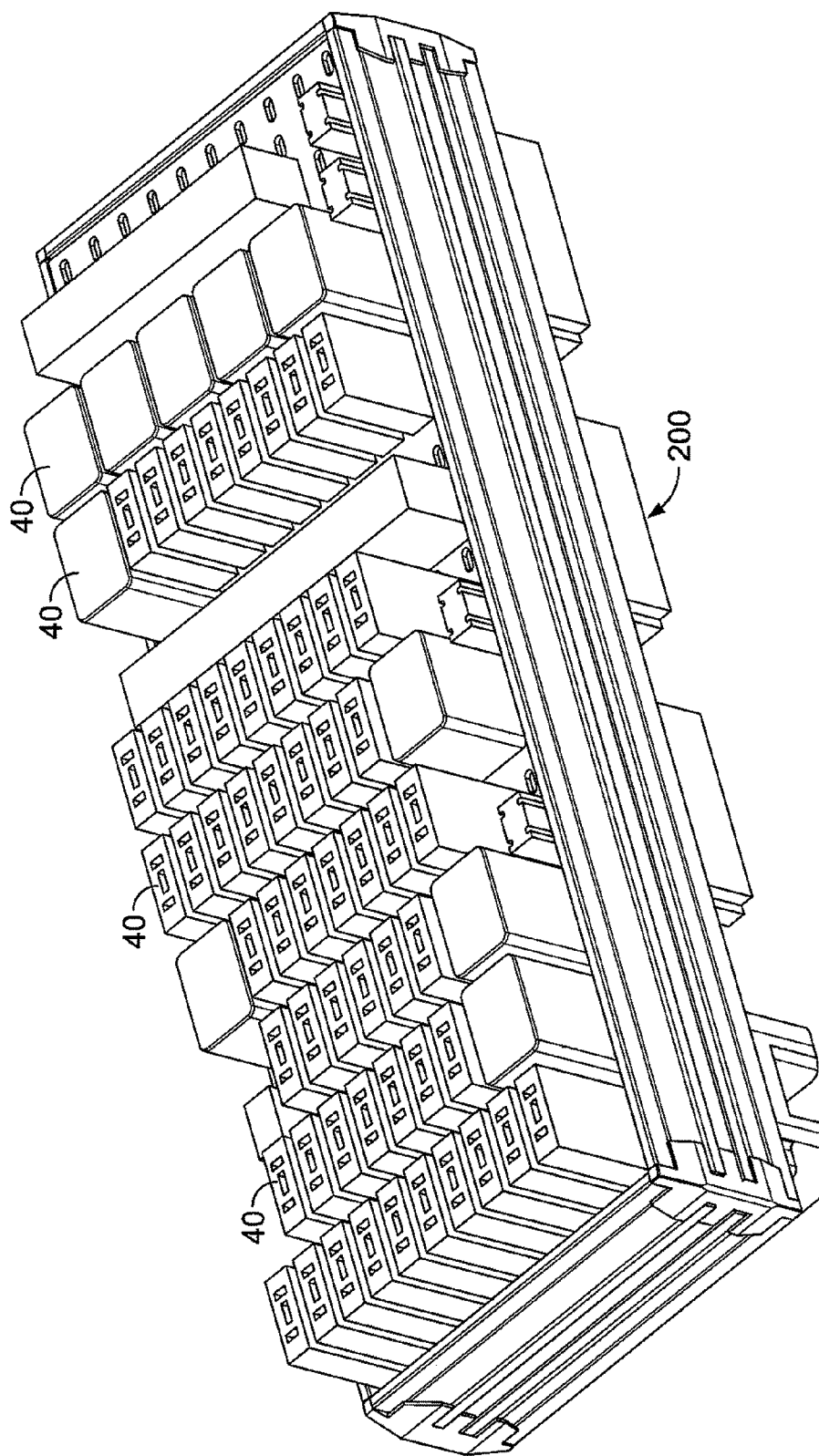

POWER DISTRIBUTION SYSTEMS AND ASSOCIATED METHODS

FIELD OF THE INVENTION

Various embodiments of the present invention relate to power distribution systems and associated methods.

In one embodiment of the present invention a power distribution system is provided, comprising: a power distribution center, wherein the power distribution center comprises a component plate; and at least one electrical connector spacer; wherein the component plate comprises a plurality of electrical terminals electrically connected to the power distribution center and wherein the component plate comprises on an outer surface thereof a surface geometry, the outer surface geometry having at least a portion configured to permit electrical connection at a first time of an electrical device to at least first and second ones of the electrical terminals and mechanical connection at a second time of the electrical connector spacer above at least the first and second ones of the electrical terminals; wherein the first time and the second time are distinct from one another and are mutually exclusive.

In this regard, this embodiment of the present invention may provide a single place on the component plate at which either an electrical device (e.g., minifuse, circuit breaker, relay, resistor, diode, or switch) or an electrical connector/electrical connector spacer may be connected (e.g. electrically and/or mechanically). That is, this embodiment of the present invention may provide flexibility in layout via which either an electrical device or an electrical connector/electrical connector spacer may be connected into the same area of the component plate (of course, such connection either of an electrical device or an electrical connector/electrical connector spacer would not occur at the same time; in addition, both the electrical device and the electrical connector/electrical connector spacer need not be connected to the component plate—this embodiment of the present invention simply gives the flexibility to allow connection of the electrical device or the electrical connector/electrical connector spacer as desired).

In another embodiment of the present invention a power distribution center for a vehicle is provided, wherein the vehicle has a bulkhead separating an engine compartment from a passenger compartment, comprising: a connector plate; a first seal; a mounting ring, wherein the mounting ring comprises a first face and a second face, wherein the mounting ring removably mates with the connector plate such that the first seal is disposed between the connector plate and the first face of the mounting ring to provide a seal between the connector plate and the first face of the mounting ring; and an adhesive, wherein the adhesive is disposed on the second face of the mounting ring; wherein the mounting ring is attached via the adhesive ring to the bulkhead; wherein the bulkhead has at least one hole therethrough; and wherein the mounting ring is attached via the adhesive to the bulkhead at a position such that the mounting ring encloses a perimeter of the hole in the bulkhead.

In this regard, this embodiment of the present invention may provide a bulkhead pass through incorporating circuit protection devices and/or a bulkhead pass through incorporating multiple harness junction capability.

For the purposes of describing and claiming the present invention, the term "power distribution center" (or "PDC") is intended to refer to a power distribution system component that provides for: power distribution, integration of one or more circuit overcurrent protection devices, integration of one or more circuit switching devices and integration of one or more interconnects between one or more wiring harnesses.

Further, for the purposes of describing and claiming the present invention, the term "modular power distribution center" (or "mPDC") is intended to refer to a power distribution center that utilizes common housing components, scalable extruded side rails, custom attachment brackets, and a printed circuit board architecture that can be configured to meet the requirements of a given application (such an mPDC may or may not utilize integration of various electronic modules).

Further still, for the purposes of describing and claiming the present invention, the term "electrical connector" is intended to refer to a connector terminating one or more wires for electrically connecting the wire(s) to one or more associated electrical terminals.

Further still, for the purposes of describing and claiming the present invention, the term "electrical device" is intended to refer to any of a fuse (such as a minifuse), circuit breaker, relay, resistor, diode, or switch.

Further still, for the purposes of describing and claiming the present invention, the term "electrical system component" is intended to refer to any of a head light, a signal light, a vehicle cabin light, an anti-lock brake component, a radio and/or stereo system, a power window, a power mirror, a power seat or any other electrical system element typically used a motor vehicle.

Further still, for the purposes of describing and claiming the present invention, the term "electrical connection" is intended to refer to a connection via which electricity flows between two places (e.g., between two electrical terminals).

Further still, for the purposes of describing and claiming the present invention, the term "mechanical connection" is intended to refer to a physical connection via which at least two elements are held in place relative to one another.

Further still, for the purposes of describing and claiming the present invention, the term "ring" is intended to refer to a closed form, albeit not necessarily circular (in one example, a ring may be produced as an integral unit (e.g., molded); in another example, a ring may be produced by an assembly of one or more elements (e.g., assembling one or more linear elements into a ring)).

Further still, for the purposes of describing and claiming the present invention, the term "removably mounted" or "removably attached" or "removably mates" is intended to refer to being designed to be applied, removed and re-applied (e.g., for a plurality of such cycles).

Further still, for the purposes of describing and claiming the present invention, the term "permanently mounted" or "permanently attached" or "permanently mates" is intended to refer to being designed to be applied once and left in place for the life of a component (but not necessarily to be totally incapable of being removed).

Further still, for the purposes of describing and claiming the present invention, the term "weather-tight seal" is intended to refer to a seal being designed to be substantially water tight at ambient pressure (but not necessarily to be totally impenetrable to water under all pressure conditions).

Further still, for the purposes of describing and claiming the present invention, the term "bulkhead" is intended to refer to a partition or wall in a vehicle (one non-limiting example of such a bulkhead is an automobile "dash panel").

Further still, for the purposes of describing and claiming the present invention, the term "vehicle" is intended to refer to any land, water or air conveyance.

BACKGROUND OF THE INVENTION

An automotive electrical system is a formidable combination of high-current and low-current circuitry. In many cases, relays are required for control purposes. In addition, all circuits must typically be adequately fused (e.g., to protect expensive components and to guard against the danger of fire). In order to facilitate the replacement of fuses and relays, and to simplify interconnection of electrical hardware, many different electric power distribution systems have been tried.

One approach that has been tried is to centralize the mounting of fuses and relays and then route input and output connections from this central location. The first systems built using this approach typically included a great deal of point-to-point wiring. Hand wiring is very costly, and manual wiring operations are typically a source of wiring errors that negatively impact product quality.

Another approach that has been tried has been the construction of customized distribution networks stamped from thin metal sheets. These stampings are shaped so that contact tabs protrude through openings in custom designed plastic shells. Although this approach typically yields a higher quality product, tooling costs can be high for both the plastic shells and the stampings since virtually every automobile model typically requires a unique distribution system. At least some of this uniqueness aspect is driven by the proliferation of fuse and relay packages. A distribution product must typically be able to accommodate the fuse and relay components selected by the automobile manufacturer.

Another approach centered around the use of flexible circuit board technology, or "flex circuits." Flex circuits are constructed by depositing conductive material between two flexible insulating layers. Although the unique distribution requirements of each vehicle model would typically require unique flex circuits for each application, tooling costs are typically much lower than the metal stamping/custom plastic housing approach described previously. One disadvantage of the flex circuit approach is that the conductive layers are typically very thin, and the high current densities often required in vehicle power distribution can lead to overheating and possible eventual failure.

In addition, it is noted that within a vehicle electrical system there is typically a need to pass electrical current between a passenger compartment and an engine compartment. This typically requires circuit(s) to pass through a dash panel (or bulkhead) in some manner, which in turn typically creates a need to seal the junction point(s) to prevent water intrusion into the passenger compartment.

In this regard, one conventional method for accomplishing such passing through the bulkhead utilizes an applied or molded on grommet to pass a wire harness directly through the bulkhead. Another conventional method for accomplishing such passing through the bulkhead utilizes a bulkhead connector, which is a connector that is attached directly to and seals against the bulkhead—in this example half of the connector is in the passenger compartment and the other half is in the engine compartment. It is believed that both of these conventional methods require any circuit protection devices to be located elsewhere in the vehicle. Further, it is believed that neither of these conventional methods provides multiple harness junction capability.

BRIEF DESCRIPTION OF THE DRAWINGS

FIGS. 4C-4E are side cross sectional views of mechanical connection of a device interface buss and/or positive battery terminal to a primary strip in association with a power distribution center according to an embodiment of the present invention;

FIGS. 10A-10C are views of an assembled modular distribution center according to an embodiment of the present invention;

FIG. 15 is a bottom perspective view; FIG. 16A is an exploded view (this view of FIG. 16A is similar to the view of FIG. 14); FIG. 16B is a partial cross-sectional view showing certain details of this power distribution system and FIG. 17 is a partial cross-sectional view showing certain details of this power distribution system (this view of FIG. 17 is similar to the view of FIG. 16B but in the view of FIG. 16B the components are not in a fully mated condition while in the view of FIG. 17 the components are in a fully mated condition).

Figure 1:
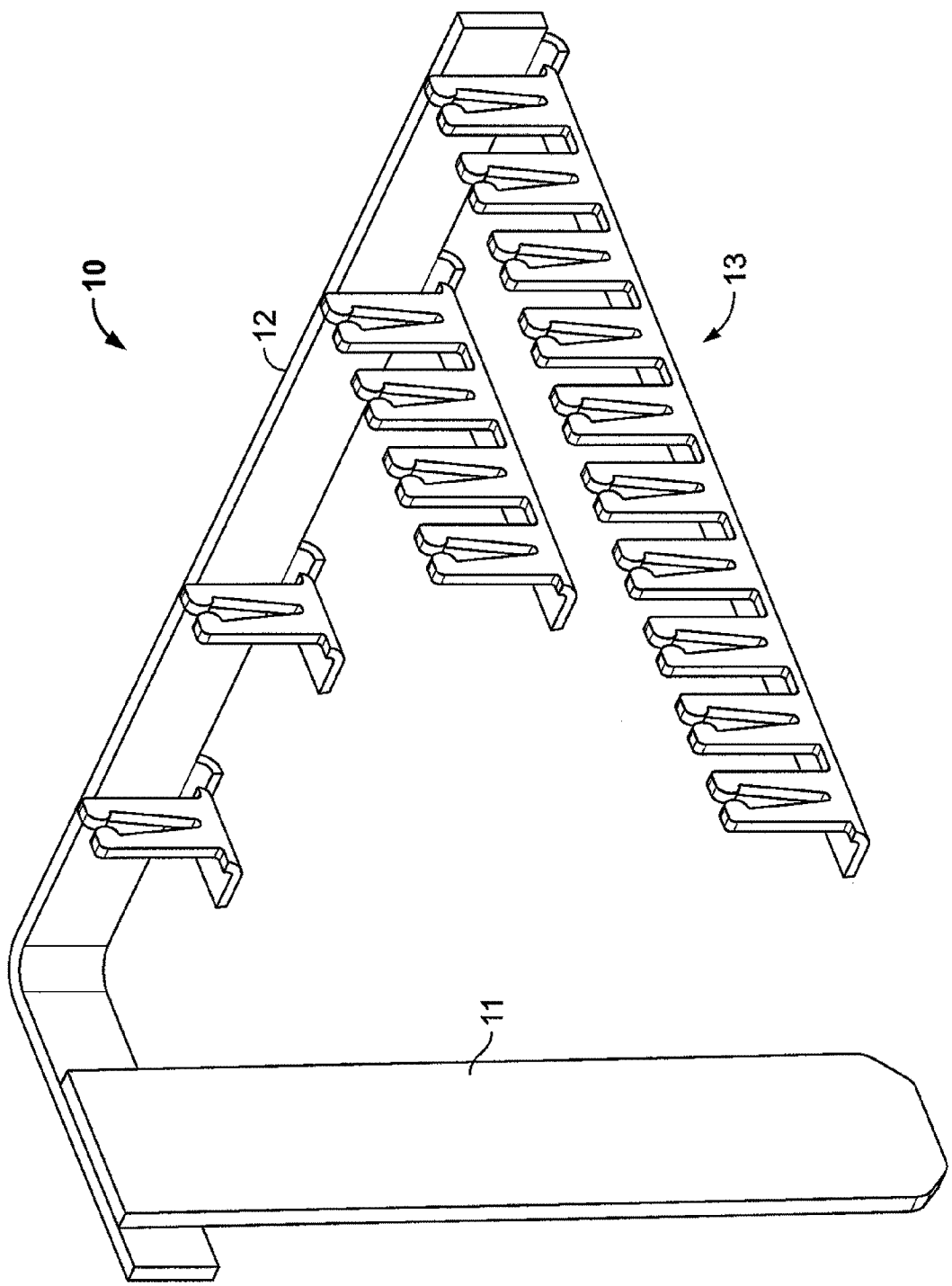
FIGS. 1 and 3D are perspective views of a modular power buss (also sometimes referred to as primary buss) according to an embodiment of the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

In one embodiment, the present invention relates to an electrical power distribution center and, more particularly, in one example, to a method and an apparatus for distributing electrical power in a vehicle.

In another embodiment, the present invention allows for modular integration of electronics (in contrast, for example, with conventional modular power distribution centers that are typically hard wired). Such modular integration may provide, for example, for a vehicle electric power distribution system that can be customized for a particular vehicle with relative ease, that avoids high tooling costs for custom designed components, that is reliable in a high current environment, that will accommodate a wide range of fuse and relay packages, and/or that is relatively inexpensive to manufacture.

In another embodiment, the present invention relates to a modular power distribution center that utilizes connectors for interconnectivity (in contrast, for example, to hard wiring) and allows for the integration of electronics modules onto a printed circuit board architecture.

In another embodiment, the present invention may provide a power distribution center that comprises: a modular housing having at least one receptacle for engaging a device and at least one socket for I/O connections; at least one printed circuit board within the modular housing which can comprise at least one I/O connection which corresponds to at least one socket for I/O connections of the modular housing, the printed circuit board being electrically connected to at least one primary buss or the at least one primary buss being integrated into the printed circuit board; and the at least one primary buss having a primary conductive strip, a terminal connected to the primary conductive strip and at least one device interface buss connected to the primary conductive strip, wherein connections to the at least one device interface buss correspond with the at least one receptacle of the modular housing.

In another embodiment of the present invention the modular housing of the power distribution center may comprise any material that will provide structural integrity for the assembly such as, for example, side walls of plastic, extruded aluminum, etc.; an upper face and a lower face wherein either face can include at least one plate having a grid of receptacle portions defined through the face of the at least one plate, wherein the receptacle portions correspond to connections of the device interface buss; and the other face can include at least one connector module, or is adapted to connect to a remote module, and having at least one socket that corresponds to the I/O connections of the printed circuit board. In one example, all connections may be made through either one or both faces. The receptacle portions may be configured to receive in engaging fashion electrical devices including, but not limited to: fuses, relays, resistors, diodes, and switches. The at least one printed circuit board of the modular power distribution center may comprise, for example, a single printed circuit board or two printed circuit boards. When two printed circuit boards are present, each printed circuit board may be electrically coupled to the other, either printed circuit board may include or provide power distribution from the at least one primary buss, and/or either printed circuit board may provide electrical connections to the at least one I/O connection.

In another embodiment of the present invention a method for distributing electrical power in a vehicle is provided (the method may operate in association with at least one device interface buss having device connections, at least one printed circuit board, and a modular housing which provides a degree of adjustability that is typically unavailable in conventional power distribution centers). Under this embodiment of the present invention the method for distributing electrical power in a vehicle may comprises the steps of: providing a power buss having a positive battery terminal and at least one device interface buss having device connections; connecting the power buss to at least one printed circuit board, wherein the at least one printed circuit board has at least one I/O connection; and enclosing the printed circuit board within a housing comprising at least one modular plate having a grid of receptacle portions corresponding to the device connections of the at least one device interface buss and at least one socket corresponding to the at least one I/O connection of the printed circuit board.

In another embodiment of the present invention the power buss may comprise a primary buss strip having a length along a first direction selected to provide electrical connections to at least the portion of the housing corresponding to the connections of the electrical devices; connecting the battery positive terminal to the primary buss strip or to the printed circuit board; and connecting at least one device interface buss to a portion of the primary buss strip, wherein the at least one device interface buss has a length along a second direction and is connected to a portion of the primary buss strip to provide connections to the electrical devices.

In another embodiment of the present invention the step of enclosing the circuit board within the housing may further comprise providing a modular upper plate and a modular lower plate as a repeatable unit. In one example, the number of the modular upper plates may correspond to the electrical device connections to the device interface buss and the device connections to the power distribution center. In another example, the number of the modular lower plates may correspond to the I/O connections of the printed circuit board and the I/O connections to the power distribution center.

As described herein, various embodiments of the present invention relate to a modular power distribution center that utilizes connectors for interconnectivity (as opposed, for example, to hard wiring) and allows for the integration of electronics modules onto a printed circuit board architecture.

In one embodiment of the present invention a modular power distribution center may comprise: a network of conductive paths having a plurality of I/O connections adapted to be coupled to electrical devices having at least two terminals; at least one power distribution buss conductively coupled to or integral with the network of conductive paths and adapted to be conductively coupled to a source of battery positive power; at least two plates of non-conductive material located on the top surface of the network of conductive paths; the plates having cavity portions which extend through the plates and are arranged in a pattern adapted to receive electrical devices located on top of the plate and are aligned with device terminal interfaces conductively coupled to the network of conductive paths.

In one example, the power distribution buss may comprise: at least one primary buss conductively coupled to the network of conductive paths and adapted to be coupled to a source of battery power; a primary strip of conductive material coupled to the at least one primary buss; a first device interface buss of conductive material coupled through the primary strip to the primary buss; at least one of the plurality of I/O connections conductively coupled to the device interface buss; and a second device interface buss conductively coupled through the network of conductive paths to at least another of the plurality of I/O connections.

In another example, the modular power distribution center may further comprise a sidewall member coupled to at least one side of the at least two plates.

In another example, the sidewall member may comprise a rigid or semi-rigid material.

In another example, the sidewall member may comprise a guide rail on its the outside surface.

In another example, the sidewall member may comprise a guide rail located on its inside surface.

In another example, the plates located on the top surface of the network of conductive paths may be coupled together with interlocking members.

In another example, the pattern of the cavity portions which extend through the at least two plates on the top surface of the network of conductive paths may allow at least one electrical device inserted into two cavities to bridge a seam between the at least two plates.

In another example, the network of conductive paths may comprise flexible printed circuitry.

In another example, the network of conductive paths may comprise insulated conductors selectively interconnected.

In another example, the network of conductive paths may comprise at least one printed circuit board.

In another example, the network of conductive paths may comprise: at least one printed circuit board and the primary buss and the primary strip of conductive material may be incorporated into conductive routing of the printed circuit board.

In another example, the modular power distribution center of may further comprise an electronics module located adjacent to and in electrical communication to the network of conductive paths.

In another example, the cavity portions may be configured for receiving in engaging fashion electrical devices selected from the group which can include (but not be limited to): fuses, relays, resistors, diodes, and switches.

In another example, the grid of cavity portions may be configured for 280 series pitch, spacing and multiples thereof.

In another example, the network of conductive paths may comprise at least one connector module, wherein the at least one connector module may comprise the at least one socket corresponding to the I/O connections of the network of conductive paths.

In another example, the sidewall member may comprise at least two members coupled to two sides of the at least two plates; and a molded unit having a geometry for engagement with the at least two members.

In another example, the first device interface buss may comprise a 280 series buss strip.

In another embodiment of the present invention a modular power distribution center may comprise: a network of conductive paths having a plurality of I/O connections adapted to be coupled to an electrical device having at least two terminals; at least one power distribution buss conductively coupled or integral with the network of conductive paths and to be conductively coupled to a source of battery positive power; at least one plate of non-conductive material located on the top surface of the network of conductive paths; cavity portions which extend through the plate are arranged in a pattern adapted to receive electrical devices located on top of the plate and are aligned with device terminal interfaces coupled to the network of conductive paths; and at least one sidewall member coupled to at least one side edge of the plate; wherein the sidewall member supports the plate.

In one example, the at least one plate may comprise two plates located on the top surface of the network of conductive paths coupled together with interlocking members.

In another example, the at least one plate may comprise at least two plates and the pattern of the cavity portions on the top surface of the plates may allow at least one electrical device inserted into two cavity portions to bridge a seam between the at least two plates.

In another example, the network of conductive paths may comprise at least one printed circuit board.

In another example, the cavity portions may be configured for receiving in engaging fashion electrical devices selected from the group which may include (but not be limited to): fuses, relays, resistors, diodes, and switches.

In another example, the cavity portions may be configured for 280 series pitch, spacing and multiples thereof.

In another example, the network of conductive paths may comprise at least one connector module, wherein the at least one connector module may comprise at least two cavity portion I/O connections of the network of conductive paths.

In another embodiment of the present invention a modular power distribution center may comprise: a network of conductive paths having a plurality of I/O connections adapted to be coupled to an electrical device having at least two terminals; at least one power distribution buss conductively coupled or integral with the network of conductive paths and to be conductively coupled to a source of battery positive power; a plate of non-conductive material located on the top surface of the network of conductive paths; cavity portions which extend through the plate are arranged in a pattern adapted to receive electrical devices located on top of the plate and are aligned with device terminal interfaces that are coupled to the network of conductive paths; at least one connector module; and at least one sidewall member coupled to at least one side edge of the connector module; wherein the sidewall member supports the connector module.

In one example, the plate located on the top surface of the network of conductive paths may comprise at least two plates coupled together with interlocking members.

In another example, the plate located on the top surface of the network of conductive paths may comprise at least two plates with a seam therebetween and the pattern of cavity portions which extend through the at least two plates on the top surface may allow at least one electrical device inserted into two cavity portions to bridge the seam between the at least two plates.

In another example, the network of conductive paths may comprise at least one printed circuit board.

In another example, the cavity portions may be configured for receiving in engaging fashion electrical devices selected from the group which may include (but not be limited to): fuses, relays, resistors, diodes, and switches.

In another example, the grid of cavity portions may be configured for 280 series pitch, spacing and multiples thereof.

In another example, the network of conductive paths may comprise at least one connector module, wherein the at least one connector module may comprise at least two cavity portions corresponding to the I/O connections of the network of conductive paths.

In another embodiment of the present invention a method for distributing electrical power may be provided, comprising the steps of: providing a power buss having a positive battery terminal and at least one device terminal interface having device connections; connecting the power buss to at least one network of conductive paths; wherein the at least one network of conductive paths has at least one I/O connection; and enclosing the network of conductive paths within a housing having at least one modular plate having a grid of cavity portions corresponding to the device connections of the at least one device terminal interface and at least one cavity portion corresponding to the at least one I/O connection of the network of conductive paths.

In one example, providing a power buss may further comprise: providing a primary strip having a length along a first direction selected to provide electrical connection to at least the portion of the housing corresponding to the device connections; connecting a battery positive terminal to the primary strip; and connecting at least one device interface buss to a portion of the primary strip, wherein the at least one device interface buss has a length along a second direction and is connected to a portion of the primary strip to provide a connection to the portion of the power distribution center corresponding to the device connections.

In one example, the first direction may be substantially perpendicular to the second direction.

In another example, the method may further comprise the step of providing the at least one device interface buss with mechanical connection for receiving (for example) fuses, relays, resistors, diodes or switches.

In another example, the method may further comprise mechanically connecting the battery positive terminal and the at least one device interface buss to the primary strip.

In another example, the enclosing the circuit board may further comprise the step of: providing a modular upper plate having the grid of cavity portions as a repeatable unit, wherein the number of the modular upper plates selected corresponds to the device connection to the at least one device interface buss and the device connection to the power distribution center; providing a modular lower plate having the at least one socket as a repeatable unit, wherein the number of modular lower plates selected correspond to the I/O connections of the printed circuit board and the I/O connections to the power distribution center.

In another example, the method may further comprise providing sidewalls for engaging the modular plate.

As discussed herein, one embodiment of the present invention provides a modular power distribution center that provides electrical connections of a device interface buss through mechanical connectors and also provides for integration of electronic modules onto printed circuit board architectures.

Referring now to the Figures, FIG. 1 depicts one embodiment of modular power buss 10 (also sometimes referred to as primary bus) which may include a positive battery terminal 11 (also sometimes referred to as B+ terminal), a primary strip 12, and at least one device interface buss 13 (also sometimes referred to as an interface buss primary strip). In one example, the primary buss 10 may be formed of conductive material, such as copper. In another example, the components of the primary buss 10 may be formed from a sheet material, such as by a stamping operation.

Figure 2A:
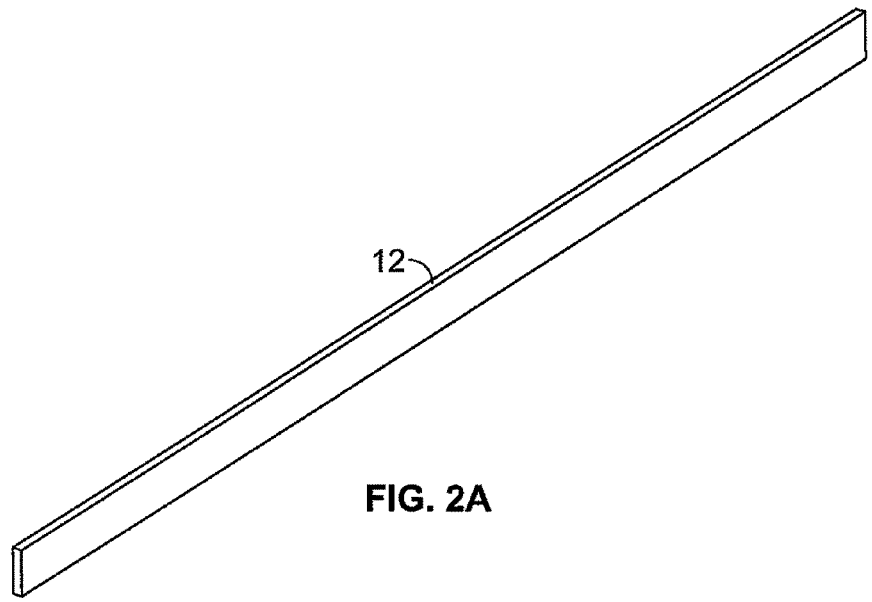
FIGS. 2A-2C are perspective views of the assembly of a primary strip to a positive battery terminal in providing a primary bus sub-assembly according to an embodiment of the present invention.
Figure 2B:
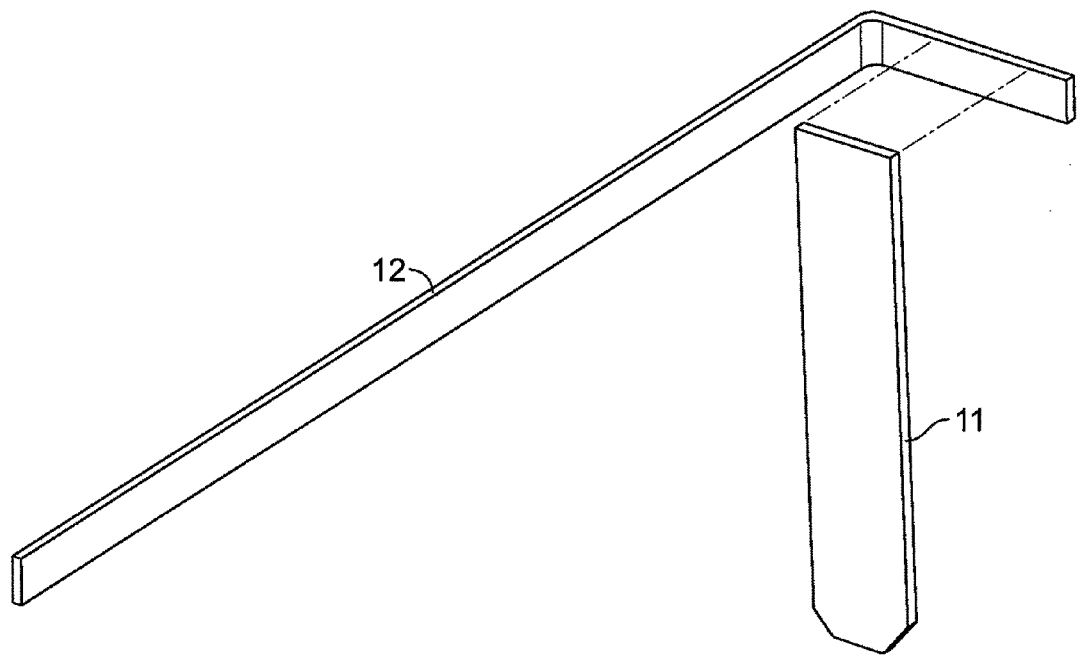
Figure 2C:
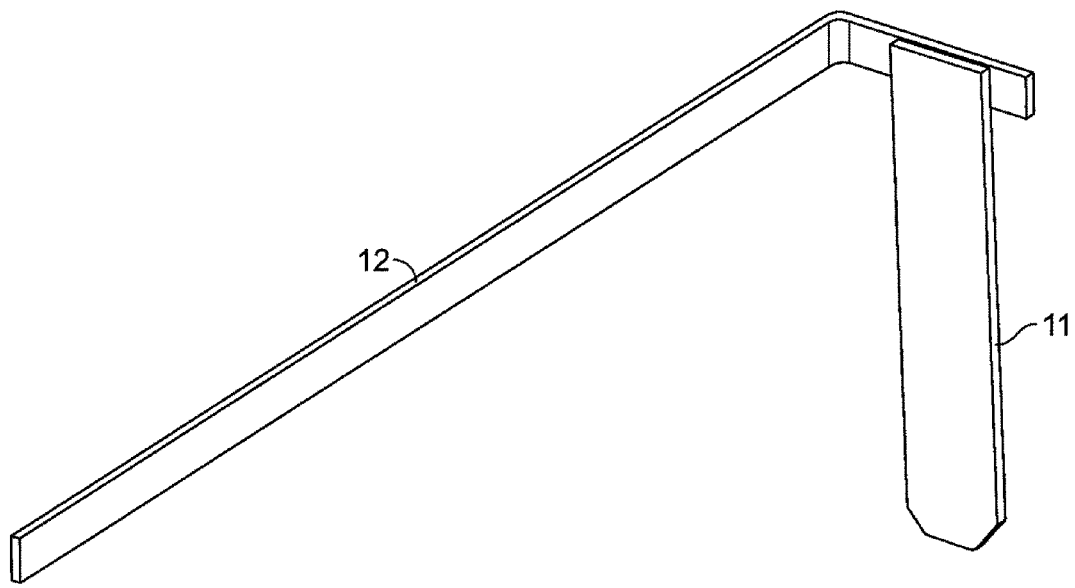

Referring now to FIG. 2A, primary strip 12 may be cut to a preselected length along a first direction to provide for attachment of the device interface buss 13. The length and orientation of the primary strip 12 may be selected to contribute to the final electrical device layout to the modular power distribution center. FIG. 2B shows one embodiment of a positive battery terminal 11 being connected to a portion of the primary strip 12. The positive battery terminal 11 is connected to the positive terminal of the power supply and distributes power to the modular power distribution center which, in this example, comprises a network of conductive paths having at least a first and a second In/Out (I/O) connection such as at least one or more printed circuit boards adapted to be coupled to an electrical device having at least two terminals. In one example, the connection between the primary strip 12 and the positive battery terminal 11 may be by a mechanical connection. FIG. 2C shows a primary bus sub-assembly including the positive battery terminal 11 mechanically connected to the primary strip 12. In another embodiment (see, e.g., FIG. 5D), the power buss is not a separate part of the printed circuit board but is integral with and designed to be incorporated into the conductive routing of the printed circuit board.

Figure 3A:
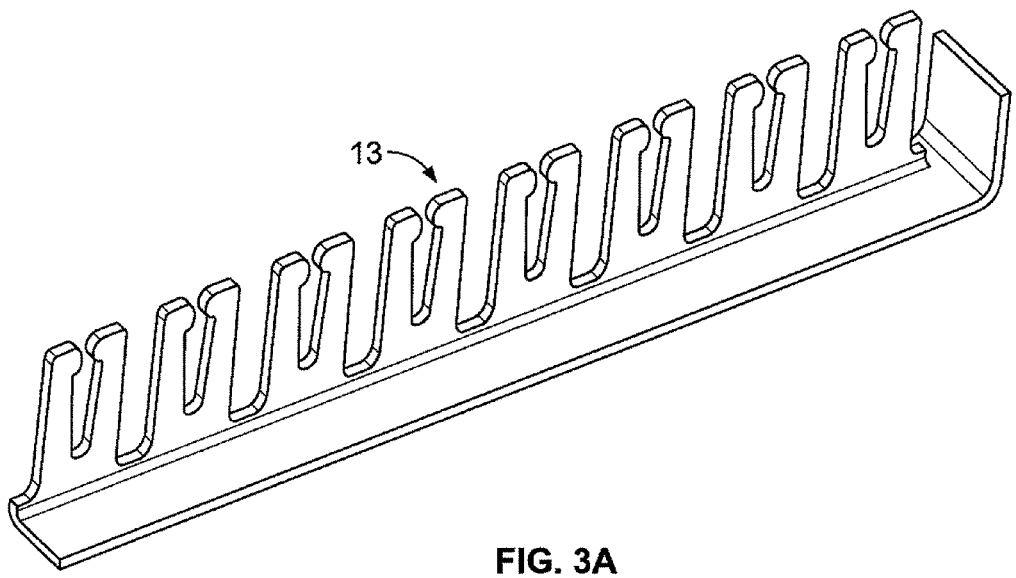
FIGS. 3A-3C are perspective views of an interface buss primary strip (also sometimes referred to as a device interface buss) according to embodiments of the present invention.
Figure 3B:
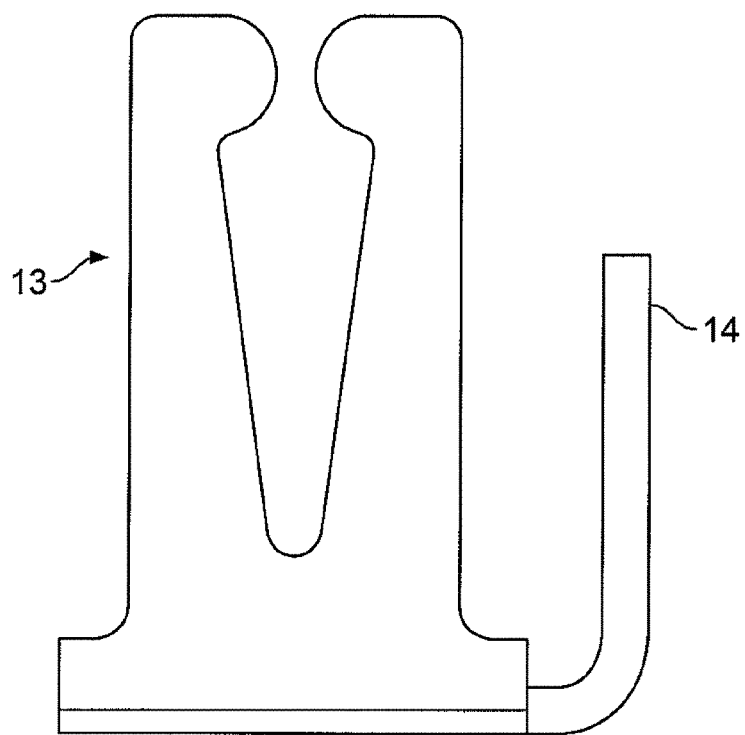

Referring now to FIGS. 3A-3B, these Figures show embodiments of device interface buss 13. The device interface buss 13 provides sites for electrical engagement to electrical devices. FIG. 3A depicts one embodiment of a device interface bus 13 configured to provide connections to 280 series electrical devices. In one embodiment, the device interface buss 13 may be configured for engagement to 280 series devices and may have a length sufficient to provide for the number of devices which are to be received. The 280 series devices are devices which are manufactured by various companies, one of which is Omron Automotive Electronics, Inc. Such 280 series devices have male terminals of a conductive material which are approximately 2.8 mm in width, 0.8 mm thickness and a length which is suitable for making an electrical connection. The standard array, or pattern of the terminals on the devices typically conform to 7.8 mm by 8.1 mm. where the long axis of the terminal is aligned in the 7.8 mm dimension and the short axis in the 8.1 mm dimension. In one example, ten positions for device engagement are provided, it being understood, however, that the number of positions can be increased or decreased (as desired) such as to satisfy a predetermined device layout by using variable strip width tooling. The device interface buss 13 of this example is disposed along a direction substantially perpendicular to the direction of the primary strip 12.

Figure 3C:
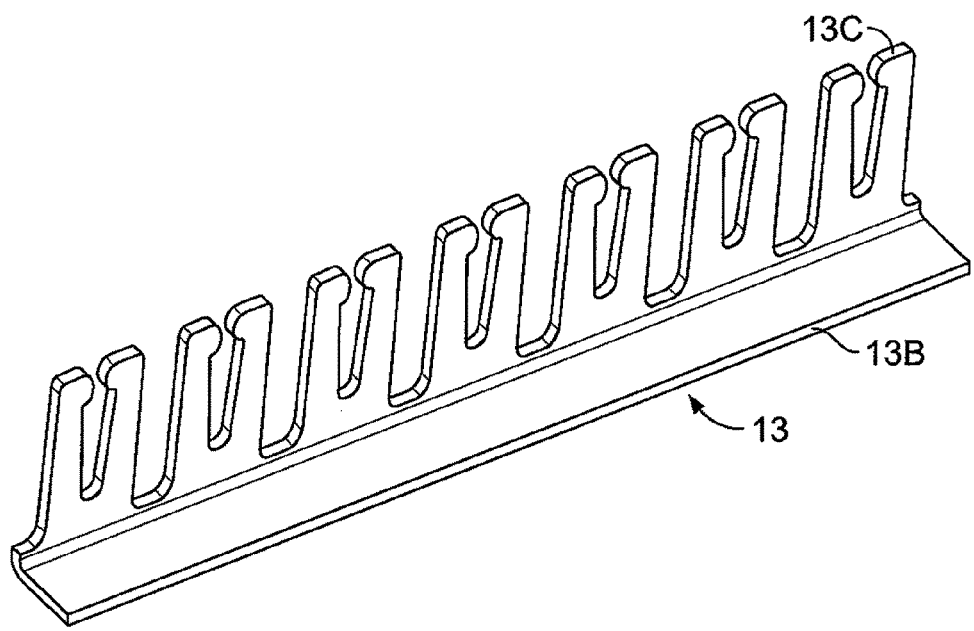

The device interface buss 13 may be configured for mechanical connection to the primary strip 12. FIG. 3B shows a device interface buss 13 having a flag end 14, where the flag end 14 is overlapped against the primary strip 12 to provide a mechanical connection between the device interface buss 13 and the primary strip 12. Although device interface buss 13 having flag end portion 14 is shown, a flagless device interface buss could be used and is within the scope of the present invention. Referring to FIG. 3C, the flagless device interface buss 13B of this example may have from two to fifteen or more positions 13C for electrical device connections.

Figure 3D:
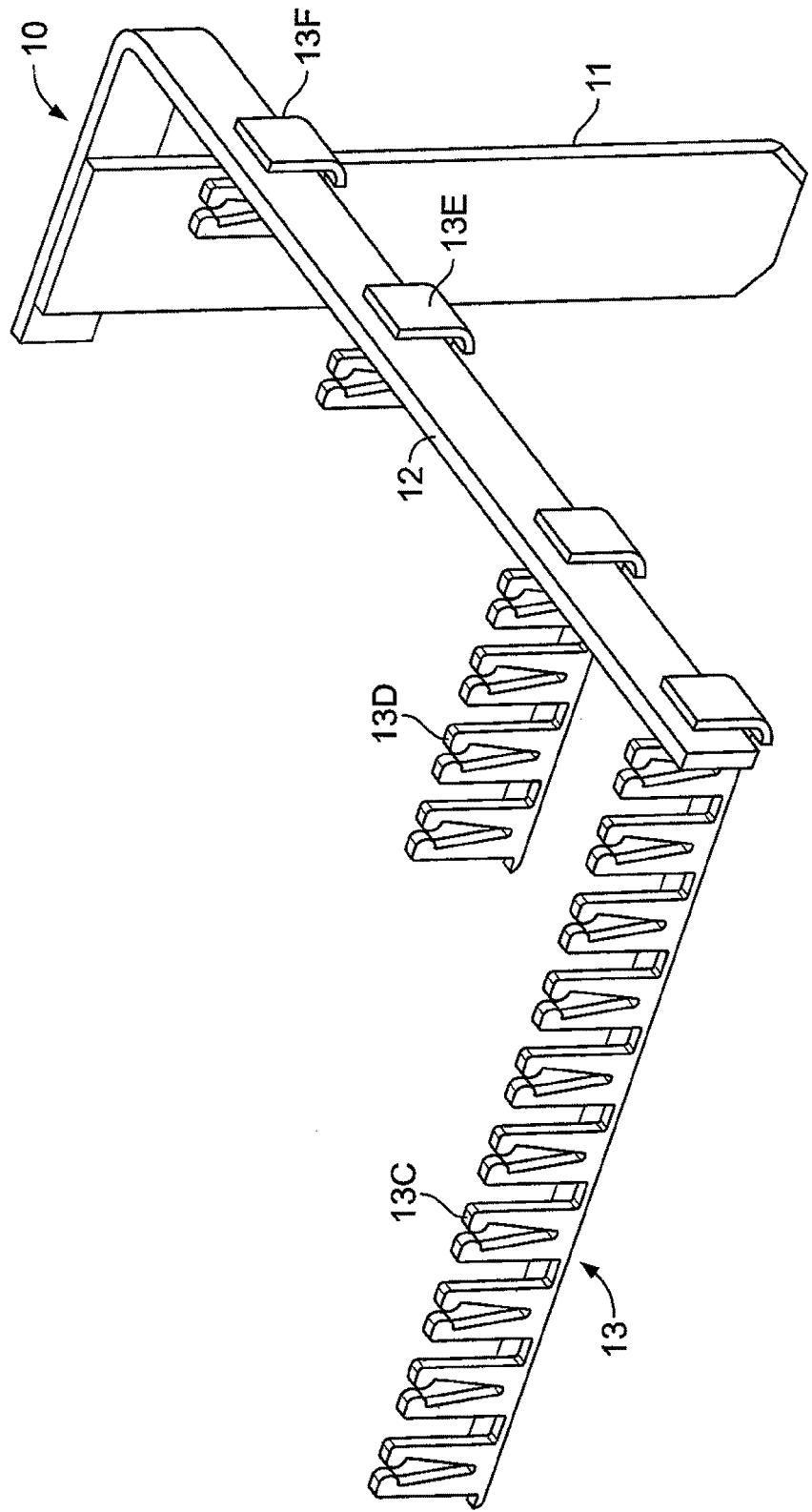

FIG. 3D shows a primary buss assembly including battery positive terminal 11, primary strip 12, and device interface buss 13. The number, geometry and length of the device interface buss 13 (which number, geometry and length may be as desired), in combination with the length and geometry of the primary strip 12 (which geometry and length may be as desired), provides the layout for electrical device connections to the power distribution center. The primary buss assembly of this example includes four device interface busses 13C, 13D, 13E, 13F connected to the primary strip 12, where the device interface buss includes, for example, ten (more or less) positions for electrical device connections 13C, four (more or less) positions for electrical device connections 13D and one (more or less) position for electrical device connections 13E, 13F. It is noted that the primary buss assembly shown in FIG. 3D is provided for illustrative purposes only as other configurations have been contemplated and are within the scope of the present invention (e.g., each device interface buss may have any desired number of positions for electrical device connections and any desired number of device interface busses may be used).

The mechanical connection of the device interface buss 13 and the positive battery terminal 11 to the primary strip 12 can be provided, for example, by a deformation joint, such as an integral rivet formed between the primary strip 12 and the device interface buss 13 or the positive battery terminal 11. In one example, the connection of the device interface buss 13 and the positive battery terminal 11 to the primary strip 12 may be accomplished by a system know in the art as TOG—L—LOC (a trademark of BTM Corp. of Marysville, Mich.).

Figure 4A:
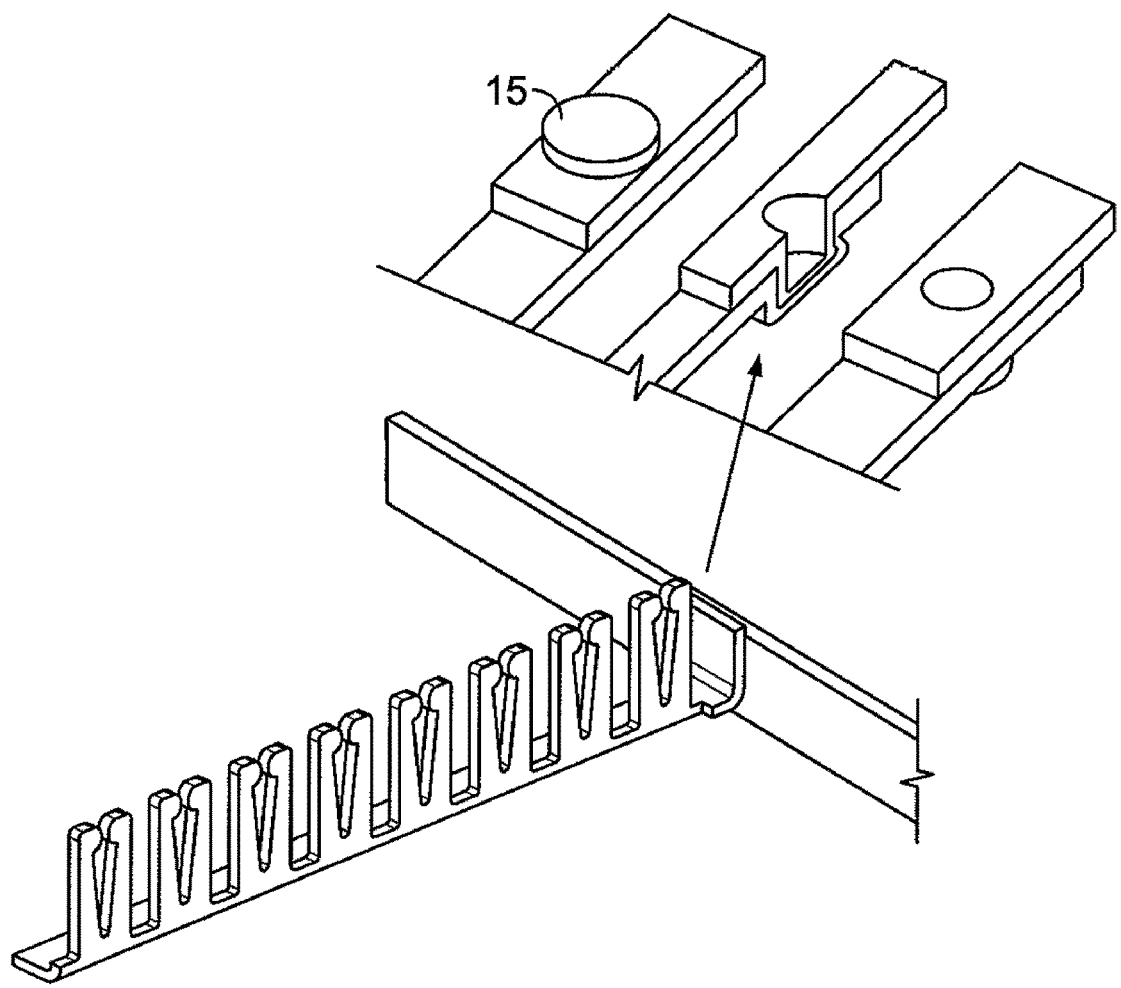
FIG. 4A is a perspective view of an integral rivet according to an embodiment of the present invention.
Figure 4B:
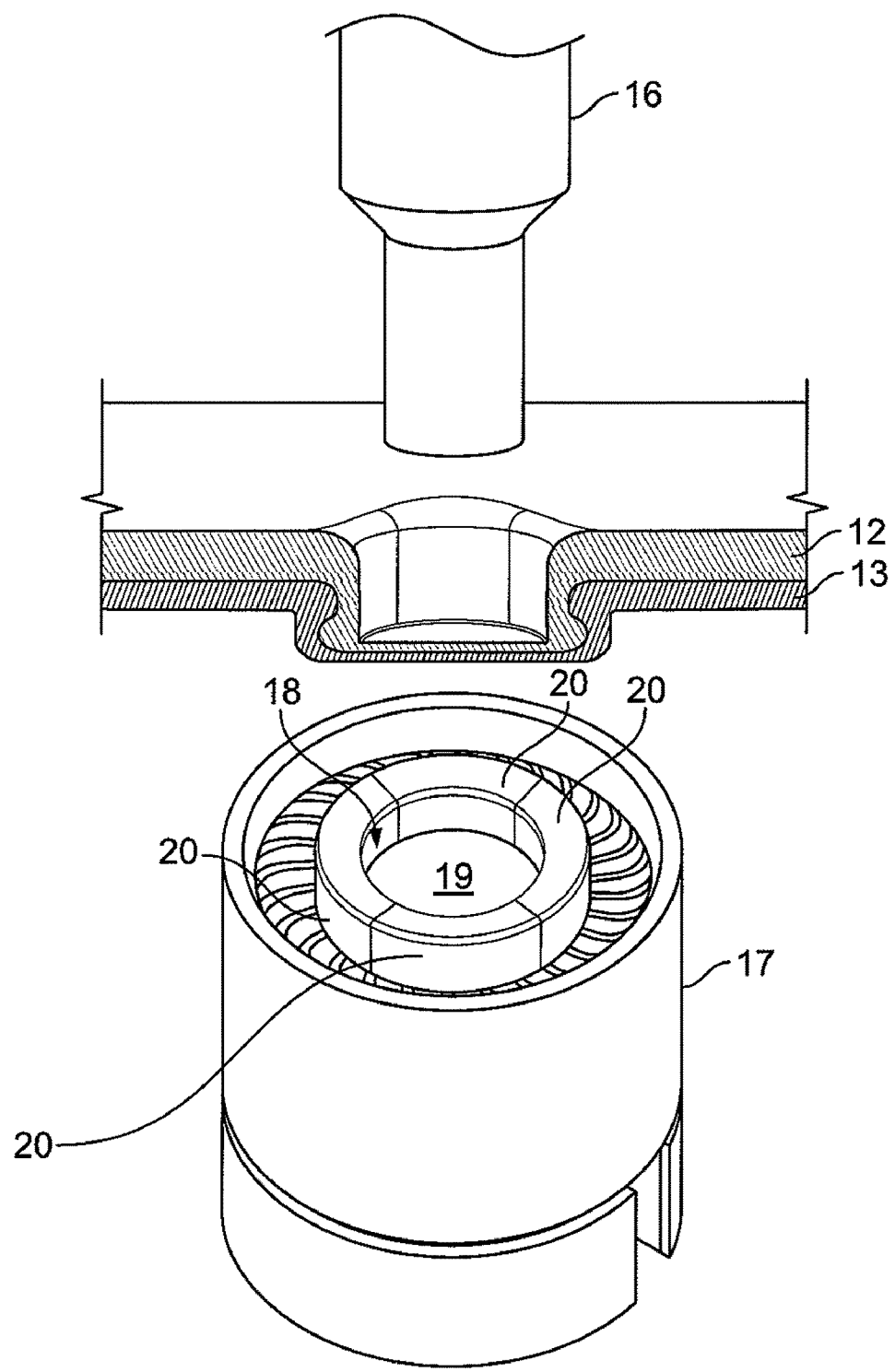
FIG. 4B is a perspective view of a tool and die tool set for forming an integral rivet between a primary strip and a device interface buss or positive battery terminal according to an embodiment of the present invention.
Figure 4E:
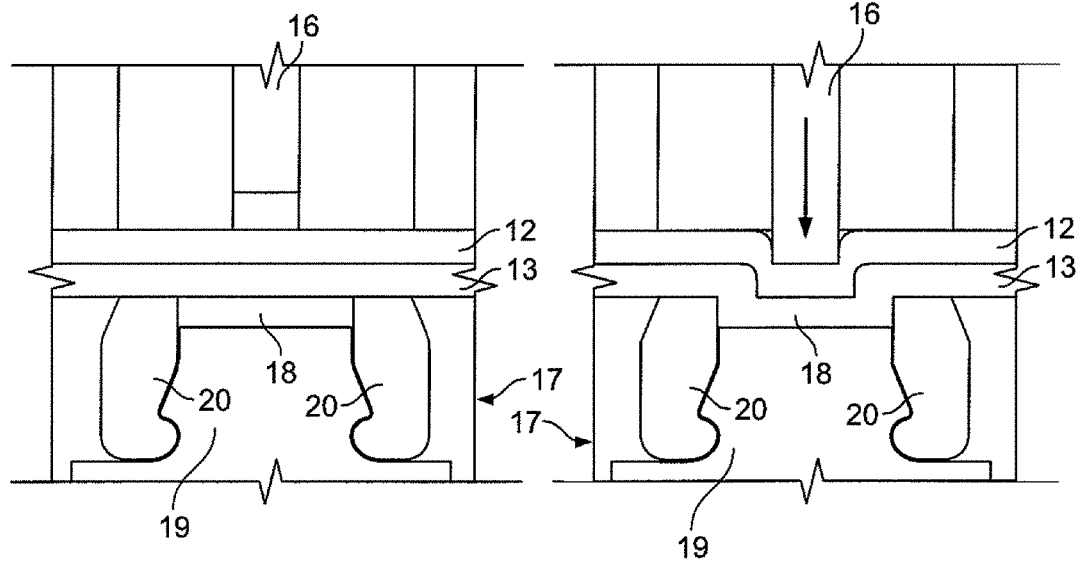
Figure 4E:
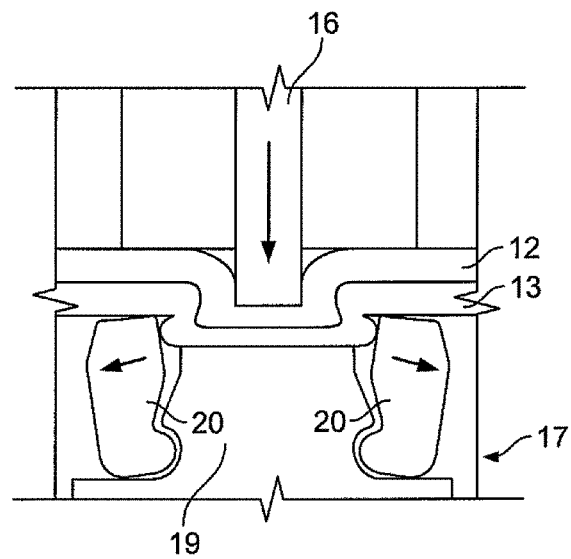

One example of an integral rivet 15 is shown in FIG. 4A. The integral rivet 15 may be provided by a punch 16 and die tool 17, as shown in FIG. 4B. In one example, the punch 16 and die 17 work surfaces may be configured to form a cup-shaped rivet between the metal surfaces of the primary strip 12 and the device interface buss 13 or the positive battery terminal 11. A more detailed description of a punch and die tool set that is suitable for providing the integral rivet 15 may be found in U.S. Pat. No. 4,757,608, titled "Apparatus for joining sheet material" and U.S. Pat. No. 4,459,735, titled "Joining sheet metal".

The formation of the integral rivet 15 between the primary strip 12 and the device interface buss 13 or positive battery terminal 11 by a punch and die tool, such as shown in FIG. 4B, is described in more detail with reference to FIGS. 4C-4D. Referring to FIG. 4C, the primary strip 12 and the device interface buss 13 or positive battery terminal 11 are first positioned in overlapping fashion between the punch 16 and the die 17. The die 17 is positioning against one outside face of the overlapping metal including a cavity 18 defined by an anvil 19 forming the bottom surface of the cavity 18 (see, e.g., FIG. 4C) and by opposed laterally expansible side wall members 20. Referring to FIG. 4C, in a next step the punch 16 draws the metals 12,13 into the cavity 18 of the die 17. Referring to FIG. 4D, the punch 16 then squeezes the bottom of the drawn section laterally extruding the material to be joined into an enlarged shape that mechanically interlock the pieces. The die 17 is configured to provide laterally expandable side wall members 20 that are resiliently biased toward one another and pivot or slide laterally in response to lateral extrusion of the joining material. If desired, other known joining operations can be used such as welding, riveting, terminal type connections, etc.

Figure 4F:
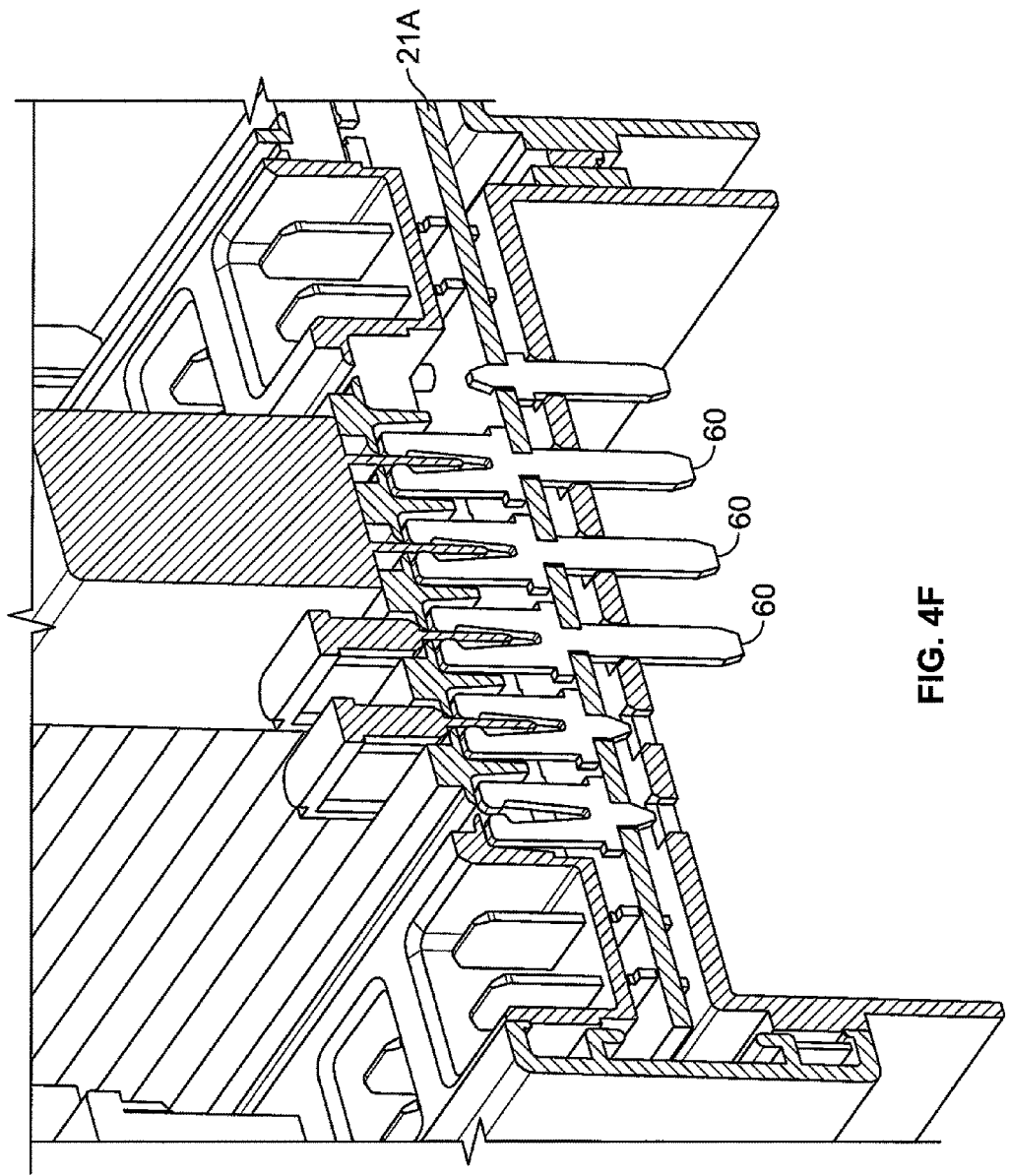
FIG. 4F is a perspective sectional view of a modular power distribution center with pass through terminals 60 coupled to a printed circuit board according to an embodiment of the present invention.
Figure 4G:
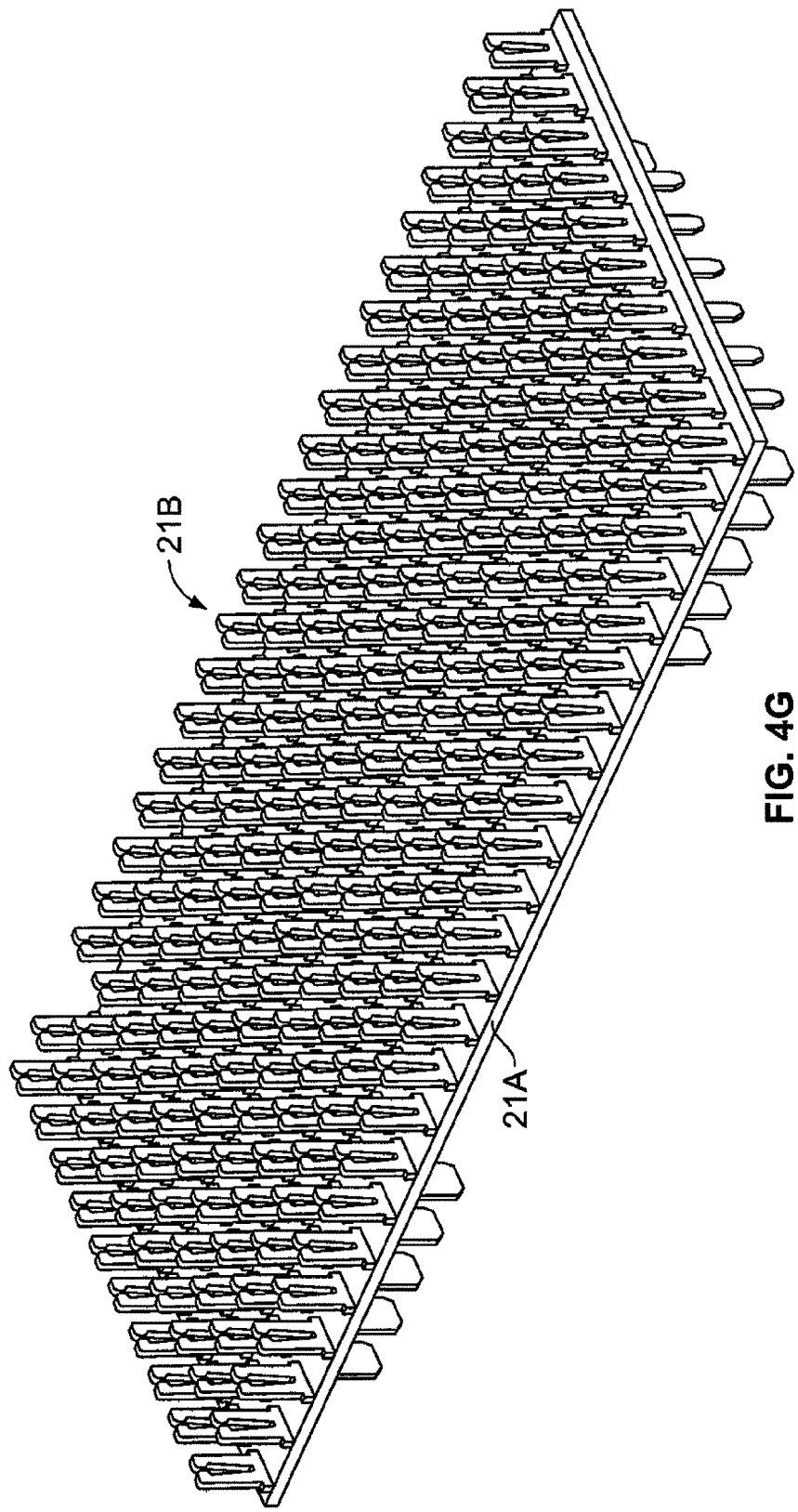
FIG. 4G is a perspective view of the top of the single printed circuit board of FIG. 4F.
Figure 4H:
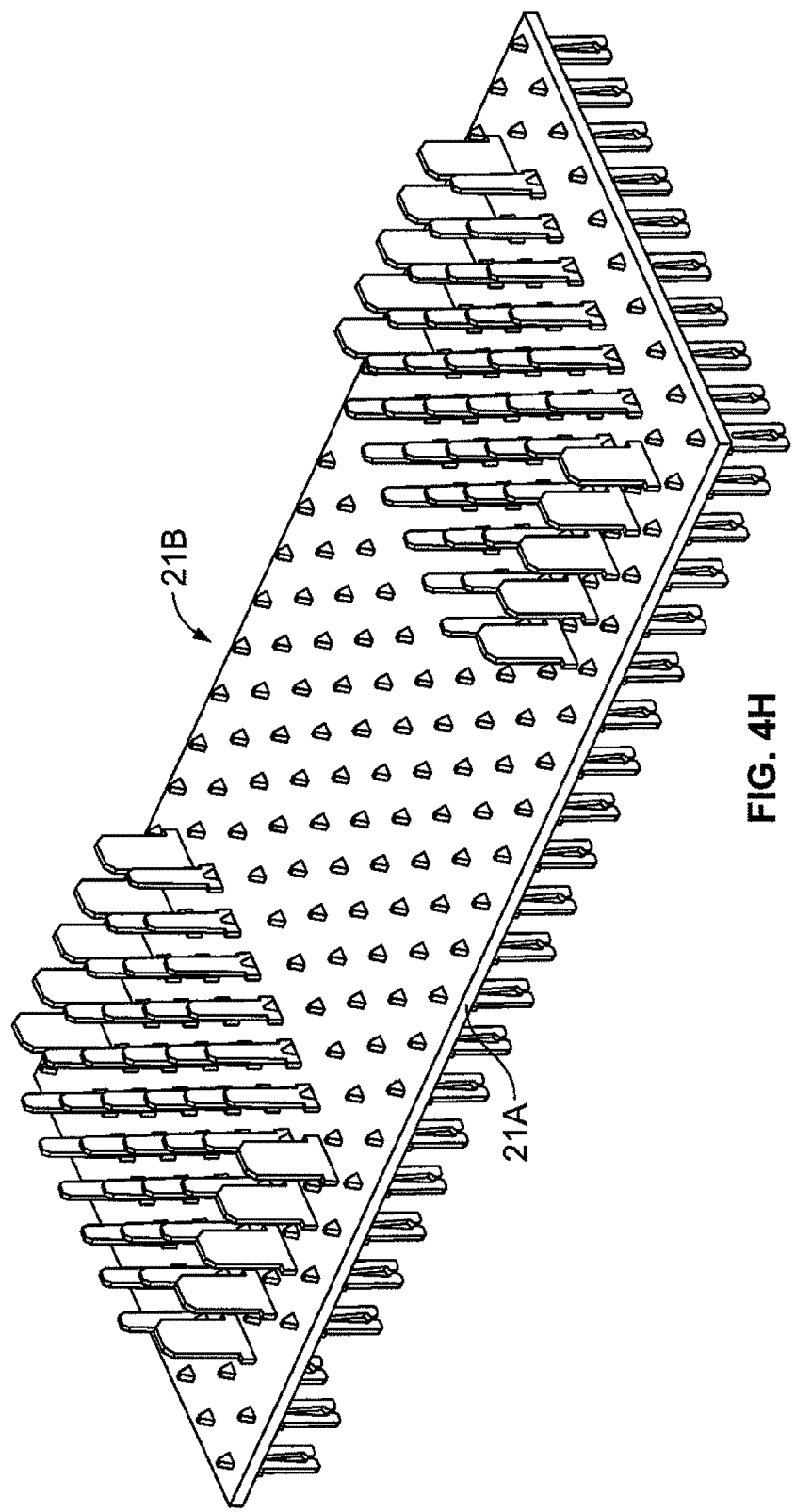
FIG. 4H is a perspective view of the bottom of the single printed circuit board of FIG. 4F.

In one embodiment the network of conductive paths may comprise two printed circuit boards 23, 24 which are electrically connected together (see, e.g., FIGS. 5A-5D). In another embodiment (see, e.g., FIGS. 4F, 4G, and 4H), in place of two printed circuit boards 23, 24, a single printed circuit board 21A having at least one primary buss integrated into the printed circuit board 21A may be utilized. With the embodiment of a single printed circuit board 21A, copper stampings are not required, mechanical fastening of buss bars are not required, pass through terminals can now be used, interconnect pins (52 in FIG. 5A) are not required, and a reduction of up to forty percent of the terminals needed may be obtained. FIG. 4F shows a perspective sectional view of a modular power distribution center with pass through terminals 60 coupled to the printed circuit board 21A. FIG. 4G is a perspective view of the top of the printed circuit board assembly 21B; and FIG. 4H is a perspective view of the bottom of the printed circuit board assembly 21B.

FIGS. 5A-5D show two printed circuit boards 23, 24 for use with a modular power distribution center. The printed circuit boards 23, 24 may comprise conductive circuit paths which distribute power to electrical systems.

Figure 5A:
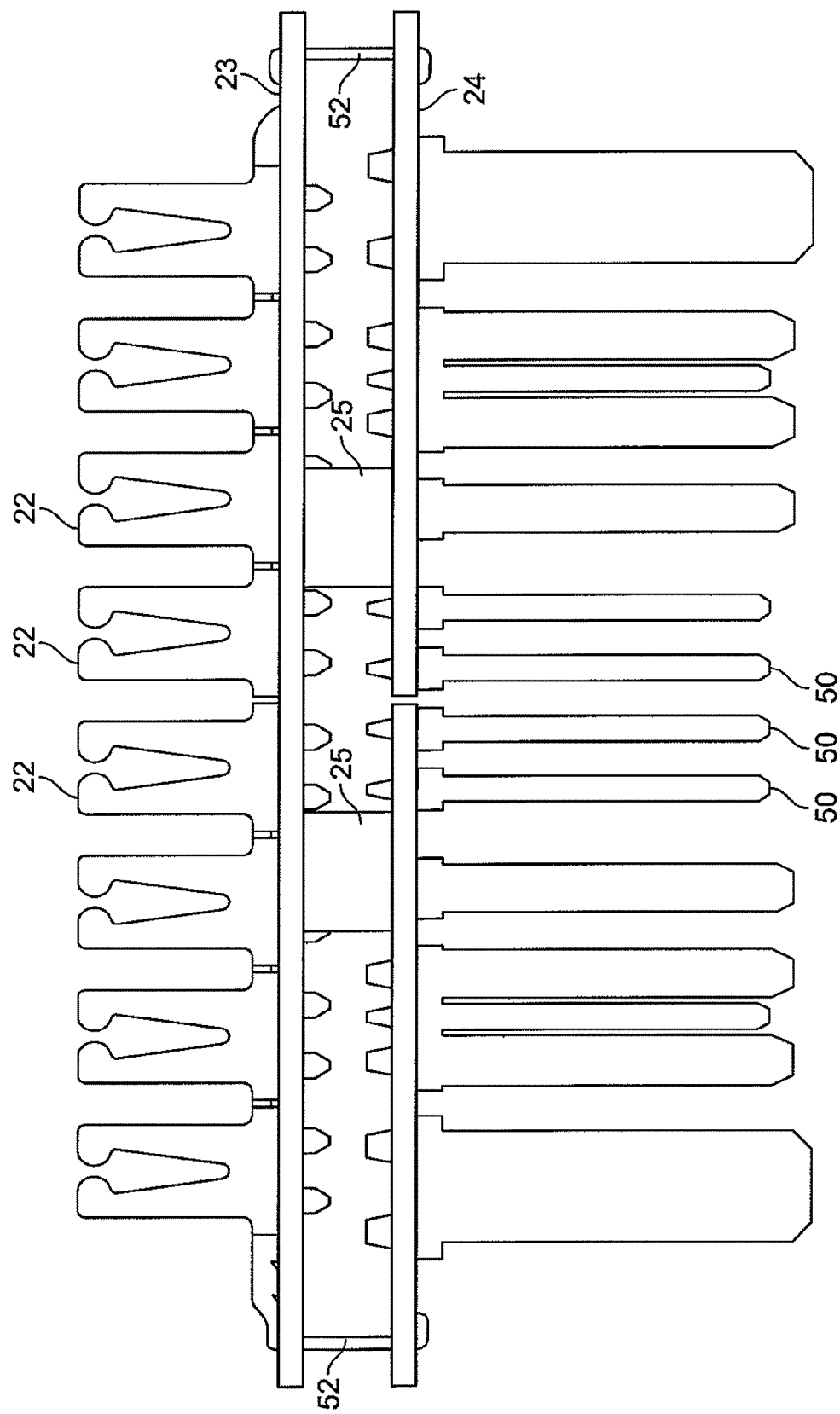
FIG. 5A is a side cross sectional view of multiple printed circuit boards of a power distribution center according to an embodiment of the present invention.

Referring now to FIG. 5A, the printed circuit board 24 may comprise male blade terminals 50 that provide input and output connections (also sometimes referred to as I/O connections) from the modular power distribution center to the electrical systems. In one example, blade terminals may be formed of any conductive material (e.g., copper or aluminum). The modular power buss may be connected to the two printed circuit boards 24, 23 and may also be connected to at least one fork terminal 22. Fork terminals 22 may be provided to interface with components which are designed into a circuit in the power distribution center.

Figure 5B:
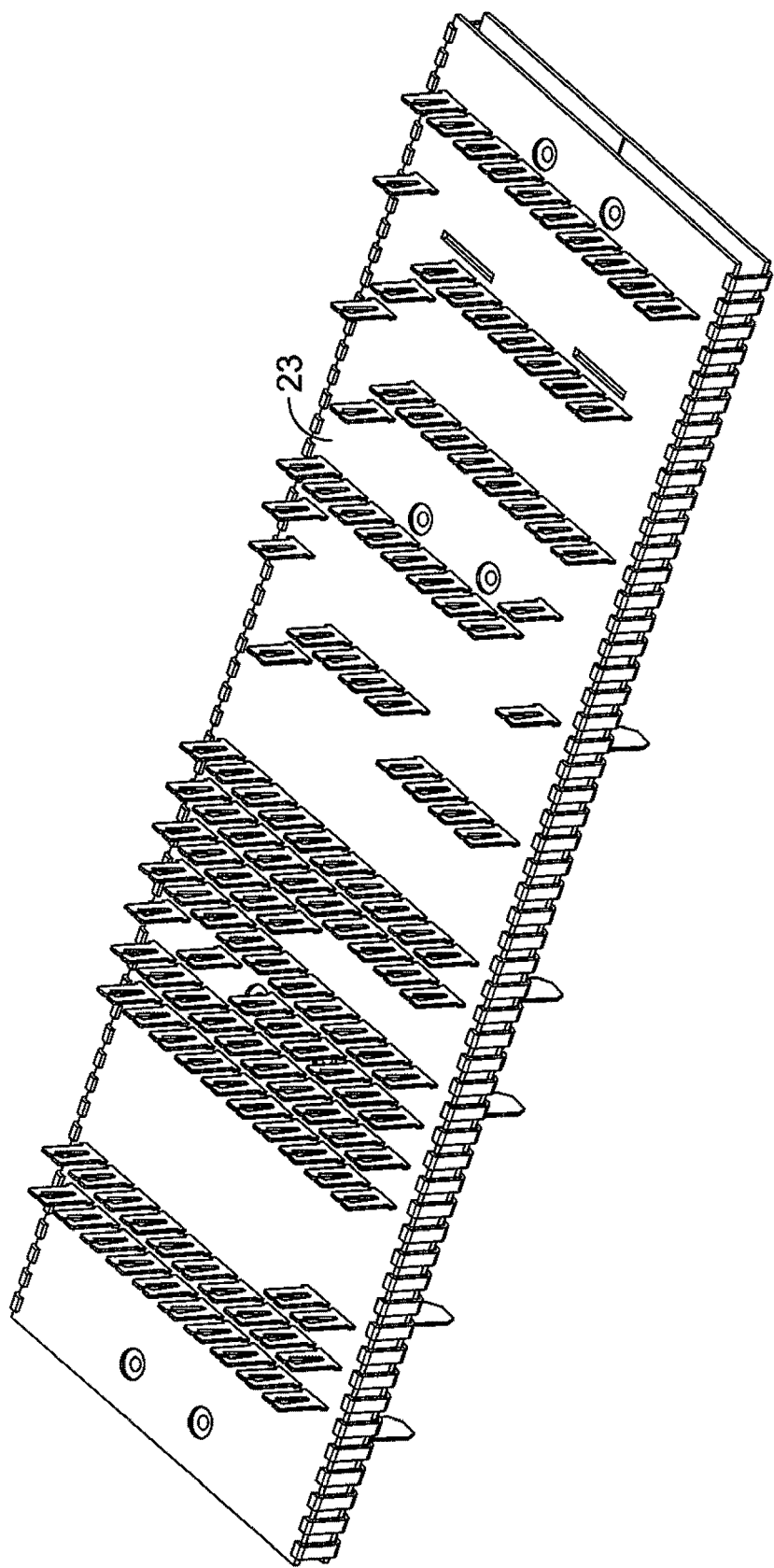
FIG. 5B is a perspective view of the top of the upper printed circuit board of the power distribution center of FIG. 5A.
Figure 5C:
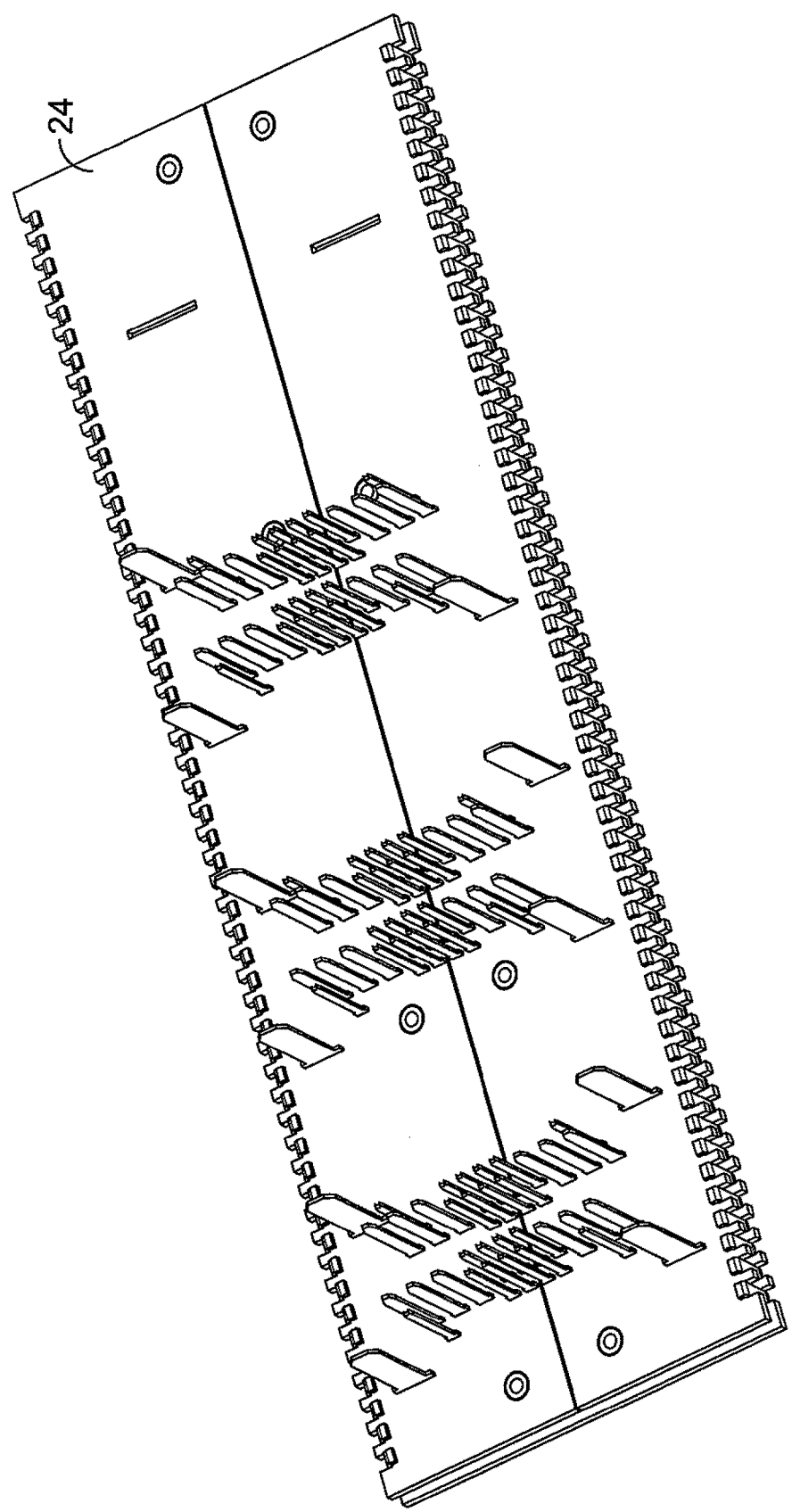
FIG. 5C is a perspective view of the bottom of the lower printed circuit board of the power distribution center of FIG. 5A.
Figure 5D:
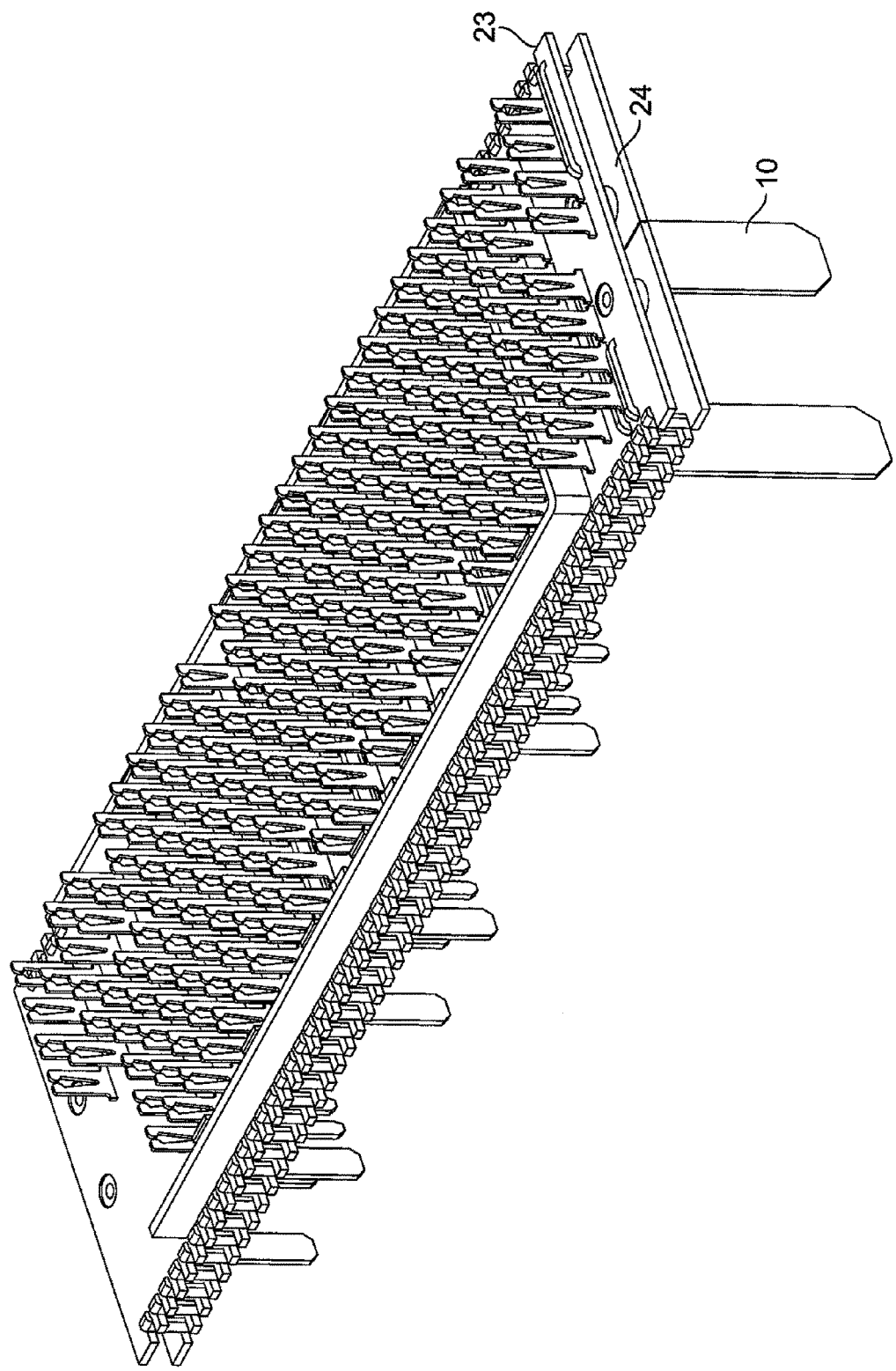
FIG. 5D is a perspective view of an assembly of the printed circuit boards and modular bussing of FIG. 5A.
Figure 5E:
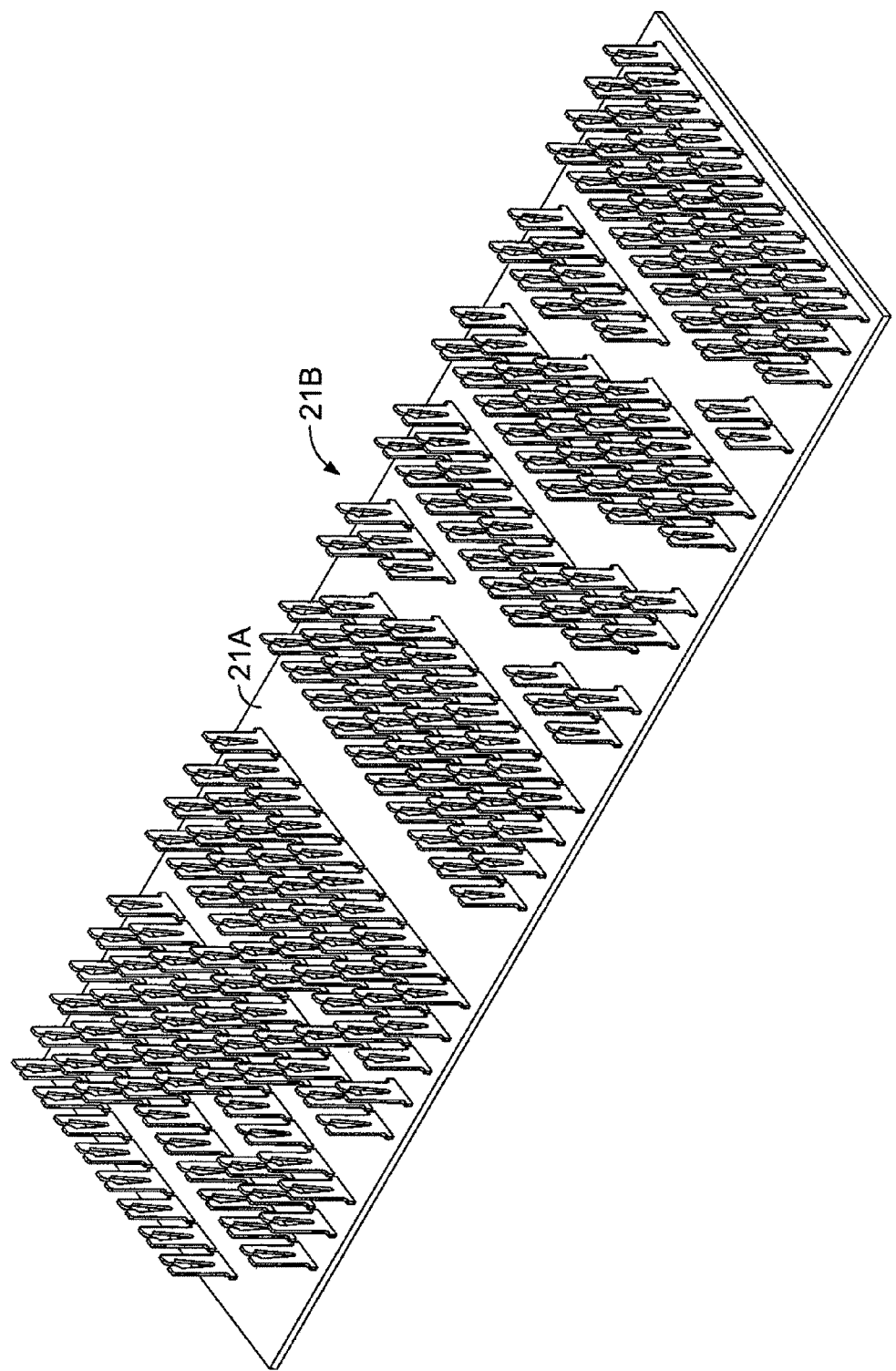
FIG. 5E is a perspective view of another embodiment of the present invention associated with a power distribution center where only one printed circuit board is used and power is routed through the printed circuit board.

When two printed circuit boards 23, 24 are used in this example, the primary buss distributes power to the upper printed circuit board 23 and electrical connections between the electrical devices and electrical systems, e.g., connections between fuses and I/O connections, are provided by the lower printed circuit board 24, where the lower printed circuit board 24 and the upper circuit board 23 are connected together electrically. The upper printed circuit board 23 and the lower printed circuit board 24 may be mechanically connected and separated by a spacer 25. FIG. 5B shows an upper planar view of the printed circuit board 23 of the power distribution center according to this embodiment; FIG. 5C shows a lower planar view of the printed circuit board 24 of the power distribution center of this embodiment; and FIG. 5D is a perspective view of an assemblage of the upper and lower printed circuit boards 23, 24 and the modular power buss 10. FIG. 5E is a perspective view of the embodiment of the power distribution center where only one printed circuit board 21A is used and power is routed through the printed circuit board.

With either of the two embodiments discussed above, the first being the use of two printed circuit boards 23, 24 and the second being the use of a single printed circuit board 21A, bussing of power can be provided, for example, primarily through a series of stamped copper buss bars or power can be routed only through the printed circuit boards. There is no limitation for each embodiment as to how the power is routed.

However, the two embodiments discussed above have advantages which differ. For example, with the first embodiment (i.e., two printed circuit boards), the buss bars and fork terminals are connected with a mechanical joint, such as Tog-L-Loc, using dedicated tooling; and, battery power buss bars are connected to the main buss bars with a resistance weld. With the second embodiment (i.e., one printed circuit board), mechanical fastening of buss bars is not required.

During assembly, with the first embodiment (i.e., two printed circuit boards), mechanical joints (e.g. Tog-L-Loc), resistance welds, and soldering to the printed circuit board and interconnect pins 52 can be time consuming and difficult. With the second embodiment (i.e., one printed circuit board), the printed circuit board assembly 21B does not require interconnect pins and associated soldering, or any manufacturing processes associated with buss bars.

With the first embodiment (i.e., two printed circuit boards), pass through terminals are not used. Typical routing includes input of battery power from a stud or connector, distributed through a buss bar, through a fork terminal to the plug-in device (e.g., fuse or relay), through a fork terminal to the upper printed circuit board 23, upper printed circuit board trace to an interconnect pin, down through the interconnect pin 52, through a trace on the lower printed circuit board 24 to the output connector blade. With the second embodiment (i.e., one printed circuit board), pass through terminals are used. Typical routing includes input of battery power through a printed circuit board mounted stud, through a printed circuit board trace to a fork terminal, through the plug-in device (e.g., fuse of relay), and down through the pass through terminal to the output connector. In some applications the pass through terminal may be mechanically and/or electrically connected to the printed circuit board in order to send current to another device or pin. An electrical connection to the printed circuit board can be by, but not limited to, soldering, mechanical contact with another terminal or mechanical contact with the printed circuit board conductive material. In another application where the pass through terminal may be used to assist in assembly or function as a terminal, the pass through terminal may be physically mounted to and only contact the non-conductive material of the printed circuit board.

With the first embodiment which utilizes two printed circuit boards 23, 24, Tyco 4-way connectors or any other connectors which satisfy the requirements for the outputs in the entire power distribution center design may be used. The second embodiment can use any connector which satisfies the requirements for the outputs in the entire power distribution center design. However, because the second embodiment has only one printed circuit board 21A, pass through terminals can be used. To obtain the benefit obtained with the use of pass through terminals, the connector used should have the same pitch as the top plate.

With the first embodiment (i.e., two printed circuit boards), interconnect pins 52 are required between the printed circuit boards 23, 24. With the second embodiment (i.e., one printed circuit board), interconnect pins 52 are not required and assembly and manufacture is simplified.

With the first embodiment (i.e., two printed circuit boards), the printed circuit board assembly uses fork terminals, interconnect terminals, and connector blade terminals. With the second embodiment (i.e., one printed circuit board), the printed circuit board assembly uses fork terminals and connector blade terminals. When a pass through terminal is used, the corresponding fork terminal and connector blades terminals are not used. If the height of the assemblage is important, the second embodiment may be considered, because it has only one printed circuit board 21A and does not use interconnect pins 52, the absence of which contributes to a reduction of height.

In one example, the printed circuit board may be connected to electronic devices which may or may not be surface mounted to the printed circuit board.

In another example, connected devices may provide many functions that may include, but not be limited to: the switching of power, protection of devices, diagnostic capability and/or network transmissions over a bus to another module or switch where the network utilized can be, but is not limited to CAN, LIN, BSS, etc. Any of these components can be mounted on one or both printed circuit board (top and/or bottom) of the first embodiment and/or on either side of the printed circuit board of the second embodiment.

Figure 5F:
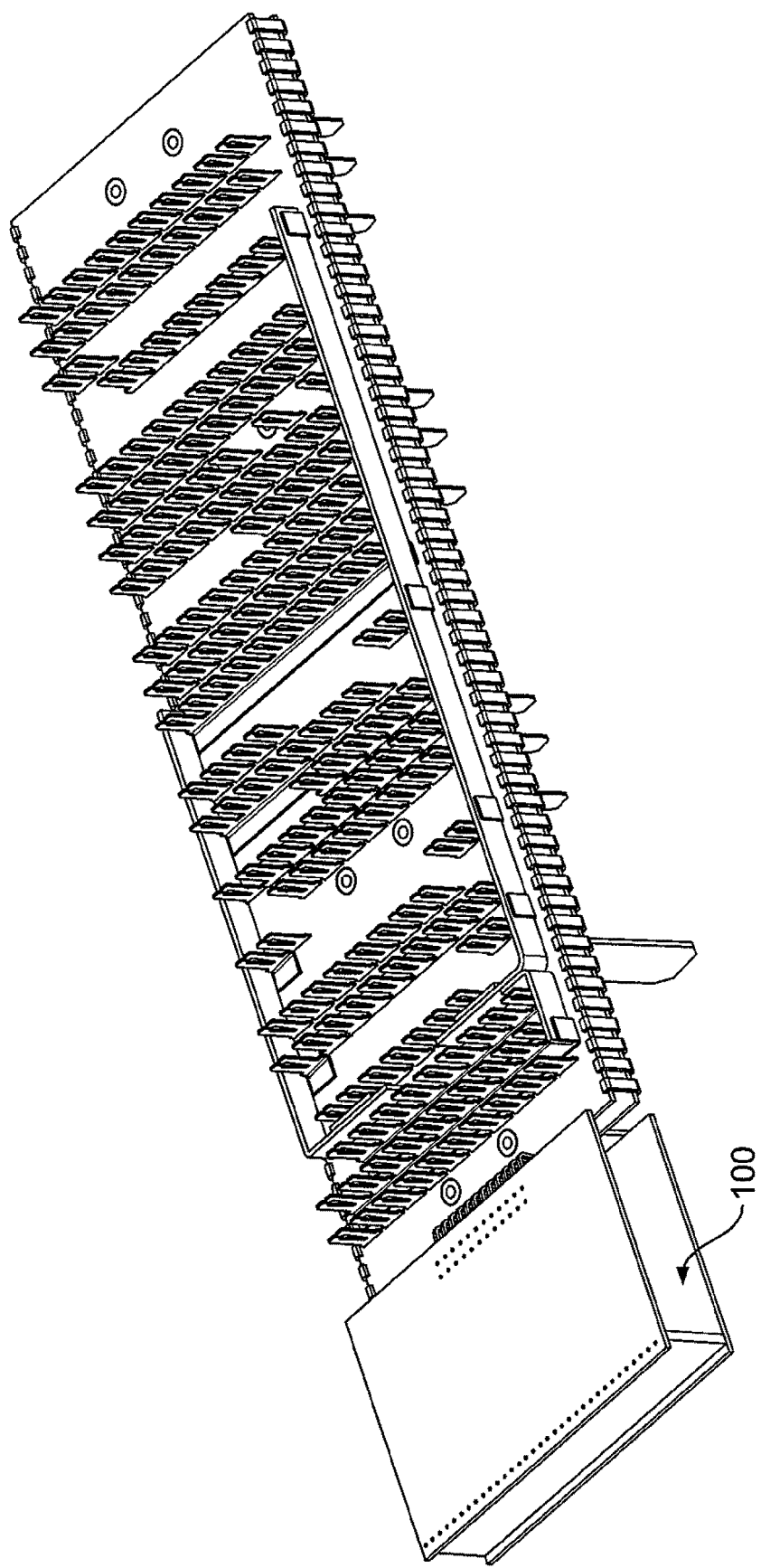
FIG. 5F is a perspective view of another embodiment of the present invention associated with a power distribution center showing a supplemental printed circuit board attached thereto.
Figure 5G:
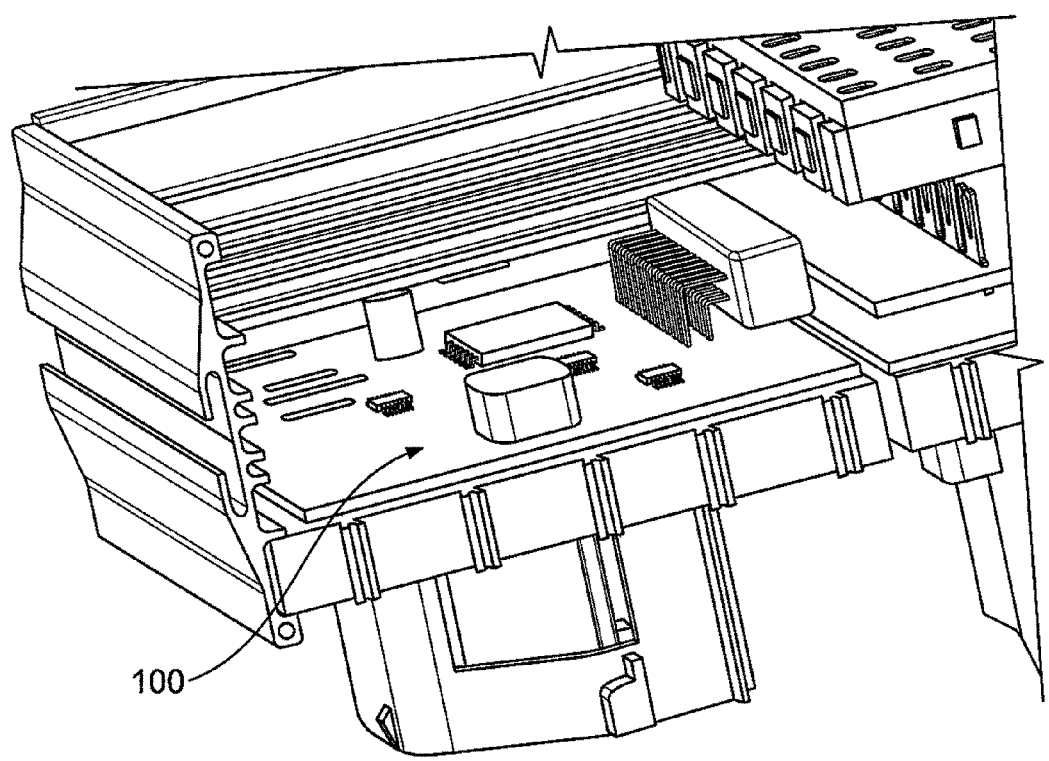
FIG. 5G is an enlarged perspective view of the supplemental printed circuit board of FIG. 5F.

In another embodiment (see, e.g., FIGS. 5F and 5G), components may be mounted on a supplemental circuit board assembly 100 which may be positioned adjacent to a printed circuit board of the first or second embodiment.

Figure 5H:
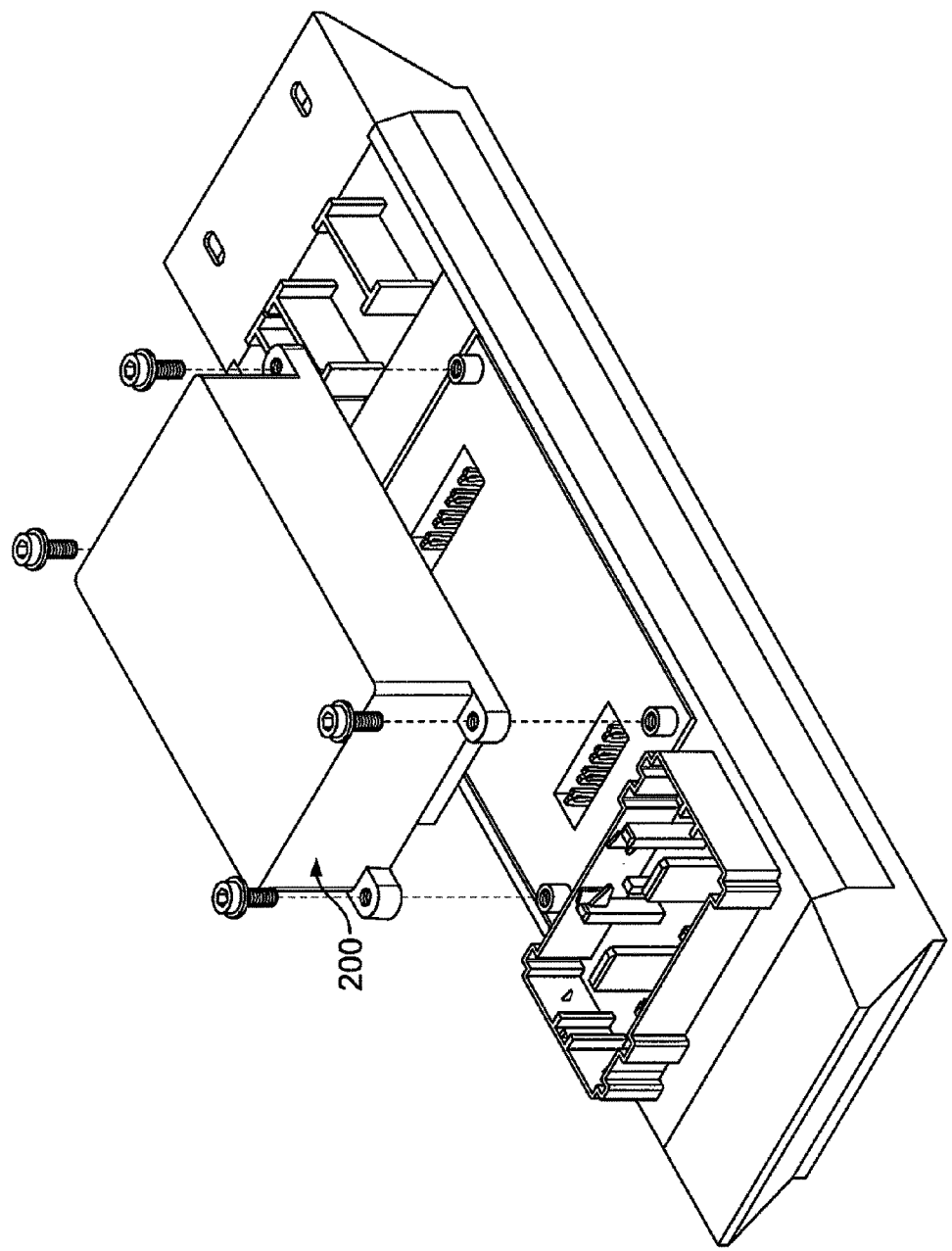
FIG. 5H is a partially exploded perspective view of another embodiment of the present invention associated with a power distribution center with a plug in module.

In another embodiment (see, e.g., FIG. 5H), the power distribution center may have plug-in modules 200 which may be provided to add to the electronic capability of the entire assemblage without being soldered to the printed circuit board of the first or second embodiment.

A modular housing assemblage may encase the modular power buss 10 and the printed circuit boards 23, 24; or the single printed circuit board 21A (shown in FIG. 5E), and the housing may provide receptacle portions for engaging electrical devices and I/O connectors for electrical systems.

Figure 6A:
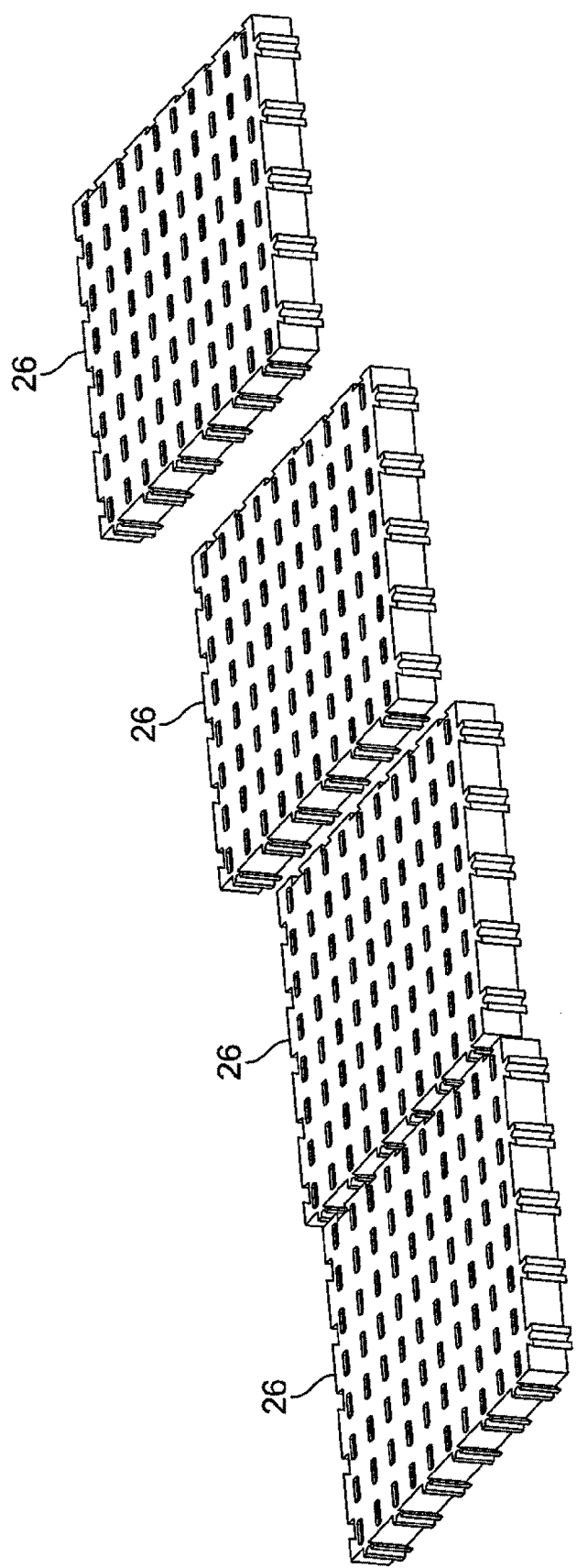
FIGS. 6A-6B are perspective views of a modular upper plate of another embodiment of the present invention (as seen in these views, the modular upper plate has a grid of receptacle portions corresponding to electrical device connection of at least one device interface buss of a modular power distribution center)
Figure 6B:
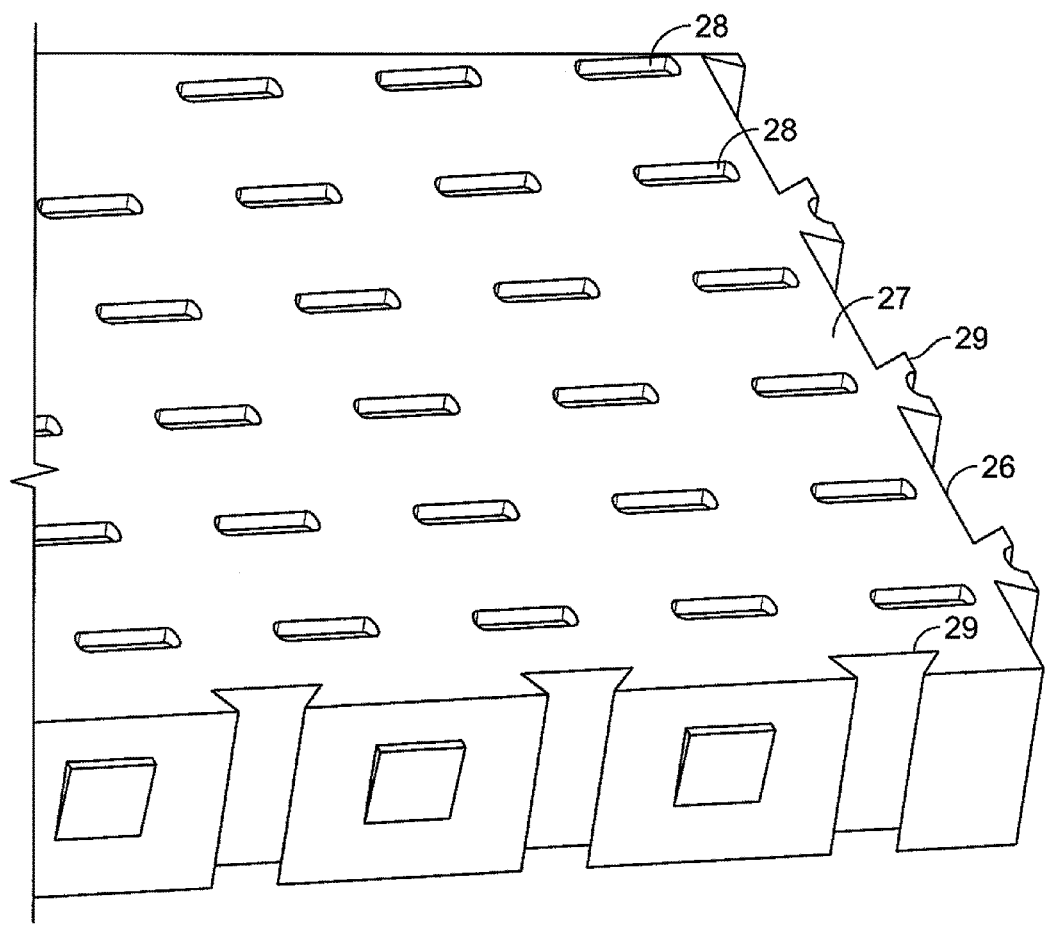

Referring now to FIGS. 6A-6B, the modular housing may comprise an insulating upper face 27 including at least one plate 26 having a grid of receptacle portions 28 defined through the face of the plate 26 that provide sites for electrical connection to the device interface buss 13.

The plates 26 may have dimensions which allow them to be used as repeatable units, where the width and the length of the upper face 27 (of all units) can be adjusted by adding or removing the plates 26 in reversible interlocking fashion to correspond to the required electrical devices and electrical system connector layout, as depicted, for example, in FIG. 6A. In one example, plates may comprise an insulating material such as an insulating plastic. FIG. 6B shows the cavity portions 28 that are formed through the plates 26 of the upper face 27 and which are configured in a grid for receiving the contacts of electrical devices for connection through contacts located in the cavities to the underlying device interface bus. The grid of cavity portions 28 may be configured to receive various electrical devices which can include but are not limited to 280 devices. Thus, the cavity portions 28 in the plates 26 can be configured to receive fuses, relays, etc., either separately or in combination with 280 series components. In one example, the cavities may be spaced to allow a device to bridge a seam between two adjacent plates 26. Thus, under this example, a component such as a fuse which has two blades, may be positioned to span a seam between two adjacent plates 26 where one blade of the fuse is located in a cavity portion 28 on one plate 26 and the other blade of the fuse is located in a cavity portion 28 on an adjacent plate 26.

Figure 8A:
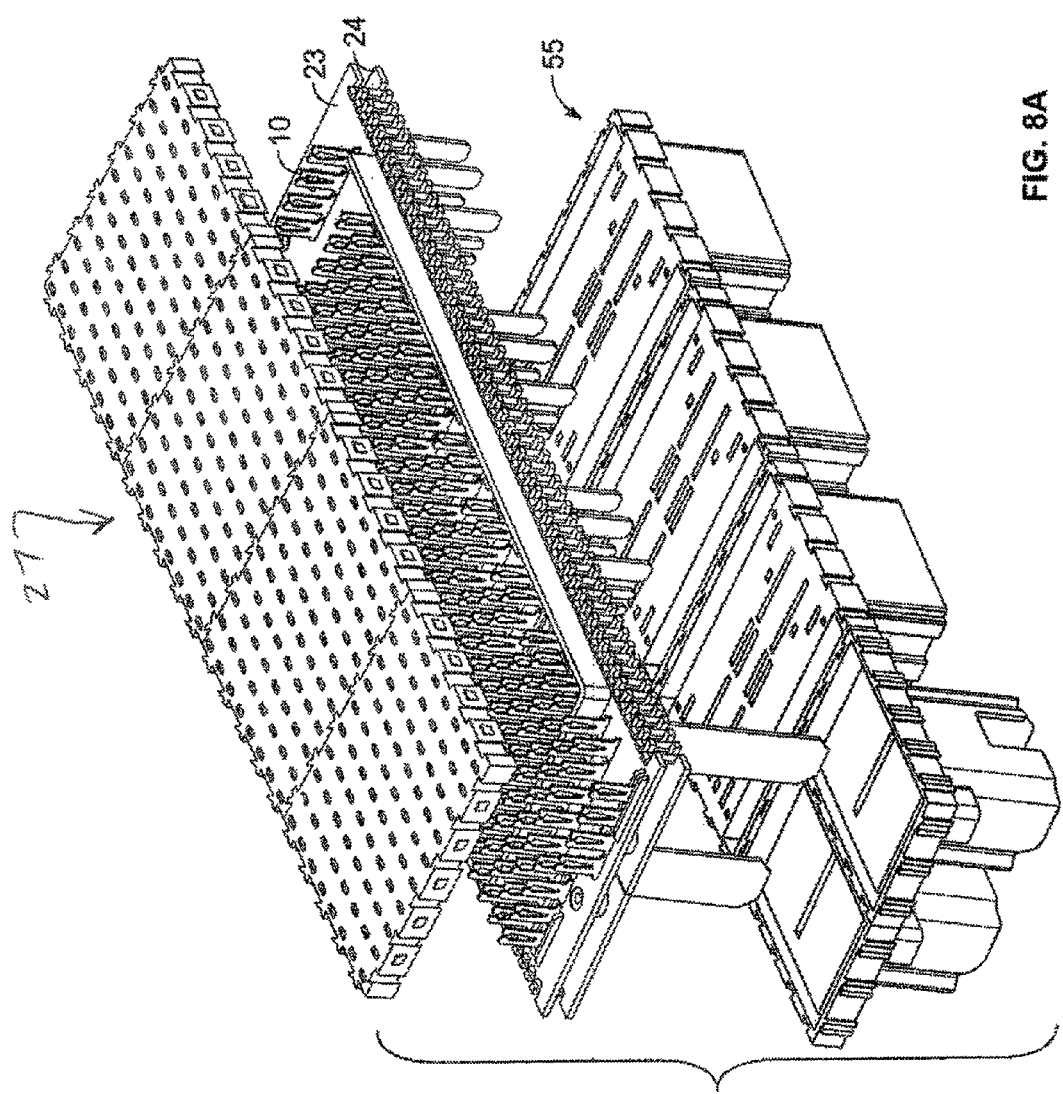
FIGS. 8A and 8B are perspective views of a modular upper plate, a modular lower plate, a modular power buss and printed circuit boards of a modular power distribution center according to an embodiment of the present invention being assembled.
Figure 8B:
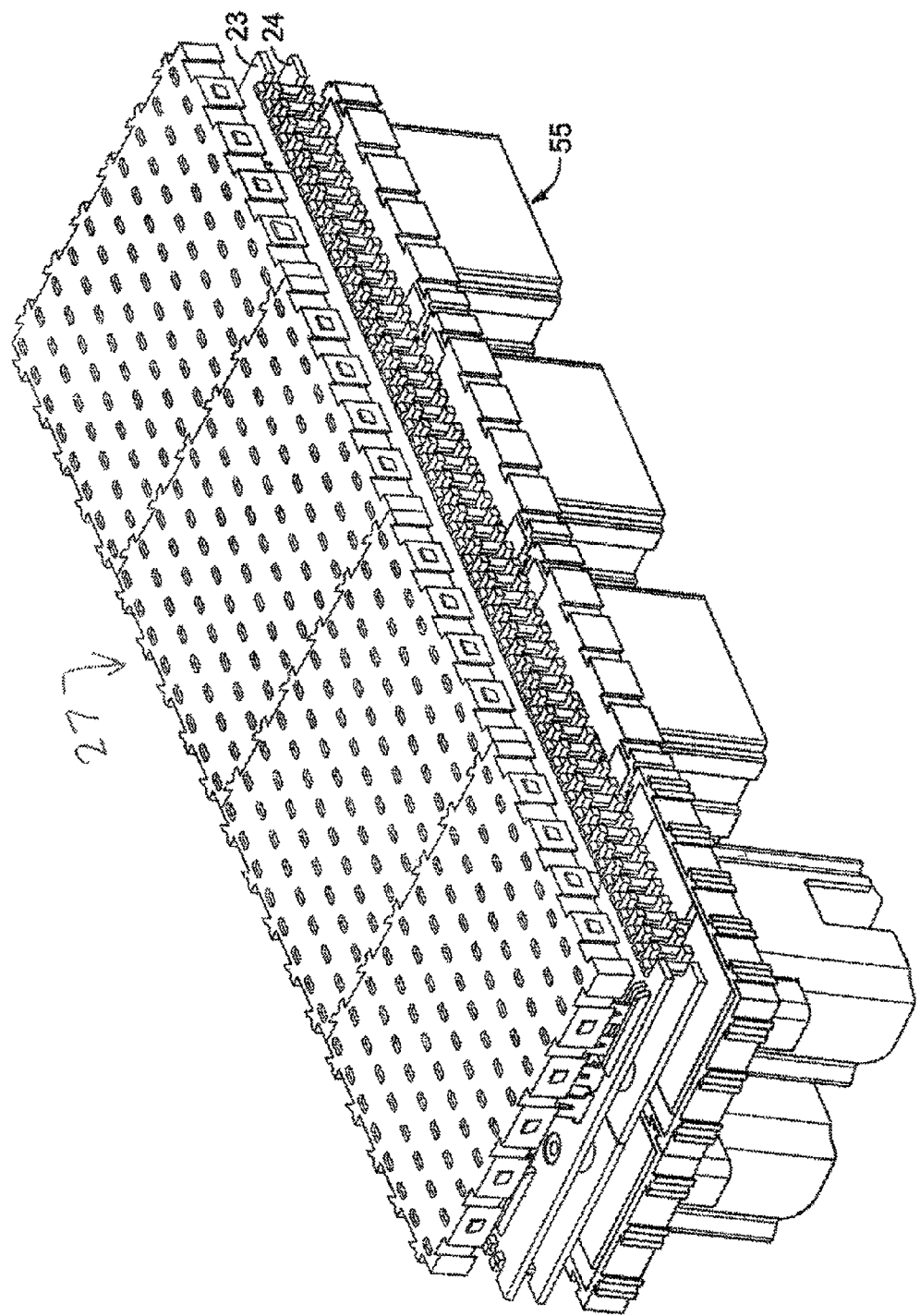

The edges of each plate 26 may further include interlocking tabs 29, having, for example, a triangular geometry, for engaging interlocking tabs 29 on an adjacent plate 26 in reversible interlocking engagement. The interlocking tabs 29 may also be referred to as interlocking dovetails. It is noted that although the interlocking tabs 29 are shown as having a triangular geometry, other geometries are within the scope of the present invention. FIGS. 8A and 8B shows one embodiment of an upper face 27 that is an assemblage of four reversibly interlocking plates 26.

Figure 7A:
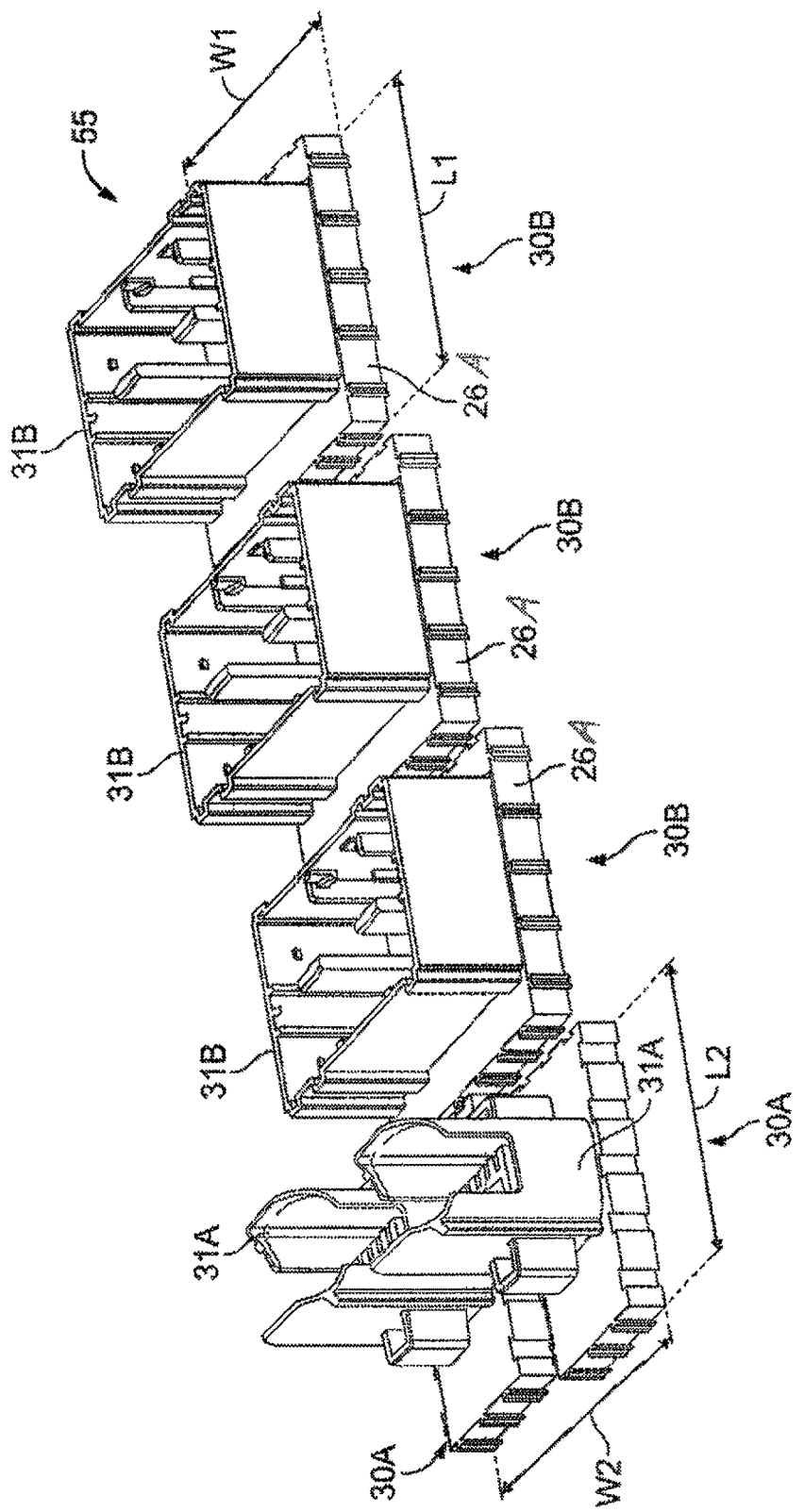
FIGS. 7A-7D are perspective views of a modular lower plate of another embodiment of the present invention (as seen in these views, the modular lower plate has at least one socket corresponding to I/O connections of a printed circuit board of a modular power distribution center)
Figure 7B:
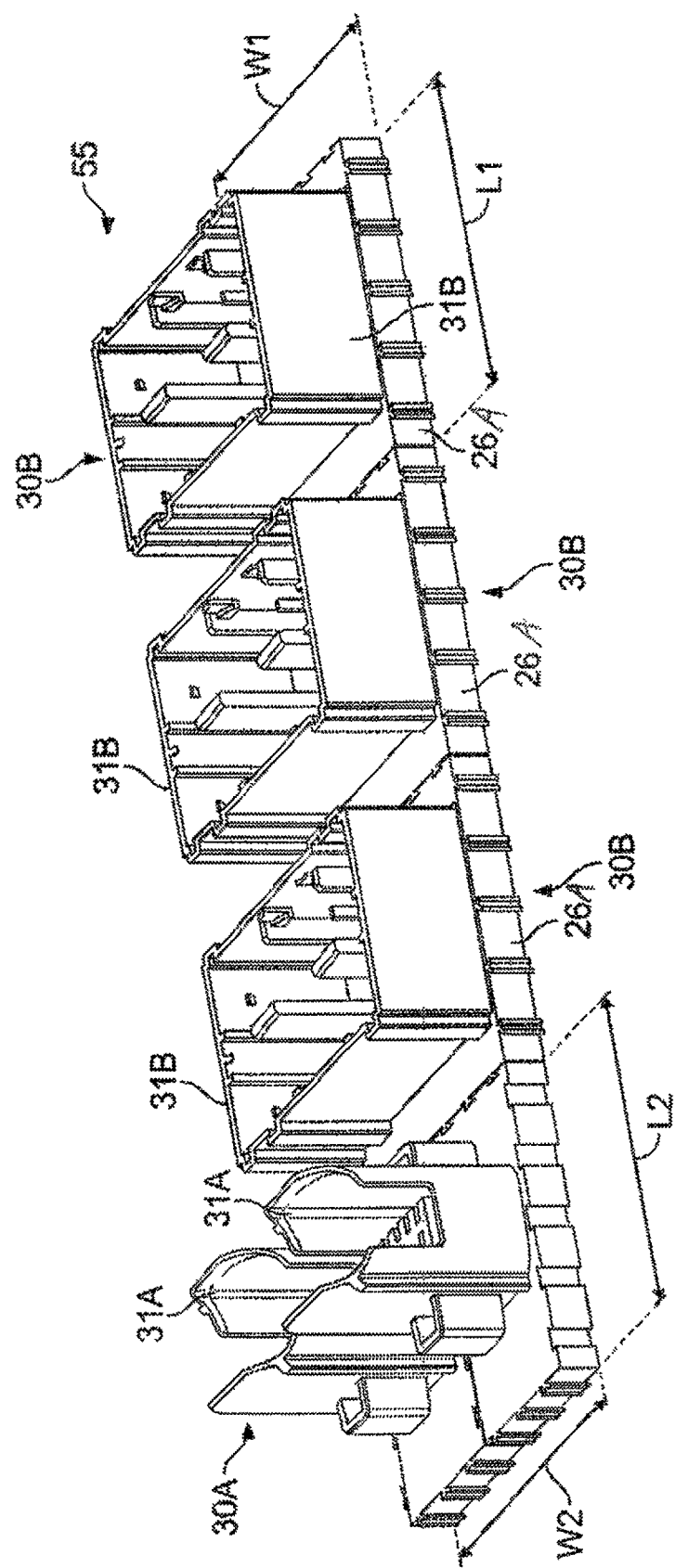

Referring now to FIGS. 7A and 7B, these Figures show perspective views of a plurality of modules of a modular housing, which includes at least one connector module 30A having at least one socket 31A, and at least one connector module 30B having at least one socket 31B. The sockets 31A, 31B of this example are configured to correspond to the I/O connections of the printed circuit board. In one example, connector module 30A may have a length L2 and width W2 equal to the length L1 and width W1 of the repeatable plate 26 of the upper face 27. In another example, connector module 30A may have a width equal to half the width W1 of the repeatable plate 26 of the upper face 27; yet have a length equal to the length L1 of the repeatable plate 26 of the upper face 27. It is noted that other dimensions for the connector modules may be used, where the dimensions of the connector modules are selected to provide a repeatable unit that is compatible in a housing assembly with the repeatable plate 26 of the upper face 27. Similar to the upper plate 26 of the upper face 27, the connector modules may include interlocking tabs for engaging adjacent connector modules in reversible interlocking engagement, as shown in FIG. 7B.

Figure 7C:
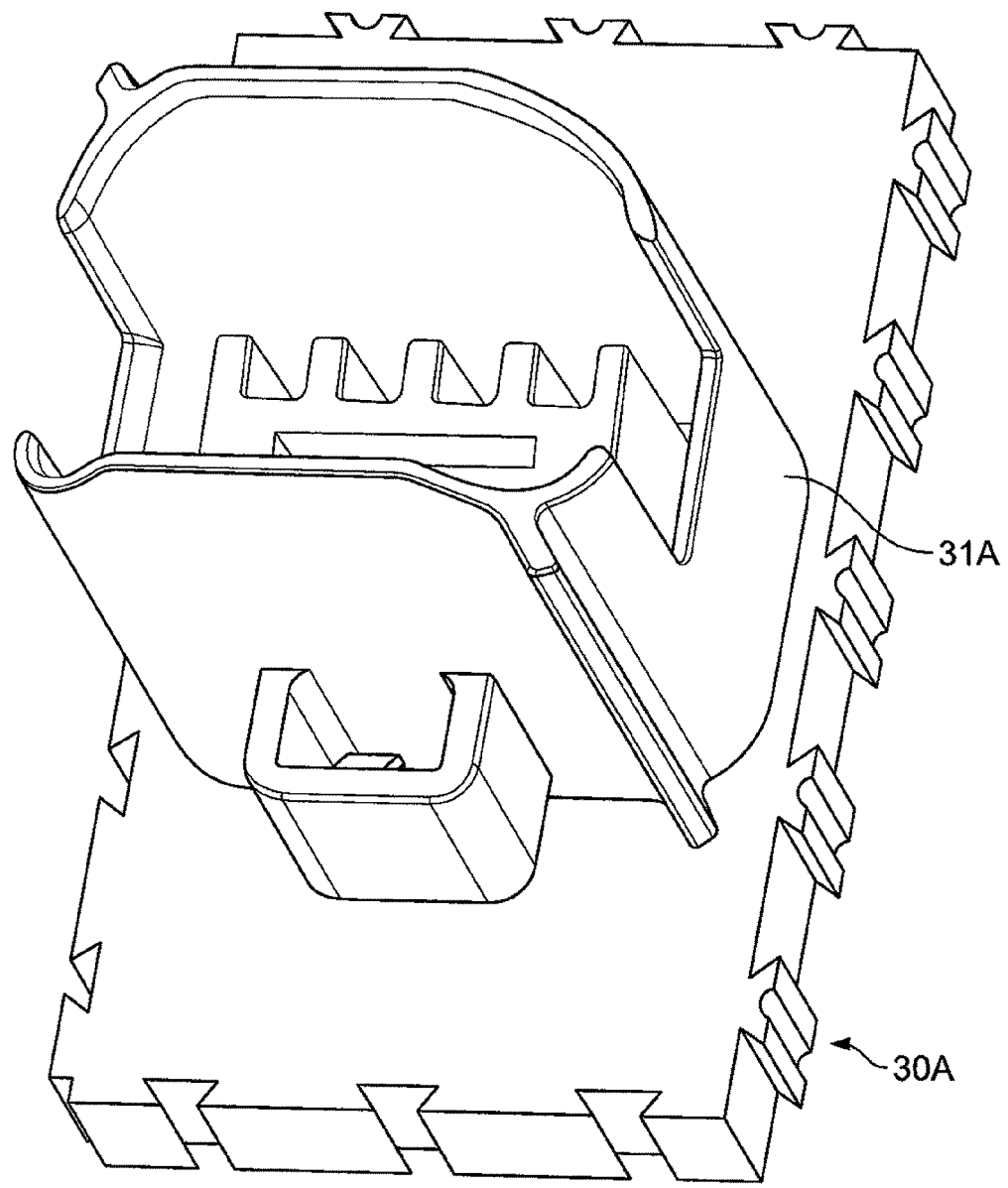
Figure 7D:
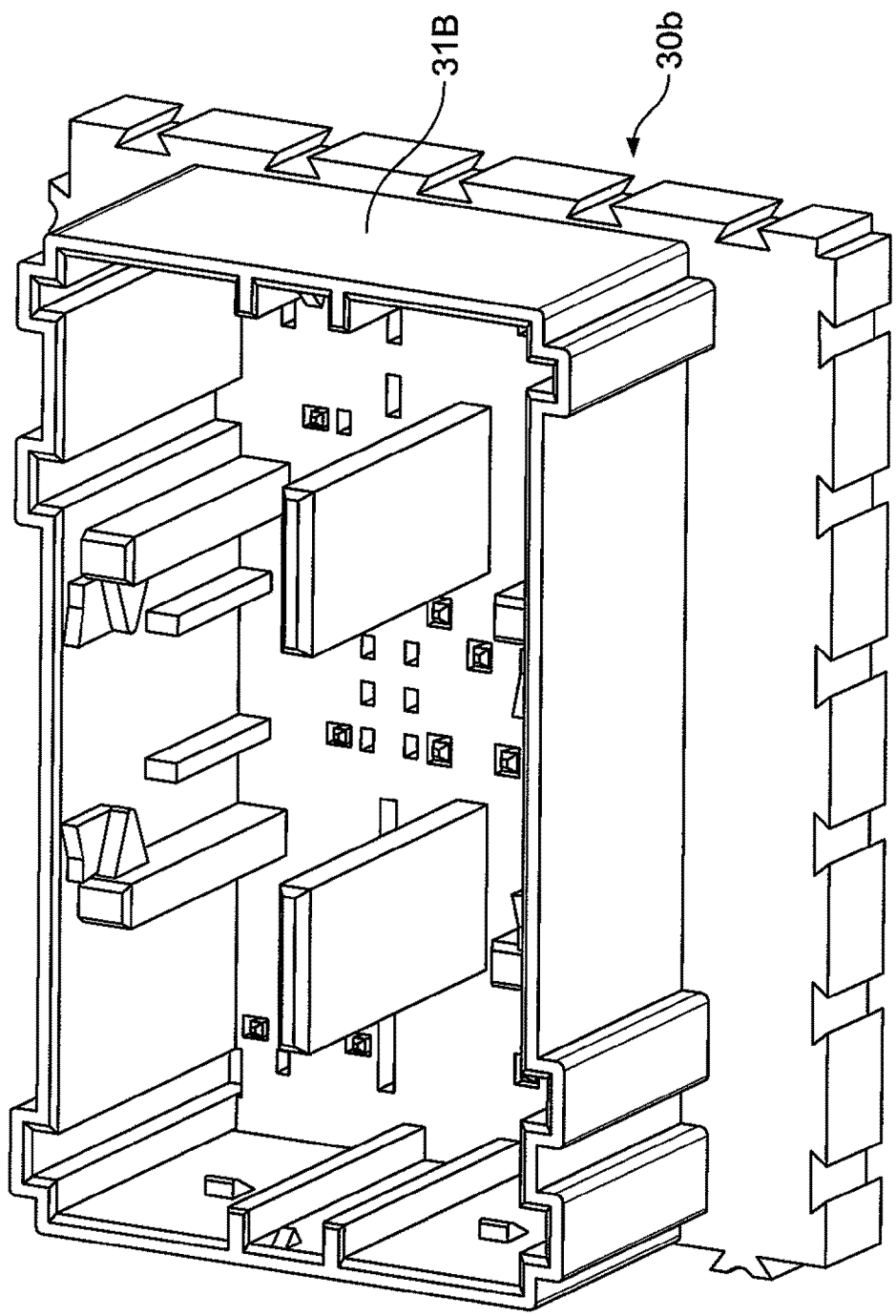

Referring again to FIG. 7A, the connector modules 30A and modules 30B may include at least one socket 31A and/or 31B, respectively. In one example, socket 31A of the connector module 30A may have a geometry that accepts a 14.5 mm power blade connector, as shown in FIG. 7C. In another example, the socket 31B of the connector module 30B may have a geometry that provides up to four different polarities and may be referred to as a 4-way connector module, as shown in FIG. 7D. FIGS. 8A and 8B show the assemblage of the upper face 27 and lower connector modules 55 of the modular housing with the modular power buss 10 and printed circuit boards 23, 24. In another embodiment, and as noted above, a single printed circuit board can be substituted for the two printed circuit boards. There is no limitation to the size of the connector or the number of connectors that can be connected to any one individual connector plate provided the component or components fit within the designated area.

Figure 9A:
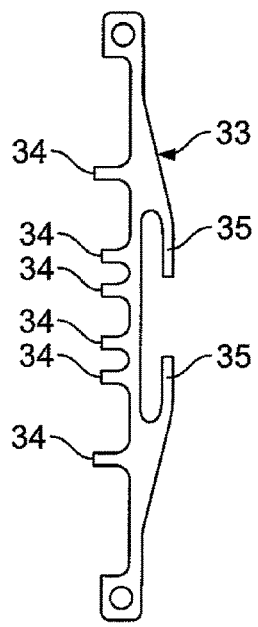
FIG. 9A is a side cross sectional view of a housing sidewall of a modular power distribution center according to an embodiment of the present invention.

Referring now to FIG. 9A, this Figure shows a side cross sectional view of modular housing sidewalls 33. The sidewalls 33 of the modular housing may include interior guide rails 34 (which may also be referred to as slots) that provide support for the edges of the modular housing's upper face 27, lower modules 55, and the printed circuit boards 23, 24, or a single printed circuit board 21A (as shown in FIG. 5E). The sidewalls 33 may also include an exterior guide rail 35 to facilitate assembly of the modular housing. In one example, the sidewalls 33 may comprise extruded plastic, stamped or extruded metal or any other material, where the profile of the sidewall is selected to provide interior and exterior guide rails 34, 35. Referring to FIG. 9B, the sidewalls 33 of the housing may be cut, for example, at the point of assembling the modular power distribution center, where the length of the rails are selected to correspond substantially to the upper face 27 and lower modules 55 of the housing, as well as the electrical device and electrical system connector layout.

Figure 9C:
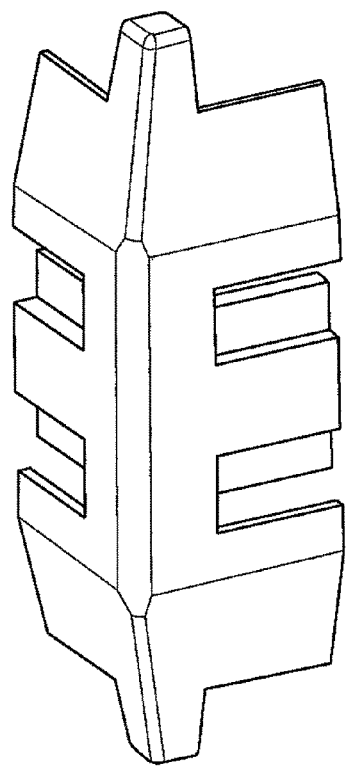
FIG. 9C is a perspective view of a corner connector for the sidewalls according to an embodiment of the present invention.
Figure 9D:
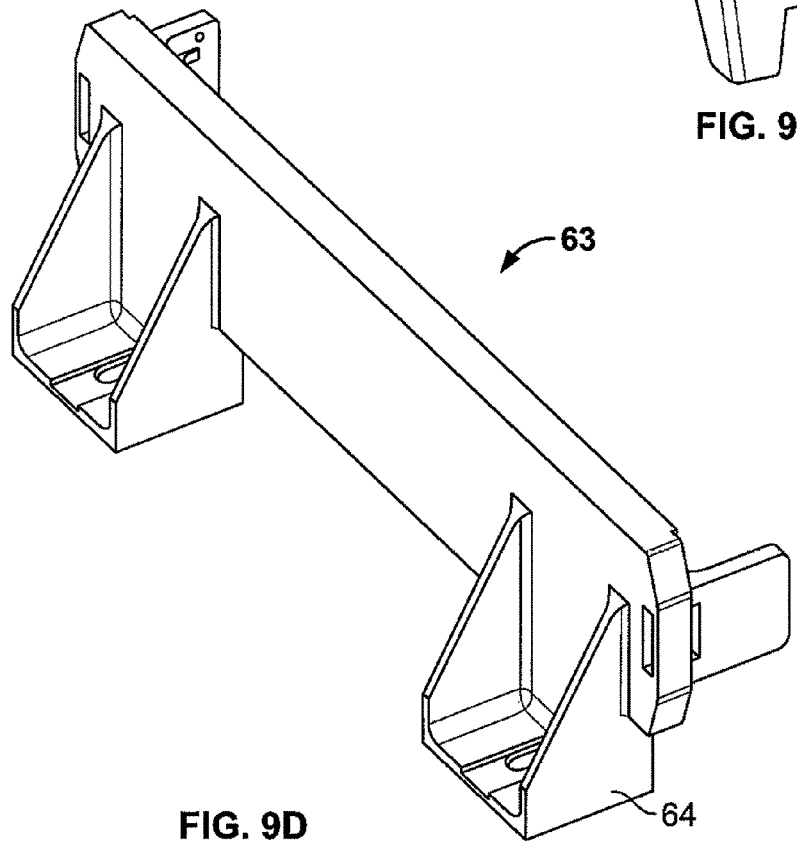
FIG. 9D is a perspective view of an outside surface of an end cap for the sidewalls according to an embodiment of the present invention.
Figure 9B:
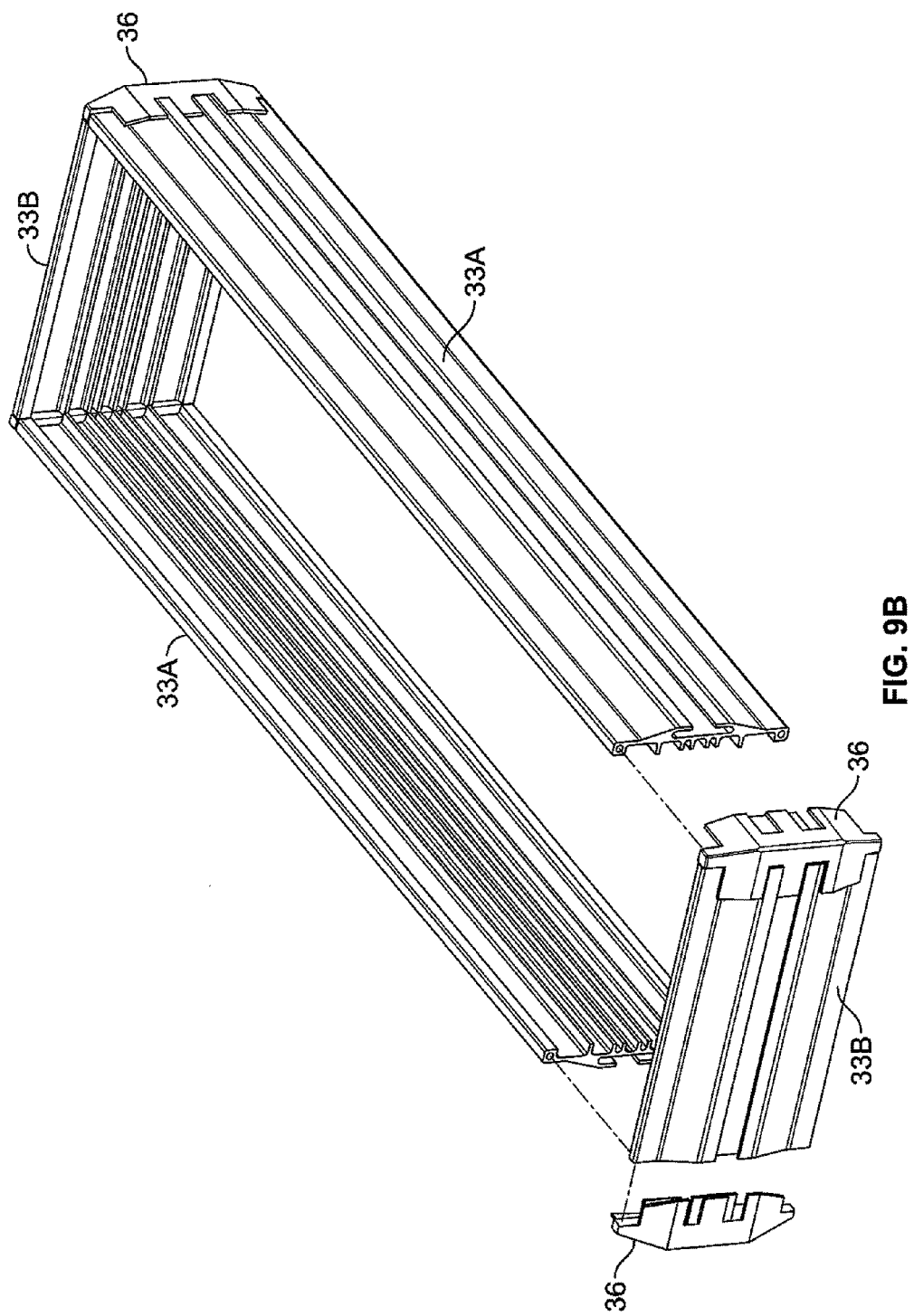
FIG. 9B is a perspective view of a modular power distribution center housing according to an embodiment of the present invention.
Figure 9E:
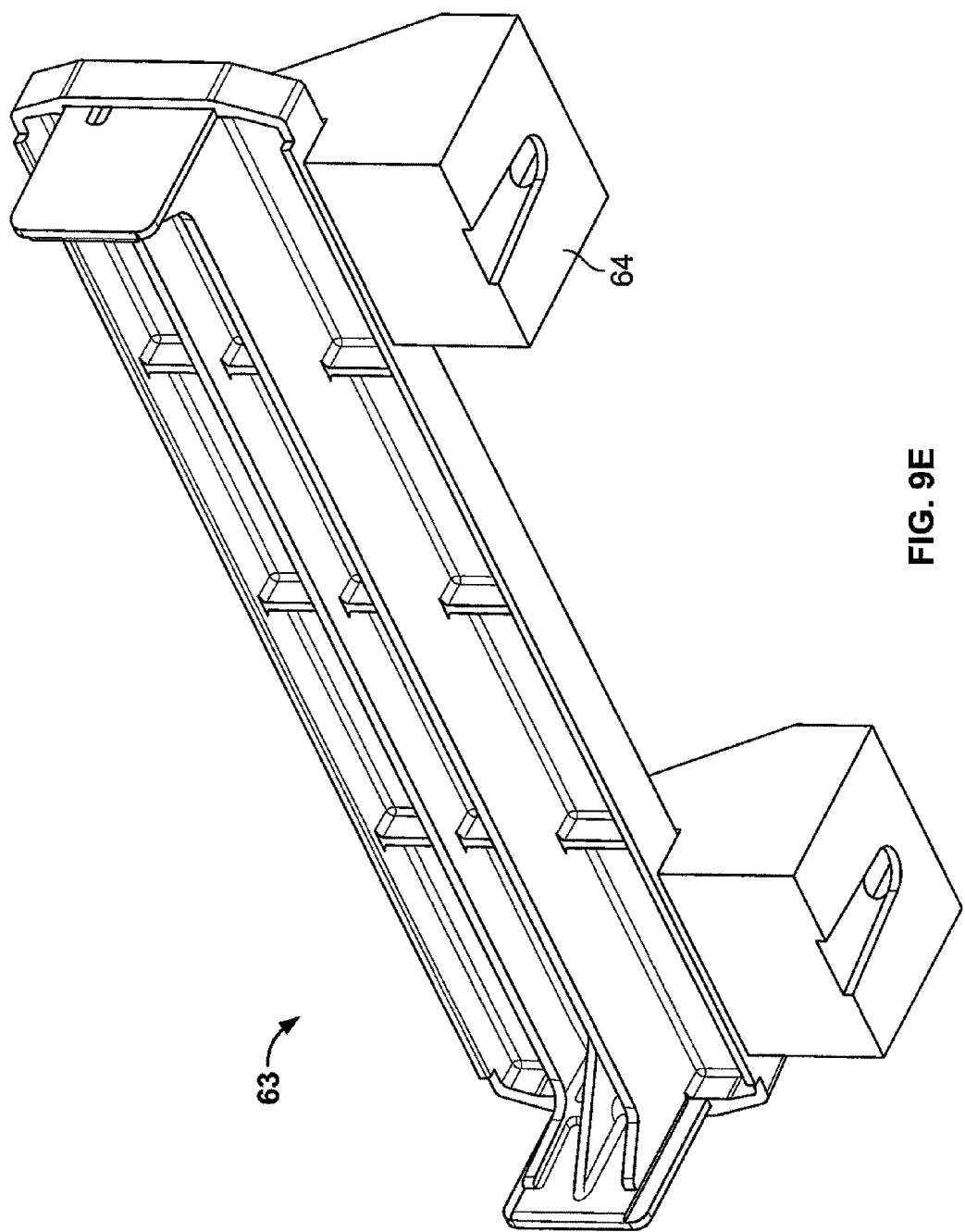
FIG. 9E is a perspective view of an inside surface of the end cap of FIG. 9D.

Referring to FIGS. 9B and 9C, the sidewalls 33 of the housing may comprise sidewalls 33A each having a relatively longer length and sidewalls 33B each having a relatively shorter length. The sidewalls 33A, 33B may be connected by a corner connector 36 (shown in more detail in FIG. 9C) having a geometry for engaging the sidewalls' 33A, 33B profiles, where the corner connector 36 engages the exterior guide rails 35 of the sidewalls 33. The corner connector 36 may comprise a molded material, such as plastic, a cast structure, etc. Alternatively, as opposed to a corner connector 36 which is positioned at each corner of the housing, as shown in FIGS. 9B and 9C, two end caps 63 as shown in FIGS. 9D and 9E may be positioned at opposing ends of the housing. Provisions such as mounting brackets 64 for mounting the entire device can be integrated into the end caps or guide rails. FIG. 9D is a perspective view of the outside surface of an end cap, and FIG. 9E is a perspective view of the inside surface of an end cap.

Figure 10A:
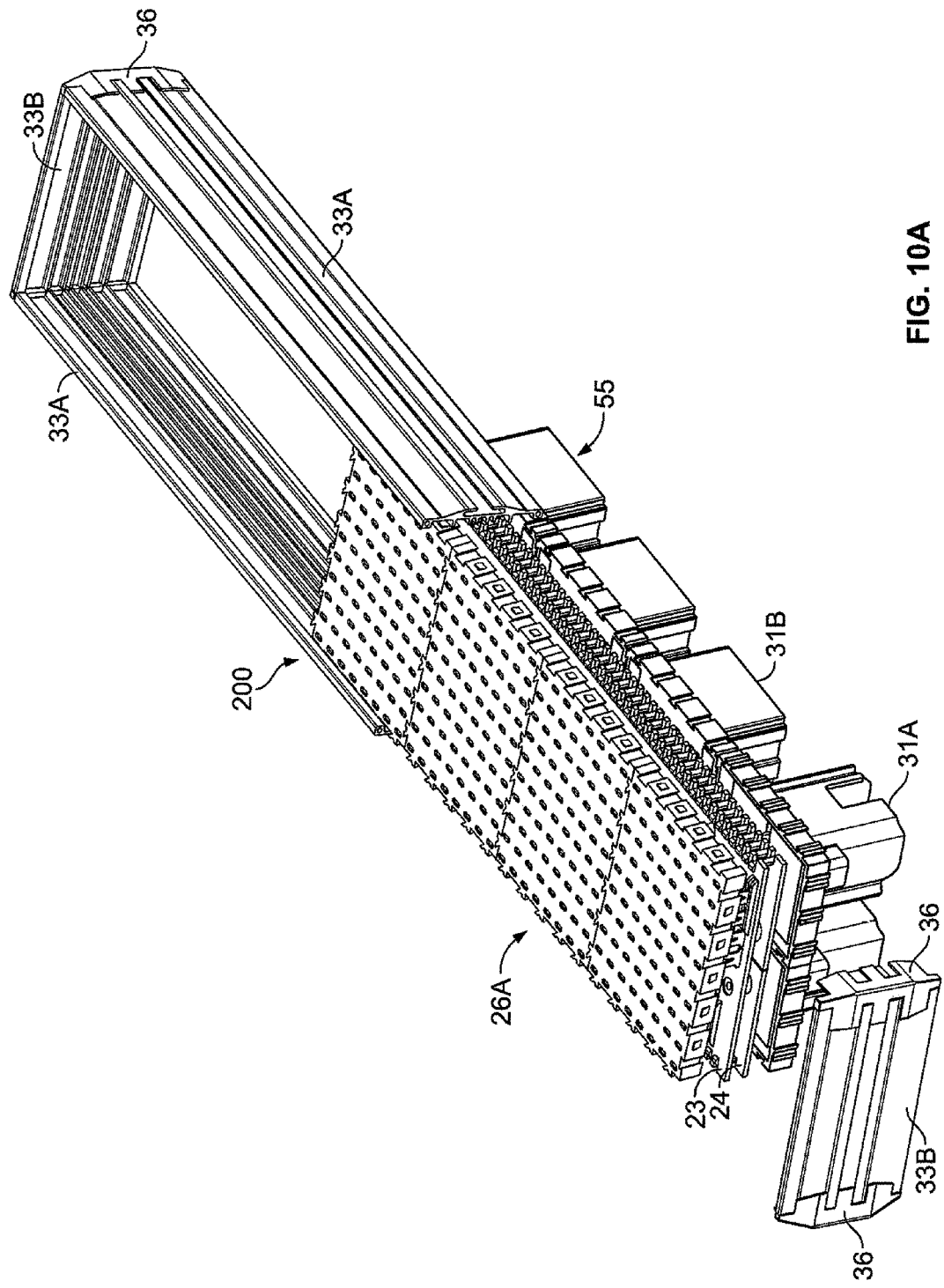

FIGS. 10A-10C, show an assembled modular power distribution center 200 according to an embodiment of the present invention. FIG. 10A shows the sliding engagement of the upper face and lower face of the modular housing and two printed circuit boards 23, 24 in modular housing sidewalls 33A, 33B. FIG. 10B shows a cross sectional view of power distribution center 200. FIG. 10C shows assembled modular distribution center 200 having electrical devices 40 electrically connected to the device interface buss of the modular power distribution center 200 through the receptacle portions of the modular power distribution center's upper face.

In another embodiment, the side extrusions may be snapped onto the top and bottom plates.

In another example, the device interface buss can be replaced with other types of device interfaces such as, for example, fork terminals, blade terminals, receptacle terminals, etc. As described herein, various embodiments of the present invention provide a modular power distribution center and method for distributing electrical power that advantageously allows for the use of mechanical connectors (which may reduce or eliminate the need for heavy gauge wire routing). Various embodiments of the present invention may further provide an easily adjustable system of modular device bussing (also sometimes referred to as primary bussing), which may reduce or eliminate the need for customized buss bars.

Further, under various embodiments of the present invention the modular plates and connectors that provide the upper and lower faces of the housing in combination with the adjustability of the primary buss may provide a flexible platform that improves efficiency in electrical system connector and device placement.

Further still, under various embodiments of the present invention the use of plastic or metal, such as aluminum sidewalls may advantageously provide continuous mounting surfaces for the upper and lower faces of the modular housing as well as the printed circuit board or boards encased within the housing.

Further still, under various embodiments of the present invention the integration of printed circuit boards may allow for adjustments in the routing of electrical devices and connecting structures without requiring substantial changes in tooling.

Figure 11:
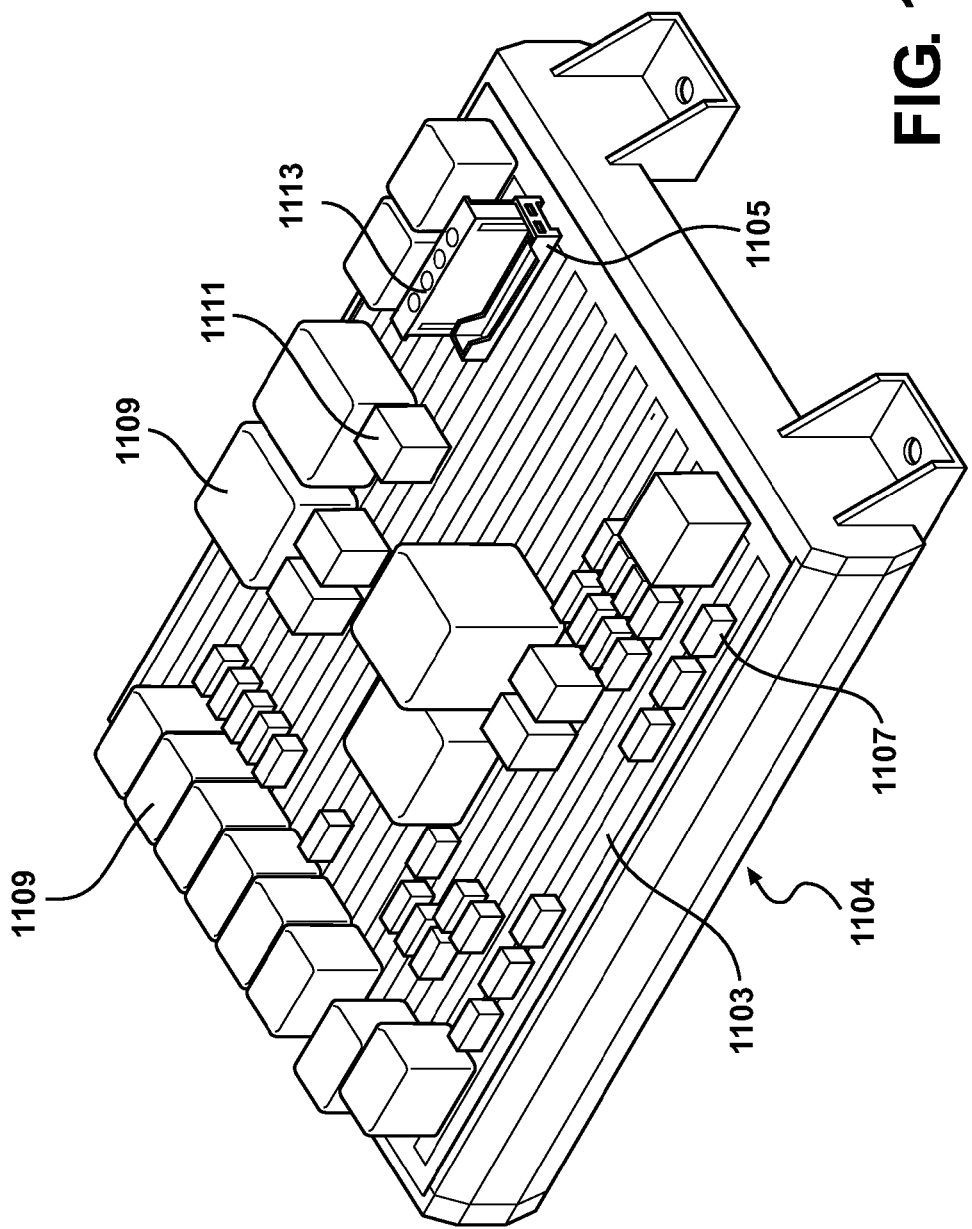
FIG. 11 is a perspective view of a power distribution system according to another embodiment of the present invention.

Referring now to FIG. 11, a power distribution system 1101 according to another embodiment of the present invention is shown. As seen in these Figures, power distribution system 1101 may comprise a power distribution center 1104 of a vehicle (not shown). The power distribution center 1104 may comprise a component plate 1103 attached thereto.

Power distribution system 1101 may further comprise at least one electrical connector spacer 1105 (while one electrical connector spacer is called out with a reference character, any desired number of electrical connector spacers may, of course, be utilized).

Further, the component plate 1103 may comprise a plurality of electrical terminals (on the underside thereof) electrically connected to the power distribution center 1104 and the component plate 1103 may comprise on an outer surface thereof a surface geometry, the outer surface geometry having at least a portion configured to permit electrical connection at a first time of an electrical device (see, e.g., minifuse 1107) to at least first and second ones of the electrical terminals and mechanical connection at a second time of the electrical connector spacer 1105 above at least the first and second ones of the electrical terminals (while one minifuse 1107 is called out in this view with a reference number, as seen, a plurality of minifuses may be utilized (any desired number of minifuses may be utilized); further any desired number of relays 1109 (two of which are called out with a reference number) may be utilized; further any desired number of J-case fuses 1111 (one of which is called out with a reference number) may be utilized; further any other number and type of similar electrical devices may be utilized).

Of note, the first time and the second time are distinct from one another and are mutually exclusive. In this regard, this embodiment of the present invention may provide a single place on the component plate 1103 at which either an electrical device (e.g., minifuse, circuit breaker, relay, resistor, diode, or switch) or an electrical connector/electrical connector spacer may be connected (e.g. electrically and/or mechanically). That is, this embodiment of the present invention may provide flexibility in layout via which either an electrical device (e.g., minifuse, circuit breaker, relay, resistor, diode, or switch) or an electrical connector/electrical connector spacer may be connected into the same area of the component plate 1103 (of course, such connection either of an electrical device (e.g., minifuse, circuit breaker, relay, resistor, diode, or switch) or an electrical connector/electrical connector spacer would not occur at the same time; in addition, both the electrical device (e.g., minifuse, circuit breaker, relay, resistor, diode, or switch) and the electrical connector/electrical connector spacer need not be connected to the component plate 1103—this embodiment of the present invention simply gives the flexibility to allow connection of the electrical device (e.g., minifuse, circuit breaker, relay, resistor, diode, or switch) or the electrical connector/electrical connector spacer as desired).

In one example, the electrical connector spacer 1105, when mechanically connected to the component plate 1103, may be configured to also mechanically connect to an electrical connector 1113 such that at least first and second electrical elements associated with the electrical connector 1113 electrically connect through the electrical connector spacer 1105 with at least the first and second electrical terminals. Of note, the electrical connector spacer may be configured to mechanically connect to a single electrical connector; to two electrical connectors (such as shown in this FIG. 11, wherein electrical connector spacer 1105 has room for two electrical connectors, only one of which is shown in this view); or to any desired number of electrical connectors.

In another example, the electrical connector spacer 1105 may be in place on the component plate 1103 prior to the mechanical connection of the electrical connector spacer 1105 with the electrical connector 1113. In a specific example, the electrical connector spacer 1105 may be permanently in place (e.g., in a pre-determined position or any desired position) on the component plate 1103 prior to the mechanical connection of the electrical connector spacer 1105 with the electrical connector 1113.

In another example, the electrical connector spacer 1105 may be mechanically connected with the electrical connector 1113 prior to placement of the electrical connector spacer 1105 on the component plate 1103.

In another example, the electrical connector spacer may comprise an electrically insulating material.

In another example, the electrical connector spacer may comprise a plastic material.

In another example, the outer surface geometry may comprise a plurality of rows of raised ribs, wherein access holes through the component plate 1103 are provided along valleys between adjacent rows, and wherein the access holes provide access through the component plate 1103 to at least some of the electrical terminals.

In another example, the electrical device may comprise at least one of a fuse, a circuit breaker, a relay, a resistor, a diode and a switch.

In another example, the electrical connector 1113 may provide electrical power to an electrical system of the vehicle (not shown).

In another example, the electrical system of the vehicle may comprise at least one of a head light, a signal light, a vehicle cabin light, an anti-lock brake component, a radio and/or stereo system, a power window, a power mirror, a power seat.

In another example, the component plate 1103 may be a separate element mounted to the power distribution center 1104 (e.g., the component plate 1103 may be mechanically mounted to the power distribution center 1104).

In another example, the component plate 1103 may be integral with the power distribution center 1104 (see, e.g., FIG. 11).

In another example, the vehicle may be one of an automobile and a truck.

In another example, the vehicle may be one of a boat; an airplane; a helicopter; a military vehicle.

Figure 12A:
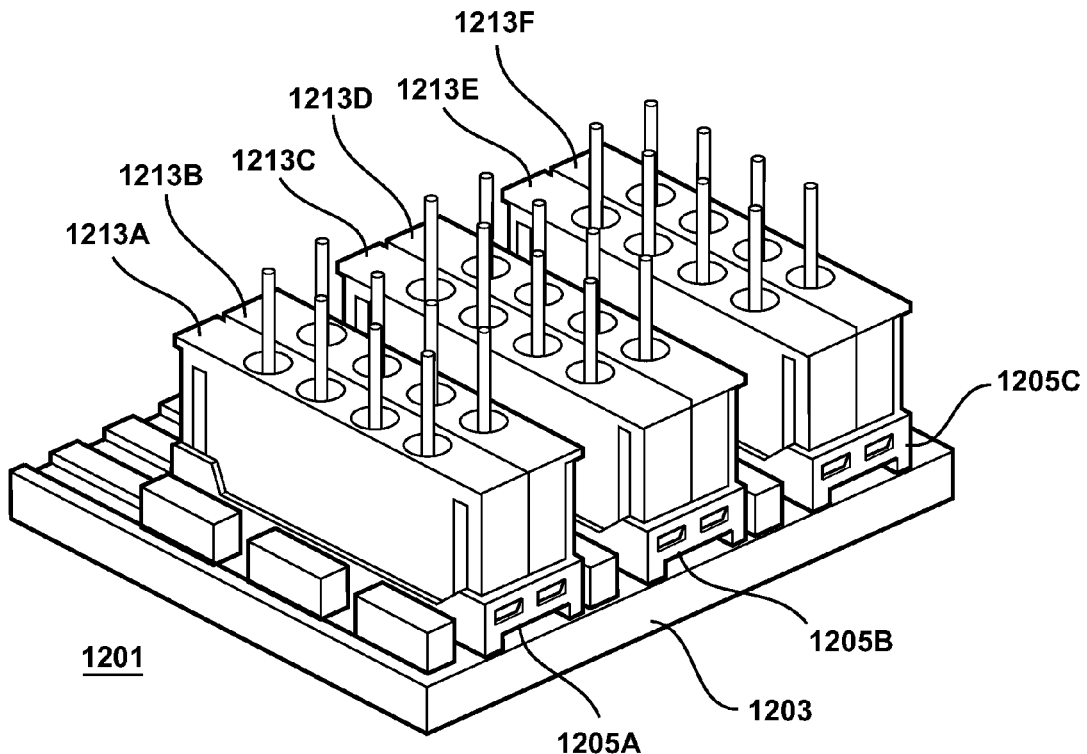
FIGS. 12A and 12B show detail views of a portion of a power distribution system according to another embodiment of the present invention (FIG. 12A is a perspective view of the detail of a portion of the power distribution system and FIG. 12B is a partially exploded perspective view of FIG. 12A)
Figure 12B:
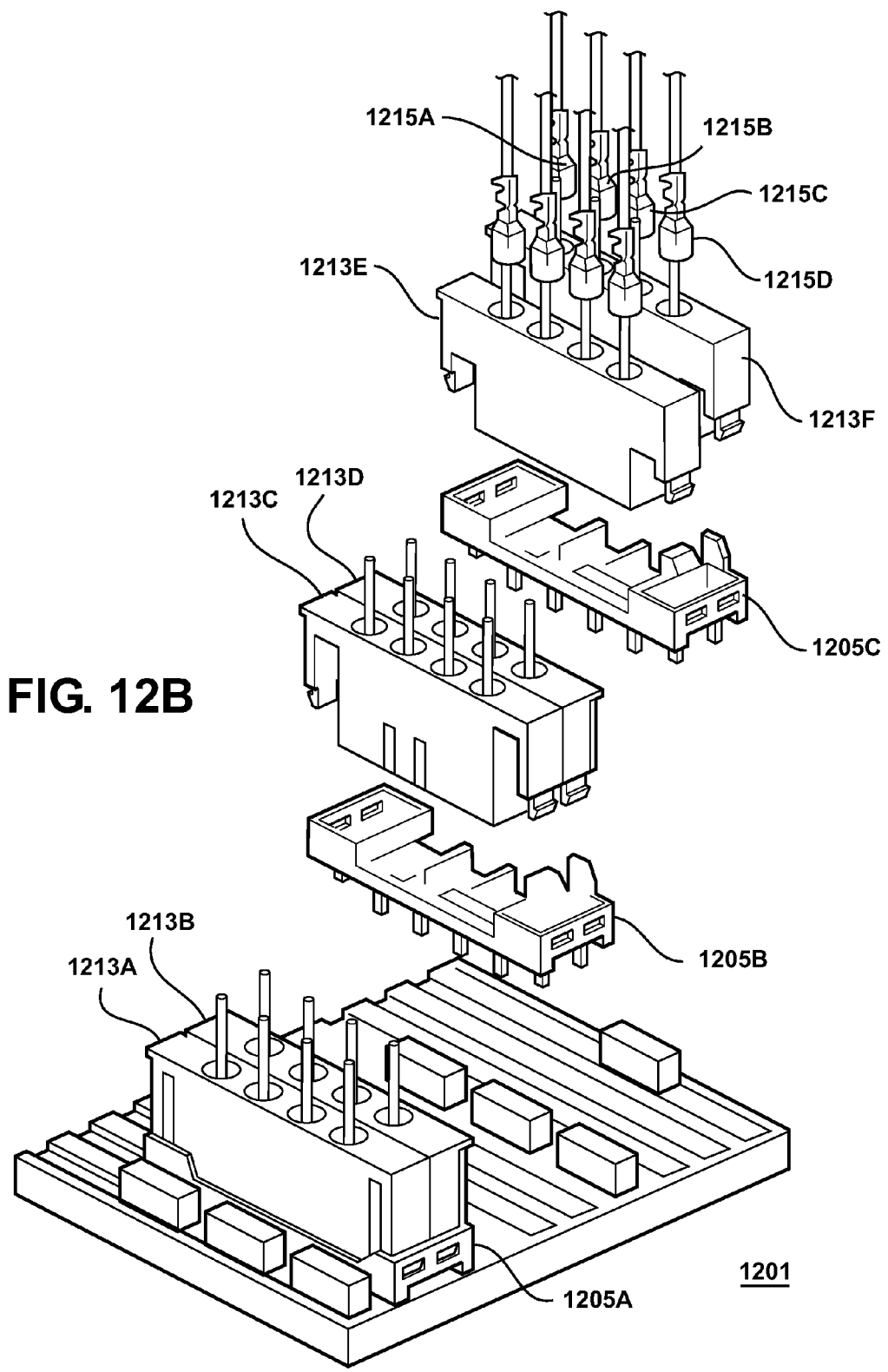

Referring now to FIGS. 12A and 12B, a detail view of a portion of a power distribution system 1201 according to another embodiment of the present invention is shown (FIG. 12A is a perspective view of the detail of a portion of the power distribution system 1201 and FIG. 12B is a partially exploded perspective view of FIG. 12A).

As seen in FIG. 12A, three electrical connector spacers 1205A, 1205B, 1205C are shown in this example as connected to component plate 1203. Also, as seen, six electrical connectors 1213A-1213F are shown in this example (wherein two of the electrical connectors are mechanically connected to one of each of the electrical connector spacers). Further, a plurality of minifuses are shown in this view but are not called out with reference numbers.

As seen in FIG. 12B, each electrical connector may have a plurality of electrical elements (or terminals) 1215A-1215D. In one example, the terminals may be 2.8 mm terminals. Of note, only one set of electrical elements 1215A-1215D are called out with reference numbers in this view. Of further note, while four electrical elements are shown as associated with each electrical connector in this example, any desired number of electrical elements may be associated with each electrical connector.

Figure 13:
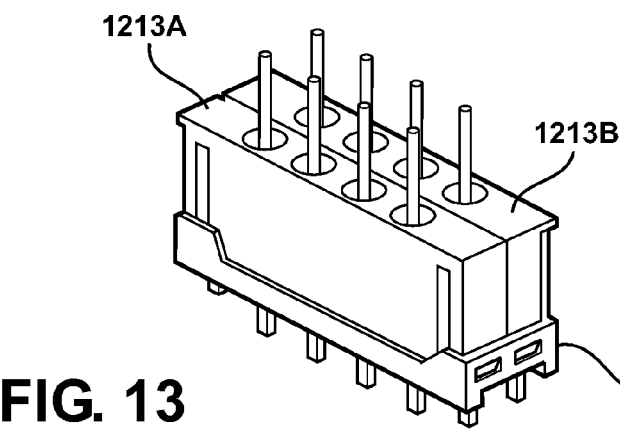
FIG. 13 is a perspective view of an electrical connector spacer and electrical connectors according to an embodiment of the present invention.

Referring now to FIG. 13, a perspective view of electrical connector spacer 1205A and electrical connectors 1213A, 1213B of FIGS. 12A and 12B are shown.

In another embodiment of the present invention a power distribution system associated with a vehicle is provided, comprising: a power distribution center, wherein the power distribution center comprises a component plate; a plurality of electrical devices; a plurality of electrical connector spacers; and a plurality of electrical connectors; wherein each electrical device comprises at least one of a fuse, a circuit breaker, a relay, a resistor, a diode and a switch; wherein each electrical connector provides electrical power to an electrical system of the vehicle;

wherein the component plate comprises a plurality of electrical terminals electrically connected to the power distribution center; wherein the component plate comprises on an outer surface thereof a surface geometry; wherein the outer surface geometry has at least a first portion configured to permit electrical connection at a first time of a first one of the electrical devices to at least first and second ones of the electrical terminals and mechanical connection at a second time of a first one of the electrical connector spacers above at least the first and second ones of the electrical terminals; wherein the outer surface geometry has at least a second portion configured to permit electrical connection at a third time of a second one of the electrical devices to at least third and fourth ones of the electrical terminals and mechanical connection at a fourth time of a second one of the electrical connector spacers above at least the third and fourth ones of the electrical terminals; wherein the first time and the second time are distinct from one another and are mutually exclusive; wherein the third time and the fourth time are distinct from one another and are mutually exclusive; wherein the first one of the electrical connector spacers, when mechanically connected to the component plate, is configured to also mechanically connect to a first one of the electrical connectors such that at least first and second electrical elements associated with the first one of the electrical connectors electrically connect through the first one of the electrical connector spacer with at least the first and second electrical terminals; and wherein the second one of the electrical connector spacers, when mechanically connected to the component plate, is configured to also mechanically connect to a second one of the electrical connectors such that at least first and second electrical elements associated with the second one of the electrical connectors electrically connect through the second one of the electrical connector spacers with at least the third and fourth electrical terminals.

In one example, the first portion of the outer surface geometry may comprise first and second rows of raised ribs, wherein access holes through the component plate are provided along a valley between adjacent rows, and wherein the access holes provide access through the component plate to at least some of the electrical terminals; and the second portion of the outer surface geometry may comprise second and third rows of raised ribs, wherein access holes through the component plate are provided along a valley between adjacent rows, and wherein the access holes provide access through the component plate to at least some of the electrical terminals.

In another example, the electrical system of the vehicle may comprise at least one of a head light, a signal light, a vehicle cabin light, an anti-lock brake component, a radio and/or stereo system, a power window, a power mirror, a power seat.

In another example, the component plate may be a separate element mounted to the power distribution center (e.g., the component plate may be mechanically mounted to the power distribution center).

In another example, the component plate may be integral with the power distribution center.

In another example, the vehicle may be one of an automobile and a truck.

In another example, the vehicle may be one of a boat; and airplane; a helicopter; military vehicle.

In another example, the outer surface geometry of the component plate may comprise a plurality of locking features, each of the plurality of locking features of the component plate being configured to mate with a corresponding locking feature on each of the electrical connector spacers for locking each electrical connector spacer to the component plate.

In another example, each electrical connector spacer may be releasably locked to the component plate.

In another example, the outer surface geometry of the component plate may comprise a plurality of keying features, each of the plurality of keying features of the component plate being configured to prohibit the attachment of each electrical connector spacer in a non-permitted orientation.

In another example, each of the electrical connectors may comprise at least one locking feature, each locking feature of each electrical connector being configured to lock the electrical connector to a corresponding electrical connector spacer.

In another example, each electrical connector may be releasably locked to the electrical connector spacer.

In another example, each of the electrical connectors may comprise at least one keying feature, each keying feature of each electrical connector being configured to prohibit the attachment of the electrical connector to a corresponding electrical connector spacer in a non-permitted orientation.

In another example, each of the electrical connector spacers may comprise at least one locking feature, each locking feature of each electrical connector spacer being configured lock the electrical connector spacer to a corresponding electrical connector.

In another example, each electrical connector spacer may be releasably locked to the electrical connector.

In another example, each of the electrical connector spacers may comprise at least one keying feature, each keying feature of each electrical connector spacer being configured to prohibit the attachment of the electrical connector spacer to a corresponding electrical connector in a non-permitted orientation.

In another example, each electrical connector may have a label or other visual device to indicate proper orientation (e.g., relative to an electrical connector spacer and/or the component plate).

In another example, each electrical connector may have a tactile feedback device to indicate proper connection (e.g., to an electrical connector spacer and/or the component plate).

In another example, each electrical connector spacer may have a label or other visual device to indicate proper orientation (e.g., relative to an electrical connector and/or the component plate).

In another example, each electrical connector spacer may have a tactile feedback device to indicate proper connection (e.g., to an electrical connector and/or the component plate).

In another example, the component plate may have a label or other visual device to indicate proper orientation (e.g., relative to an electrical connector and/or an electrical connector spacer).

In another example, the component plate may have a tactile feedback device to indicate proper connection (e.g., to an electrical connector and/or an electrical connector spacer).

In another example, each electrical connector may electrically connect to X number of the electrical terminals of the component plate, wherein X is an integer between 2 and 10 (each respective electrical connector spacer may have, for example, a corresponding number of through holes).

In another embodiment of the present invention a power distribution system for a vehicle is provided, comprising: a power distribution center, wherein the power distribution center comprises a component plate, wherein the component plate comprises a plurality of electrical terminals electrically connected to the power distribution center and wherein the component plate comprises on an outer surface thereof a surface geometry, the outer surface geometry having at least a portion configured to: (a) permit electrical connection at a first time of an electrical device to at least first and second ones of the electrical terminals and electrical connection at a second time of an electrical connector to at least the first and second ones of the electrical terminals; and (b) include at least one mechanical interface, wherein the mechanical interface is shaped to mechanically mate with the electrical device if electrically connected to at least the first and second ones of the electrical terminals and to mechanically mate with the electrical connector if electrically connected to at least the first and second ones of the electrical terminals.

In one example, the power distribution system may further comprise at least one electrical connector spacer disposed between at least one of the electrical connectors and the component plate.

In another example, the electrical connector spacer may be releasably locked to the component plate.

As described herein, various embodiments of the present invention provide an electrical connector (e.g., a four-position connector (e.g., B+, Ignition, Accessory and Ground positions)) that works in conjunction with a component plate and/or electrical connector spacer (of the type shown, for example, in FIGS. 11-13) to allow the flexibility of adding extra functionality to a vehicle electrical system as the need arises (in another embodiment, the electrical connector and/or electrical connector spacer may be utilized in connection with an apparatus of the type shown, for example, in FIGS. 1-10). In one example, use of an additional modular block (that is, separate from the power distribution center) is not required. In another example, the electrical connector and/or electrical connector spacer and/or the component plate may be keyed, such as for clarity during installation. In another example, the electrical connector and/or electrical connector spacer and/or the component plate may utilize 2.8 mm/280-series spaced terminals.

In another example, to add a vehicle function a single four-position electrical connector and/or electrical connector spacer may be used (many functions to be added to a vehicle electrical system typically require three wires (i.e., three-positions)). In this regard, a four-position electrical connector and/or electrical connector spacer may take the place of two conventional two-position electrical connectors.

Referring now to FIGS. 14, 15, 16A, 16B and 17, a system 1401 according to another embodiment of the present invention is shown. As seen in these Figures, a power distribution center 1404 for a vehicle (not shown) is provided (in this example, the vehicle has a bulkhead separating an engine compartment from a passenger compartment). The power distribution center 1404 may comprise a connector plate 1403.

Further, the power distribution center 1404 may comprise a mounting ring 1451, wherein the mounting ring 1451 comprises a first face 1451A and a second face 1451B, wherein the mounting ring mates (in a removable manner) with the connector plate 1403 (with a first seal 1453 disposed between the connector plate 1403 and the first face 1451A of the mounting ring 1451 to provide a seal between the connector plate 1403 and the first face 1451A of the mounting ring 1451).

Further still, an adhesive 1455 may be disposed on the second face 1451B of the mounting ring 1451.

Further, the mounting ring 1451 may be attached via the adhesive 1455 to the bulkhead (not shown); the bulkhead may have least one hole therethrough; and the mounting ring 1451 may be attached via the adhesive 1455 to the bulkhead at a position such that the mounting ring 1451 encloses a perimeter of the hole in the bulkhead (in one example, the first seal and/or the adhesive may also enclose the perimeter of the hole in the bulkhead; in another example, the mounting ring, the first seal and/or the adhesive may (in plan view) substantially correspond to the shape of the perimeter of the hole in the bulkhead; in another example, the mounting ring, the first seal and/or the adhesive may (in plan view) be different from the shape of the perimeter of the hole in the bulkhead; in another example, the mounting ring, the first seal and/or the adhesive may (in plan view) enclose the perimeters of multiple holes in the bulkhead).

In another example, the first seal may be disposed along an entire length of the first face of the mounting ring.

In another example, the seal provided by the first seal may be a weather-tight seal.

In another example, the first seal may comprise silicone.

In another example, the first seal may be applied between the connector plate and the first face of the mounting ring as a flexible solid ring.

In another example, the first seal may be applied between the connector plate and the first face of the mounting ring as a fluid.

In another example, the adhesive may provide a seal between the bulkhead and the second face of the mounting ring.

In another example, the adhesive may be disposed along an entire length of the second face of the mounting ring.

In another example, the seal provided by the adhesive may be a weather-tight seal.

In another example, the adhesive may comprise double sided tape.

In another example, the adhesive may comprise VHB tape (VHB tape is a tape produced by the 3M company).

In another example, the adhesive may be applied between the bulkhead and the second face of the mounting ring as a fluid.

In another example, the mounting ring may be permanently attached via the adhesive to the bulkhead.

In another example, the power distribution center may further comprise, for passing at least one electrical connection through the hole in the bulkhead, at least one of: (a) at least one connector; (b) at least one hard wired connection; and (c) at least one bolted-on connection.

In another example, the power distribution center may further comprise, for passing a plurality of electrical connections through the hole in the bulkhead, at least one of: (a) a plurality of connectors; (b) a plurality of hard wired connections; and (c) a plurality of bolted-on connections (e.g., each electrical connection may include the use of a connector (but not necessarily include use of a connector), each electrical connection may include the use of a hard-wired connection (but not necessarily include use of a hard-wired connection) and/or each electrical connection may include the use of a bolted-on connection (but not necessarily include use of a bolted-on connection).

Figure 15:
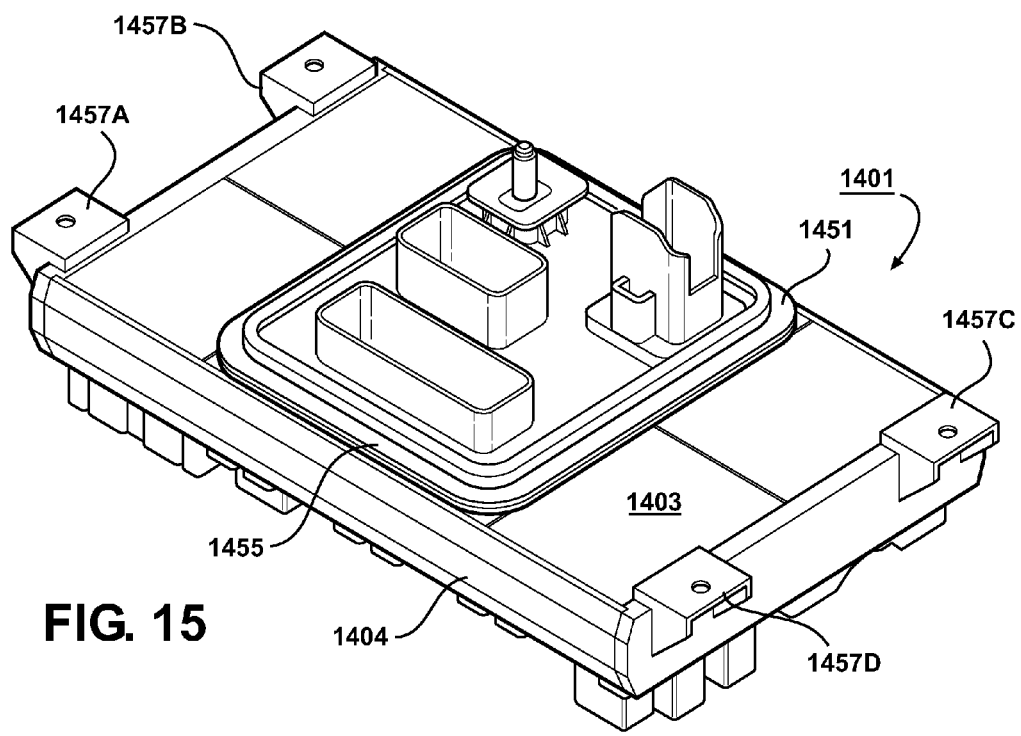

In another example, the power distribution center may further comprise a plurality of connectors (and/or hardwired connections(s) and/or bolted-on connection(s)) for passing a plurality of electrical connections through the hole in the bulkhead (see, e.g., the plurality of different types of electrical connectors (not separately called out with reference numerals) shown protruding from the bottom of the power distribution center in the view of FIG. 15).

In another example, the plurality of electrical connections (and/or hardwired connections(s) and/or bolted-on connection(s)) may be passed through the hole in the bulkhead at positions such that the plurality of electrical connections are inside of the first seal, the mounting ring and the adhesive (see again, e.g., the plurality of different types of electrical connectors shown (not separately called out with reference numerals) protruding from the bottom of the power distribution center in the view of FIG. 15).

In another example, the power distribution center may further comprise at least one mounting lug for mounting the power distribution center to the bulkhead by using at least one mechanical fastener.

In another example, the power distribution center may further comprise at least one of: (a) at least one mounting lug for mounting the power distribution center to the bulkhead by using at least one mechanical fastener; and (b) at least one snap-fit mechanism (e.g., the power distribution center may use one or more mechanical fasteners for mounting (but the power distribution center does not necessarily use one or more mechanical fasteners for mounting—for example, a snap fit design may be utilized, wherein the attachment feature(s) may be integrated into mounting bracket(s) and attach directly to the bulkhead).

In another example, the power distribution center may further comprise a plurality of mounting lugs 1457A-1457D for mounting the power distribution center to the bulkhead by using a respective plurality of mechanical fasteners (see, e.g., the view of FIG. 15 showing mounting lugs 1457A-1457D). Of course, any desired number of mounting lugs and respective mechanical fasteners (not shown) may be utilized.

In another example, each mechanical fastener may be selected from the group including (but not limited to): screw(s), bolt(s), rivet(s), or the like.

In another example, the power distribution center may be removably mounted to the bulkhead by the mechanical fastener(s).

In another example, the mounting ring may have a shape (in plan view) selected from the group including (but not limited to): round, oval, square, rectangular, triangular.

In another example, the first seal may have a ring shape (in plan view).

In another example, the first seal may have a ring shape (in plan view) selected from the group including (but not limited to): round, oval, square, rectangular, triangular.

In another example, the adhesive may have a ring shape (in plan view).

In another example, the adhesive may have a ring shape (in plan view) selected from the group including (but not limited to): round, oval, square, rectangular, triangular.

Figure 14:
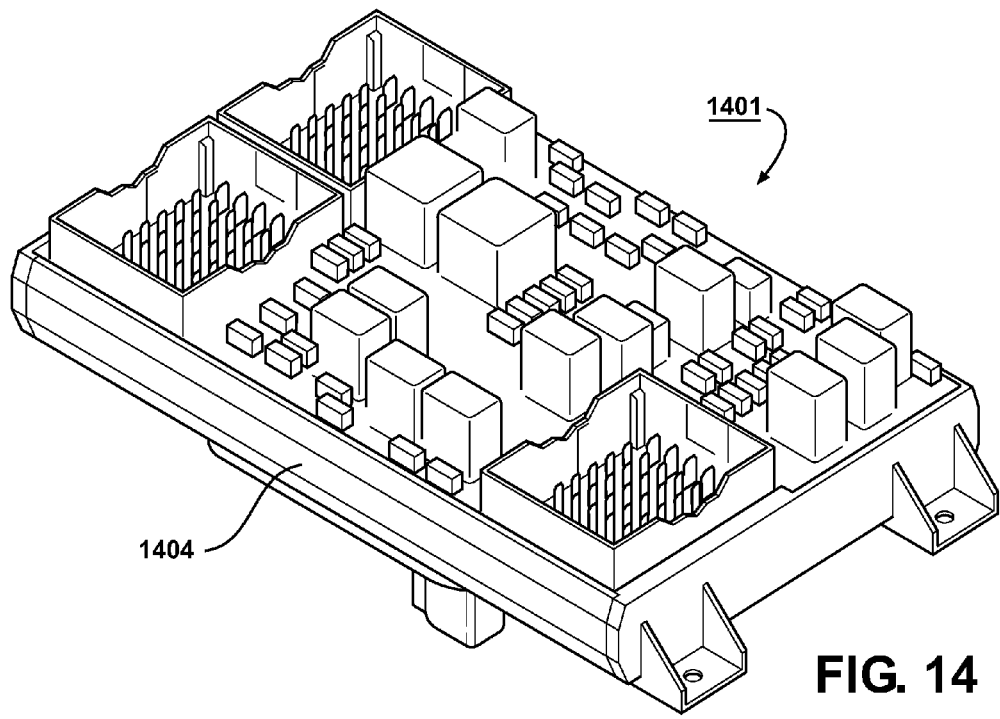
FIGS. 14, 15, 16A, 16B and 17 are views of a power distribution system according to another embodiment of the present invention (FIG. 14 is a top perspective view.
Figure 16A:
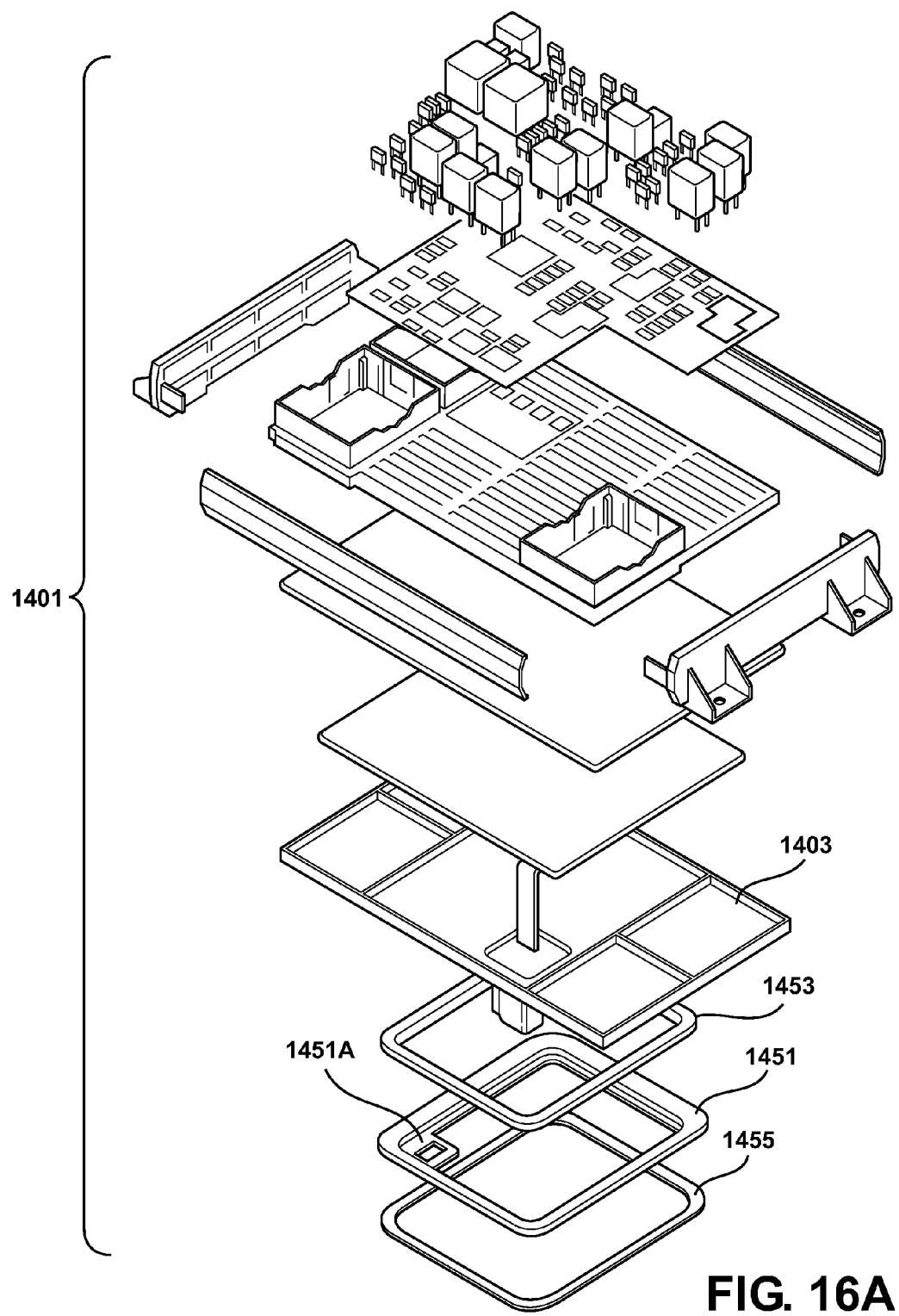
Figure 16B:
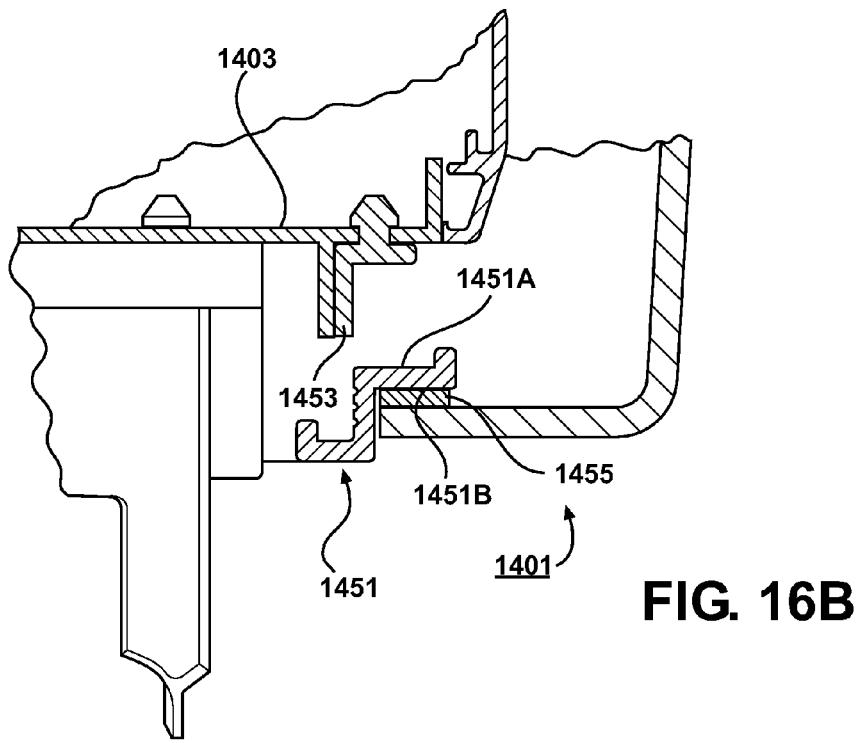
Figure 17:
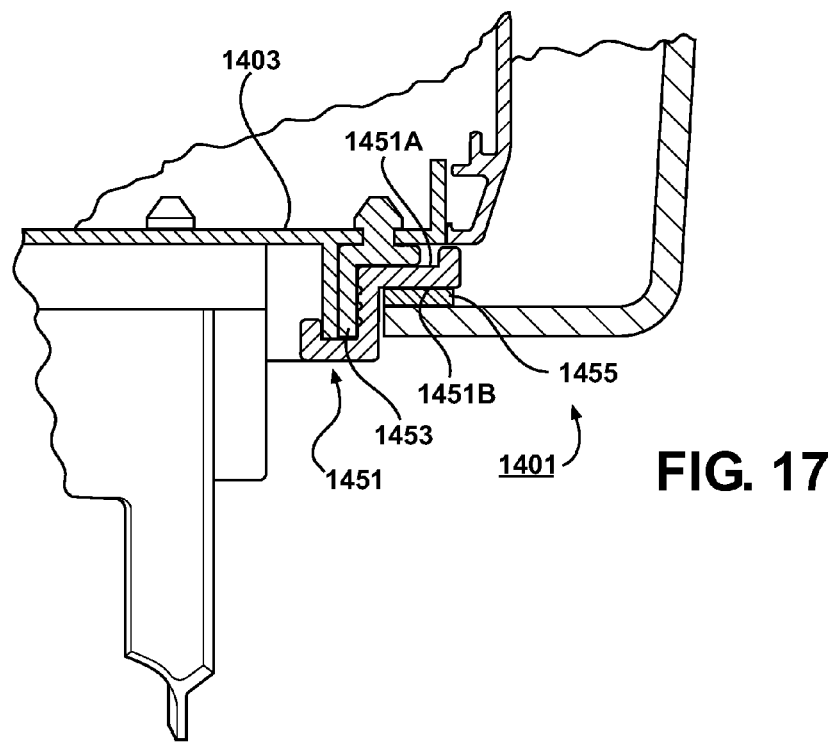

Further, as seen, for example, in the views of FIGS. 14 and 16A, various electrical devices (e.g., one or more fuses (e.g., minifuses), one or more circuit breakers, one or more relays, one or more resistors, one or more diodes, and/or one or more switches) may be provided to operatively interface with the power distribution center (such electrical devices are not separately called out with reference numerals in these Figs.).

As described herein, under various embodiments of the present invention a pass through mPDC assembly (e.g., based on an mPDC product family) may be provided. The pass through mPDC assembly may mount to a vehicle bulkhead and provide a sealed interconnect between the passenger and engine compartments.

In one example, the pass through mPDC assembly may utilize an mPDC assembly which contains: power distribution, circuit overcurrent protection devices, circuit switching devices and interconnects between harnesses.

In one specific example, a bottom portion of the mPDC assembly may utilize a custom molded plate to replace a number of modular connector plates typically used in mPDC assemblies. This custom molded plate may contain one or more integrally molded connector shrouds designed to mate with one or more respective sealed connector assemblies.

In one specific example, the connector plate may be designed to mate with a separate mounting ring (with a silicone seal in between). The mounting ring may also include a provision for a VHB tape seal that adheres to and seals against the bulkhead when the assembly is installed in the vehicle.

Reference will now be made to an example of manufacture and installation of a pass through mPDC assembly according to an embodiment of the present invention.

In this example, the silicone seal, mounting ring, and VHB tape are all assembled to the mPDC by a mPDC manufacturer prior to shipping to a customer (e.g., a car manufacturer). Just prior to installing the module (that is, the mPDC) in the vehicle, the customer would expose the adhesive on the VHB tape and place the module (that is, the mPDC) in the mounting position on the bulkhead. Mechanical fasteners would then be used to further secure the module (that is, the mPDC) in place.

In this regard, it is noted that the VHB tape may be used to secure and seal the mounting ring to the bulkhead, while the mounting ring (e.g., in the form of a separate component) may provide a uniform sealing surface for the silicone seal interface.

In addition, it is noted that under this example the installed mPDC is easily serviceable. That is, the mPDC may be removed and serviced by removing (or loosening) the mechanical fasteners, while the VHB tape and mounting ring remain in place and secured to the bulkhead.

As described herein, various embodiments of the present invention may provide an assembly that: 1) provides for over current protection devices at the junction point of the engine and body/instrument panel harnesses; 2) provides one or more easily serviceable sealed connections; and/or 3) provides a mounting ring and seals that are shipped as one assembly to the customer manufacturing location.

In another embodiment a power distribution center for a vehicle is provided, wherein the vehicle has a bulkhead separating an engine compartment from a passenger compartment, comprising: a connector plate; a first seal; a mounting ring, wherein the mounting ring comprises a first face and a second face, wherein the mounting ring removably mates with the connector plate such that the first seal is disposed between the connector plate and the first face of the mounting ring to provide a seal between the connector plate and the first face of the mounting ring; an adhesive, wherein the adhesive is disposed on the second face of the mounting ring; a plurality of connectors for passing a plurality of electrical connections through at least one hole in the bulkhead; and a plurality of mounting lugs for mounting the power distribution center to the bulkhead by using a respective plurality of mechanical fasteners; wherein the mounting ring is attached via the adhesive to the bulkhead; wherein the mounting ring is attached via the adhesive to the bulkhead at a position such that the mounting ring encloses a perimeter of the hole in the bulkhead; wherein the first seal is disposed along an entire length of the first face of the mounting ring; wherein the seal provided by the first seal is a weather-tight seal; wherein the first seal comprises silicone; wherein the adhesive provides a seal between the bulkhead and the second face of the mounting ring; wherein the adhesive is disposed along an entire length of the second face of the mounting ring; wherein the seal provided by the adhesive is a weather-tight seal; wherein the adhesive comprises double sided tape; wherein the mounting ring is permanently attached via the adhesive to the bulkhead; and wherein the plurality of electrical connections are passed through the hole in the bulkhead at positions such that the plurality of electrical connections are inside of the first seal, the mounting ring and the adhesive.

In another embodiment a method of installing a power distribution center in a vehicle is provided, wherein the vehicle has a bulkhead separating an engine compartment from a passenger compartment and the bulkhead has at least one hole therethrough, comprising: (a) receiving the power distribution center, wherein the power distribution center comprises: a connector plate; a first seal; a mounting ring, wherein the mounting ring comprises a first face and a second face, wherein the mounting ring removably mates with the connector plate such that the first seal is disposed between the connector plate and the first face of the mounting ring to provide a seal between the connector plate and the first face of the mounting ring; an adhesive, wherein the adhesive is disposed on the second face of the mounting ring; and a plurality of mounting lugs for mounting the power distribution center to the bulkhead by using a respective plurality of mechanical fasteners; (b) attaching the mounting ring to the bulkhead with the adhesive, wherein the mounting ring is attached via the adhesive to the bulkhead at a position such that the mounting ring encloses a perimeter of the hole in the bulkhead; and (c) driving through the plurality of mounting lugs the respective plurality of mechanical fasteners to mount the power distribution center to the bulkhead.

In one example, the power distribution center may be removably mounted to the bulkhead by the mechanical fastener(s).

In another example, the steps may be carried out in the order recited.

In another embodiment a power distribution system for a vehicle is provided, comprising: a power distribution center, wherein the power distribution center comprises a component plate; and at least one electrical connector spacer; wherein the component plate comprises a plurality of electrical terminals electrically connected to the power distribution center and wherein the component plate comprises on an outer surface thereof a surface geometry, the outer surface geometry having at least a portion configured to permit electrical connection at a first time of an electrical device to at least first and second ones of the electrical terminals and mechanical connection at a second time of the electrical connector spacer above at least the first and second ones of the electrical terminals; wherein the first time and the second time are distinct from one another and are mutually exclusive.

In one example, the electrical connector spacer, when mechanically connected to the component plate, may be configured to also mechanically connect to an electrical connector such that at least first and second electrical elements associated with the electrical connector electrically connect through the electrical connector spacer with at least the first and second electrical terminals.

In another example, the outer surface geometry may comprise a plurality of rows of raised ribs, wherein access holes through the component plate may be provided along valleys between adjacent rows, and wherein the access holes may provide access through the component plate to at least some of the electrical terminals.

In another example, the electrical device may comprise at least one of a fuse, a circuit breaker, a relay, a resistor, a diode and a switch.

In another example, the electrical connector may provide electrical power to an electrical system of the vehicle.

In another example, the electrical system of the vehicle may comprise at least one of a head light, a signal light, a vehicle cabin light, an anti-lock brake component, a radio and/or stereo system, a power window, a power mirror, a power seat.

In another example, the component plate may be a separate element mounted to the power distribution center.

In another example, the component plate may be integral with the power distribution center.

In another embodiment a power distribution system for a vehicle is provided, comprising: a power distribution center, wherein the power distribution center comprises a component plate; a plurality of electrical devices; a plurality of electrical connector spacers; and a plurality of electrical connectors; wherein each electrical device comprises at least one of a fuse, a circuit breaker, a relay, a resistor, a diode and a switch; wherein each electrical connector provides electrical power to an electrical system of the vehicle; wherein the component plate comprises a plurality of electrical terminals electrically connected to the power distribution center; wherein the component plate comprises on an outer surface thereof a surface geometry; wherein the outer surface geometry has at least a first portion configured to permit electrical connection at a first time of a first one of the electrical devices to at least first and second ones of the electrical terminals and mechanical connection at a second time of a first one of the electrical connector spacers above at least the first and second ones of the electrical terminals; wherein the outer surface geometry has at least a second portion configured to permit electrical connection at a third time of a second one of the electrical devices to at least third and fourth ones of the electrical terminals and mechanical connection at a fourth time of a second one of the electrical connector spacers above at least the third and fourth ones of the electrical terminals; wherein the first time and the second time are distinct from one another and are mutually exclusive; wherein the third time and the fourth time are distinct from one another and are mutually exclusive; wherein the first one of the electrical connector spacers, when mechanically connected to the component plate, is configured to also mechanically connect to a first one of the electrical connectors such that at least first and second electrical elements associated with the first one of the electrical connectors electrically connect through the first one of the electrical connector spacer with at least the first and second electrical terminals; and wherein the second one of the electrical connector spacers, when mechanically connected to the component plate, is configured to also mechanically connect to a second one of the electrical connectors such that at least first and second electrical elements associated with the second one of the electrical connectors electrically connect through the second one of the electrical connector spacers with at least the third and fourth electrical terminals.

In one example, the first portion of the outer surface geometry may comprise first and second rows of raised ribs, wherein access holes through the component plate may be provided along a valley between adjacent rows, and wherein the access holes may provide access through the component plate to at least some of the electrical terminals; and the second portion of the outer surface geometry may comprise second and third rows of raised ribs, wherein access holes through the component plate may be provided along a valley between adjacent rows, and wherein the access holes may provide access through the component plate to at least some of the electrical terminals.

In another example, the electrical system of the vehicle may comprise at least one of a head light, a signal light, a vehicle cabin light, an anti-lock brake component, a radio and/or stereo system, a power window, a power mirror, a power seat.

In another example, the component plate may be a separate element mounted to the power distribution center.

In another example, the component plate may be integral with the power distribution center.

In another example, the outer surface geometry of the component plate may comprise a plurality of locking features, each of the plurality of locking features of the component plate being configured to mate with a corresponding locking feature on each of the electrical connector spacers for locking each electrical connector spacer to the component plate.

In another example, the outer surface geometry of the component plate may comprise a plurality of keying features, each of the plurality of keying features of the component plate being configured to prohibit the attachment of each electrical connector spacer in a non-permitted orientation.

In another example, each of the electrical connectors may comprise at least one locking feature, each locking feature of each electrical connector being configured to lock the electrical connector to a corresponding electrical connector spacer.

In another example, each of the electrical connectors may comprise at least one keying feature, each keying feature of each electrical connector being configured to prohibit the attachment of the electrical connector to a corresponding electrical connector spacer in a non-permitted orientation.

In another example, each of the electrical connector spacers may comprise at least one locking feature, each locking feature of each electrical connector spacer being configured lock the electrical connector spacer to a corresponding electrical connector.

In another example, each of the electrical connector spacers may comprise at least one keying feature, each keying feature of each electrical connector spacer being configured to prohibit the attachment of the electrical connector spacer to a corresponding electrical connector in a non-permitted orientation.

In another example, each electrical connector may electrically connect to X number of the electrical terminals, wherein X is an integer between 2 and 10.

In another embodiment a power distribution system for a vehicle is provided, comprising: a power distribution center, wherein the power distribution center comprises a component plate, wherein the component plate comprises a plurality of electrical terminals electrically connected to the power distribution center and wherein the component plate comprises on an outer surface thereof a surface geometry, the outer surface geometry having at least a portion configured to: (a) permit electrical connection at a first time of an electrical device to at least first and second ones of the electrical terminals and electrical connection at a second time of an electrical connector to at least the first and second ones of the electrical terminals; and (b) include at least one mechanical interface, wherein the mechanical interface is shaped to mechanically mate with the electrical device if electrically connected to at least the first and second ones of the electrical terminals and to mechanically mate with the electrical connector if electrically connected to at least the first and second ones of the electrical terminals.

In one example, the power distribution system may further comprise at least one electrical connector spacer disposed between at least one of the electrical connectors and the component plate.

In another example, the electrical connector spacer may be releasably locked to the component plate.

Of course, any embodiment/example described herein (or any feature or features of any embodiment/example described herein) may be combined with any other embodiment/example described herein (or any feature or features of any such other embodiment/example described herein).

While a number of embodiments/examples of the present invention have been described, it is understood that these embodiments/examples are illustrative only, and not restrictive, and that many modifications may become apparent to those of ordinary skill in the art. For example, the present invention includes any methods for assembling and/or utilizing the systems described herein. Further, any steps may be performed in any desired order (and any desired steps may be added and/or any desired steps may be deleted).

What is claimed is:

1. A power distribution center for a vehicle, wherein the vehicle has a bulkhead separating an engine compartment from a passenger compartment, comprising:
    a connector plate;
    a first seal;
    a mounting ring, wherein the mounting ring comprises a first face and a second face, wherein the mounting ring removably mates with the connector plate such that the first seal is disposed between the connector plate and the first face of the mounting ring to provide a seal between the connector plate and the first face of the mounting ring; and
    an adhesive, wherein the adhesive is disposed on the second face of the mounting ring;
    wherein the mounting ring is attached via the adhesive ring to the bulkhead;
    wherein the bulkhead has at least one hole therethrough; and
    wherein the mounting ring is attached via the adhesive to the bulkhead at a position such that the mounting ring encloses a perimeter of the hole in the bulkhead.

2. The power distribution center of claim 1, wherein the first seal is disposed along an entire length of the first face of the mounting ring.

3. The power distribution center of claim 2, wherein the seal provided by the first seal is a weather-tight seal.

4. The power distribution center of claim 3, wherein the first seal comprises silicone.

5. The power distribution center of claim 4, wherein the first seal is applied between the connector plate and the first face of the mounting ring as a flexible solid ring.

6. The power distribution center of claim 1, wherein the adhesive provides a seal between the bulkhead and the second face of the mounting ring.

7. The power distribution center of claim 6, wherein the adhesive is disposed along an entire length of the second face of the mounting ring.

8. The power distribution center of claim 7, wherein the seal provided by the adhesive is a weather-tight seal.

9. The power distribution center of claim 8, wherein the adhesive comprises double sided tape.

10. The power distribution center of claim 1, wherein the mounting ring is permanently attached via the adhesive to the bulkhead.

11. The power distribution center of claim 1, wherein the power distribution center further comprises, for passing at least one electrical connection through the hole in the bulkhead, at least one of: (a) at least one connector; (b) at least one hard wired connection; and (c) at least one bolted-on connection.

12. The power distribution center of claim 11, wherein the power distribution center further comprises, for passing a plurality of electrical connections through the hole in the bulkhead, at least one of: (a) a plurality of connectors; (b) a plurality of hard wired connections; and (c) a plurality of bolted-on connections.

13. The power distribution center of claim 12, wherein the plurality of electrical connections are passed through the hole in the bulkhead at positions such that the plurality of electrical connections are inside of the first seal, the mounting ring and the adhesive.

14. The power distribution center of claim 1, wherein the power distribution center further comprises at least one of: (a) at least one mounting lug for mounting the power distribution center to the bulkhead by using at least one mechanical fastener; and (b) at least one snap-fit mechanism.

15. A power distribution center for a vehicle, wherein the vehicle has a bulkhead separating an engine compartment from a passenger compartment, comprising:
- a connector plate;
- a first seal;
- a mounting ring, wherein the mounting ring comprises a first face and a second face, wherein the mounting ring removably mates with the connector plate such that the first seal is disposed between the connector plate and the first face of the mounting ring to provide a seal between the connector plate and the first face of the mounting ring;
- an adhesive, wherein the adhesive is disposed on the second face of the mounting ring;
- a plurality of connectors for passing a plurality of electrical connections through at least one hole in the bulkhead; and
- a plurality of mounting lugs for mounting the power distribution center to the bulkhead by using a respective plurality of mechanical fasteners;
- wherein the mounting ring is attached via the adhesive to the bulkhead;
- wherein the mounting ring is attached via the adhesive to the bulkhead at a position such that the mounting ring encloses a perimeter of the hole in the bulkhead;
- wherein the first seal is disposed along an entire length of the first face of the mounting ring;
- wherein the seal provided by the first seal is a weather-tight seal;
- wherein the first seal comprises silicone;
- wherein the adhesive provides a seal between the bulkhead and the second face of the mounting ring;
- wherein the adhesive is disposed along an entire length of the second face of the mounting ring;
- wherein the seal provided by the adhesive is a weather-tight seal;
- wherein the adhesive comprises double sided tape;
- wherein the mounting ring is permanently attached via the adhesive to the bulkhead; and
- wherein the plurality of electrical connections are passed through the hole in the bulkhead at positions such that the plurality of electrical connections are inside of the first seal, the mounting ring and the adhesive.

* * * * *

UNITED STATES PATENT AND TRADEMARK OFFICE
CERTIFICATE OF CORRECTION

PATENT NO.         : 8,053,669 B1                                        Page 1 of 1
APPLICATION NO.    : 12/472972
DATED              : November 8, 2011
INVENTOR(S)        : Sodini et al.

It is certified that error appears in the above-identified patent and that said Letters Patent is hereby corrected as shown below:

On the Title Page, Item (73) Assignee:

Please delete "Aees, Inc." and insert --AEES, Inc.--

Signed and Sealed this
Fourteenth Day of February, 2012

David J. Kappos
*Director of the United States Patent and Trademark Office*